US012299162B1

(12) United States Patent
Butler et al.

(10) Patent No.: US 12,299,162 B1
(45) Date of Patent: May 13, 2025

(54) SYSTEMS AND METHODS FOR END POINT INTEGRATION AND MAPPING

(71) Applicant: AS0001, Inc., Carmel, IN (US)

(72) Inventors: Timothy Butler, Carmel, IN (US); Jonathan J. Thompson, Carmel, IN (US)

(73) Assignee: AS0001, Inc., Carmel, IN (US)

(*) Notice: Subject to any disclaimer, the term of this patent is extended or adjusted under 35 U.S.C. 154(b) by 0 days.

(21) Appl. No.: 18/808,778

(22) Filed: Aug. 19, 2024

(51) Int. Cl.
*G06F 21/62* (2013.01)
*G06F 21/64* (2013.01)
*H04L 9/32* (2006.01)

(52) U.S. Cl.
CPC .......... *G06F 21/6218* (2013.01); *G06F 21/64* (2013.01); *H04L 9/3213* (2013.01)

(58) Field of Classification Search
CPC ..... G06F 21/6218; G06F 21/64; H04L 9/3213
See application file for complete search history.

(56) References Cited

U.S. PATENT DOCUMENTS

| | | | | |
|---|---|---|---|---|
| 9,930,103 | B2* | 3/2018 | Thompson | H04L 67/10 |
| 10,057,243 | B1* | 8/2018 | Kumar | H04L 9/0891 |
| 2020/0177385 | A1* | 6/2020 | Kumar | H04L 9/0863 |
| 2021/0034669 | A1* | 2/2021 | McLaughlin | G06F 16/8365 |
| 2021/0216983 | A1* | 7/2021 | Glickman | G06Q 20/127 |
| 2021/0258164 | A1* | 8/2021 | Brown | H04L 9/3066 |
| 2021/0374693 | A1* | 12/2021 | La Salle | G06Q 20/0655 |
| 2022/0198444 | A1* | 6/2022 | Mee | G06Q 20/389 |
| 2022/0357711 | A1* | 11/2022 | Becker | H04L 9/50 |
| 2023/0129276 | A1* | 4/2023 | Satake | G06F 21/604 |
| | | | | 726/26 |
| 2023/0359604 | A1* | 11/2023 | Doney | G06Q 20/405 |
| 2024/0152915 | A1* | 5/2024 | Canney | G06Q 20/065 |
| 2024/0386119 | A1* | 11/2024 | Cooper | G06F 21/6218 |

OTHER PUBLICATIONS

International Search Report and Written Opinion on PCT/US 24/42917 DTD Nov. 13, 2024.

* cited by examiner

*Primary Examiner* — Mohammed Waliullah
(74) *Attorney, Agent, or Firm* — Foley & Lardner LLP

(57) ABSTRACT

Systems, methods, and computer-readable for endpoint integration and mapping are disclosed. A system can include one or more processing circuits configured to identify endpoints and access information. The processing circuits can generate an object package corresponding to the endpoint by initiating the object package based on an identifier corresponding to an endpoint type of which the object package is structured and mapping the access information to an access scheme corresponding to formatted requests to access the endpoints for protection data. The processing circuits can perform an endpoint request by invoking the object package using at least one formatted request and receiving output data with a response to the endpoint request by a DCDSI system. The processing circuits can further update a distributed ledger or data source based on the output data.

20 Claims, 23 Drawing Sheets

SYSTEMS AND METHODS FOR END POINT INTEGRATION AND MAPPING

BACKGROUND

The present implementations relates generally to computer security architecture and software for information security and cybersecurity. In a computer networked environment, entities such as people or companies have vulnerabilities that can result in security incidents. Some entities may desire to implement protections and some entities may desire to offer protections.

SUMMARY

Some embodiments of the present disclosure relate to a method. In some arrangements, the method can include identifying, by one or more processing circuits, one or more decentralized compute and data store interface (DCDSI) endpoints and corresponding access information. In some arrangements, the method can include generating, by the one or more processing circuits, an object package corresponding to the one or more DCDSI endpoints. In some arrangements, generating can include initiating the object package based on an identifier corresponding to at least one DCDSI endpoint type. In some arrangements, the object package is structured according to the at least one DCDSI endpoint type. In some arrangements, generating can include mapping, in the object package, the access information to an access scheme corresponding to one or more formatted requests to access the one or more DCDSI endpoints. In some arrangements, the one or more formatted requests correspond with requesting protection data. In some arrangements, the method further includes performing, by the one or more processing circuits, a DCDSI endpoint request by invoking the object package to execute the DCDSI endpoint request using at least one formatted request of the one or more formatted requests, and receiving output data including a response to the DCDSI endpoint request by a DCDSI system. In some arrangements, the method can further include updating, by the one or more processing circuits, a distributed ledger or data source based on the output data.

In some arrangements, the method can further include determining, by the one or more processing circuits, entity data of an entity based on at least one token stored on the distributed ledger or data source. In some arrangements, performing the DCDSI endpoint request further includes providing the entity data and the access information as input to the object package.

In some arrangements, the access information includes a taxonomy including at least one endpoint address and one or more (i) authentication credentials, (ii) request parameters, or (iii) response formats corresponding to the one or more DCDSI endpoints. In some arrangements, performing the DCDSI endpoint request further includes providing, by the one or more processing circuits, the one or more (i) authentication credentials, (ii) request parameters, or (iii) response formats as the input to the object package based on the taxonomy. In some arrangements, performing the DCDSI endpoint request further includes invoking, by the one or more processing circuits, the object package to perform the DCDSI endpoint request to the endpoint address.

In some arrangements, the method can further include accessing, by the one or more processing circuits, a token. In some arrangements, accessing the token can include establishing, by the one or more processing circuits, a data communication link with the ledger, where the ledger includes a blockchain network or database. In some arrangements, accessing the token can include transmitting, by the one or more processing circuits and via the data communication link, a query to the blockchain network or database to identify the token, where the query includes an identifier or address corresponding with the entity. In some arrangements, accessing the token can include retrieving, by the one or more processing circuits and via the data communication link, the token from the blockchain network or database using the identifier or address. In some arrangements, accessing the token can include verifying, by the one or more processing circuits, an authenticity of the token. In some arrangements, accessing the token can include extracting, by the one or more processing circuits, the entity data from the token.

In some arrangements, identifying the one or more DCDSI endpoints and the access information can further include extracting, by the one or more processing circuits using a machine learning model, the access information from at least one document or content corresponding with the one or more endpoints.

In some arrangements, the method further includes detecting, by the one or more processing circuits, an update to the one or more DCDSI endpoints based on monitoring the at least one document or content using the machine learning model. In some arrangements, the method includes modifying, by the one or more processing circuits, the access information based on the detected update. In some arrangements, the method includes mapping, by the one or more processing circuits, the modified access information to the access scheme corresponding to the one or more formatted requests.

In some arrangements, performing the DCDSI endpoint request further includes receiving, by the one or more processing circuits, an object data structure including operations for communicating with and exchanging data with the one or more DCDSI endpoints based on the type. In some arrangements, performing the DCDSI endpoint request further includes modifying, by the one or more processing circuits, a state of the object data structure to cause the object data structure to perform the DCDSI endpoint request based on the access information.

In some arrangements, updating the distributed ledger or data source further includes mapping, by the one or more processing circuits, the output data to an output information scheme corresponding to one or more outputs from accessing the one or more DCDSI endpoints.

In some arrangements, the one or more DCDSI endpoints include one or more application programming interfaces (APIs). In some arrangements, the access scheme includes one or more rules. In some arrangements, the method can further include validating, by the one or more processing circuits, the access information against at least one of the one or more rules to determine compatibility with the access scheme either (i) before performance of a data retrieval corresponding to the DCDSI endpoint request or (ii) after performance of the data retrieval.

Some embodiments of the present disclosure relate to a system. In some arrangements, the system can include one or more processing circuits configured to identify one or more decentralized compute and data store interface (DCDSI) endpoints and corresponding access information. In some arrangements, the one or more processing circuits can be further configured to generate an object package corresponding to the one or more DCDSI endpoints. In some arrangements, generating the object package can include initiating the object package based on an identifier corresponding to at least one DCDSI endpoint type, where the object package is structured according to the at least one DCDSI endpoint type. In some arrangements, generating the object package can include mapping, in the object package, the access information to an access scheme corresponding to one or more formatted requests to access the one or more DCDSI endpoints, where the one or more formatted requests correspond with requesting protection data. In some arrangements, the one or more processing circuits can be further configured to perform a DCDSI endpoint request by invoking the object package to execute the DCDSI endpoint request using at least one formatted request of the one or more formatted requests and receiving output data including a response to the DCDSI endpoint request by a DCDSI system. In some arrangements, the one or more processing circuits can be further configured to update a distributed ledger or data source based on the output data.

In some arrangements, the one or more processing circuits can be further configured to determine entity data of an entity based on at least one token stored on the distributed ledger or data source. In some arrangements, performing the DCDSI endpoint request further includes providing the entity data and the access information as input to the object package.

In some arrangements, the access information includes a taxonomy including at least one endpoint address and one or more (i) authentication credentials, (ii) request parameters, or (iii) response formats corresponding to the one or more DCDSI endpoints. In some arrangements, the one or more processing circuits can be further configured to, in performing the DCDSI endpoint request, provide the one or more (i) authentication credentials, (ii) request parameters, or (iii) response formats as the input to the object package based on the taxonomy. In some arrangements, the one or more processing circuits can be further configured to invoke the object package to perform the DCDSI endpoint request to the endpoint address.

In some arrangements, the one or more processing circuits can be further configured to access a token. In some arrangements, accessing the token can include establishing, by the one or more processing circuits, a data communication link with the ledger, where the ledger includes a blockchain network or database. In some arrangements, accessing the token can include transmitting, by the one or more processing circuits and via the data communication link, a query to the blockchain network or database to identify the token, where the query includes an identifier or address corresponding with the entity. In some arrangements, accessing the token can include retrieving, by the one or more processing circuits and via the data communication link, the token from the blockchain network or database using the identifier or address. In some arrangements, accessing the token can include verifying, by the one or more processing circuits, an authenticity of the token. In some arrangements, accessing the token can include extracting, by the one or more processing circuits, the entity data from the token In some arrangements, the one or more processing circuits can be further configured to identify the one or more DCDSI endpoints and the access information. In some arrangements, identifying the one or more DCDSI endpoints and the access information can further include extracting, by the one or more processing circuits using a machine learning model, the access information from at least one document or content corresponding with the one or more endpoints.

In some arrangements, the one or more processing circuits can be further configured to detect an update to the one or more DCDSI endpoints based on monitoring the at least one document or content using the machine learning model. In some arrangements, the one or more processing circuits can be further configured to modify the access information based on the detected update. In some arrangements, the one or more processing circuits can be further configured to map the modified access information to the access scheme corresponding to the one or more formatted requests.

In some arrangements, the one or more processing circuits can be further configured to, in generating the object package, receive an object data structure including operations for communicating with and exchanging data with the one or more DCDSI endpoints based on the type. In some arrangements, the one or more processing circuits can be further configured to modify a state of the object data structure to cause the object data structure to perform the DCDSI endpoint request based on the access information.

In some arrangements, the one or more processing circuits can be further configured to, in updating the distributed ledger or data source, map the output data to an output information scheme corresponding to one or more outputs from accessing the one or more DCDSI endpoints.

In some arrangements, the one or more DCDSI endpoints include one or more application programming interfaces (APIs). In some arrangements, the access scheme includes one or more rules. In some arrangements, the one or more processing circuits can be further configured to validate the access information against at least one of the one or more rules to determine compatibility with the access scheme either (i) before performance of a data retrieval corresponding to the DCDSI endpoint request or (ii) after performance of the data retrieval.

Some embodiments of the present disclosure relate to one or more non-transitory computer-readable media (CRM) having instructions stored thereon that, when executed by one or more processing circuits, cause the one or more processing circuits to identify one or more decentralized compute and data store interface (DCDSI) endpoints and corresponding access information. In some arrangements, the instructions can further cause the one or more processing circuits to generate an object package corresponding to the one or more DCDSI endpoints. In some arrangements, generating the object package can include initiating the object package based on an identifier corresponding to at least one DCDSI endpoint type, where the object package is structured according to the at least one DCDSI endpoint type. In some arrangements, generating the object package can include mapping, in the object package, the access information to an access scheme corresponding to one or more formatted requests to access the one or more DCDSI endpoints, where the one or more formatted requests correspond with requesting protection data. In some arrangements, the instructions can further cause the one or more processing circuits to perform a DCDSI endpoint request by invoking the object package to execute the DCDSI endpoint request using at least one formatted request of the one or more formatted requests and receiving output data including a response to the DCDSI endpoint request by a DCDSI system. In some arrangements, the instructions can further cause the one or more processing circuits to update a distributed ledger or data source based on the output data.

In some arrangements, the instructions can further cause the one or more processing circuits to determine entity data of an entity based on at least one token stored on the distributed ledger or data source. In some arrangements, performing the DCDSI endpoint request further includes providing the entity data and the access information as input to the object package.

Figure 1A:
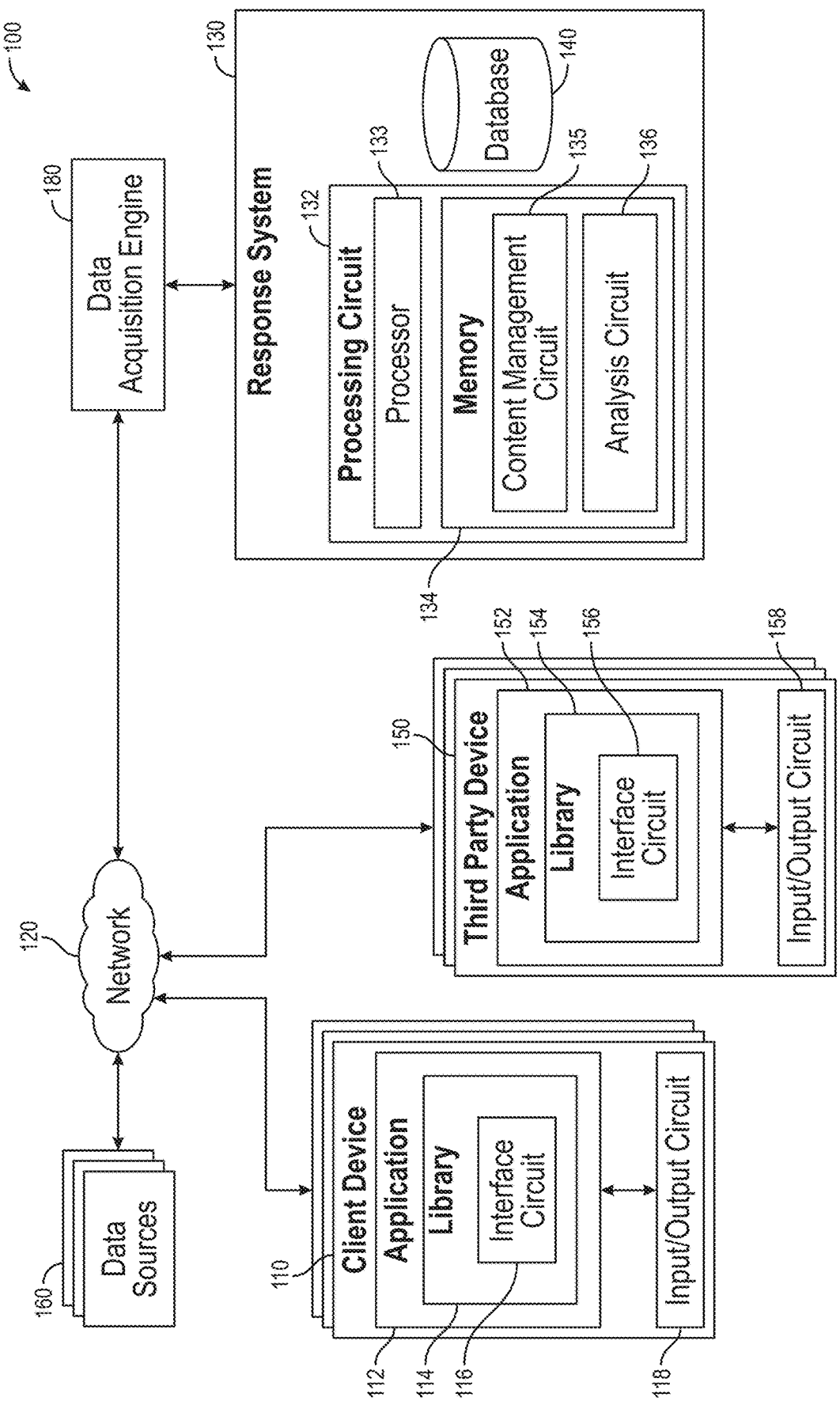
FIG. 1A depicts a block diagram of an implementation of a system for managing and configuring incident responses, according to some arrangements.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Referring generally to the FIGURES, systems and methods relate generally to implementing endpoint integrations and mapping. In some arrangements, the implementations can include a security architecture that models cyber resilience data using cyber resilience identities and associated metadata. In some arrangements, the system represents an embodiment of an endpoint integration and mapping system.

Existing cybersecurity systems and architectures exhibit multiple technical limitations, reducing effectiveness in managing and responding to cyber threats. One technical limitation involves the absence of integrated incident response capabilities. Numerous systems operate in isolation, utilizing separate tools for threat detection, response, and recovery, leading to delays in response times, communication challenges between components, and fragmented visibility into the overall security posture. Another limitation involves the absence of streamlined processes for engaging third-party vendors for incident response services, often requiring navigation through complex procurement protocols during a cyber incident, which delays mitigation efforts. Systems frequently implement incomplete assessment mechanisms for readiness in incident response, resulting in unclear visibility into system capabilities and constraints, complicating communication with potential response providers. Static defenses, often employed by current systems, fail to adjust to emerging threats. These static defenses introduce vulnerabilities, as attackers continuously evolve their strategies and methods. Systems fail to account for changes in infrastructure and operations, such as the integration of new technologies or modifications in business processes, introducing new potential attack vectors. The reliance on static defenses limits the system from maintaining a robust security posture, increasing exposure to an evolving threat landscape.

The implementations described herein provide technical capabilities for preventing cyber threats, including unauthorized access, data breaches, and cyberattacks, by generating a customized cybersecurity framework tailored to technical requirements. The framework and implementations can be used to identify current cybersecurity vulnerabilities and facilitate connections with vendors offering targeted protection plans. Thereby, the systems can provide enhanced data protections including safeguarding sensitive information such as medical records, financial data, and proprietary business information. The framework and implementations can also reduce economic and infrastructure burdens associated with data breaches, including expenses related to infrastructure failures, forensic investigations, and legal actions. The cybersecurity models described herein can detect and address vulnerabilities while providing dynamic monitoring of relationships between networks, hardware, devices, and financial entities. The implementations can also improve cybersecurity by enhancing network, infrastructure, technology, and data security. Vendors can use the systems and methods described herein to actively monitor and provide responses to potential threats, improving the overall security posture. The customized cybersecurity frameworks address existing vulnerabilities and anticipate future threats, offering an adaptive and proactive solution to cybersecurity.

Implementation of customized cybersecurity frameworks facilitate technical systems to identify existing vulnerabilities, map vulnerabilities to assets, and provide targeted protection strategies. The technical benefit includes generating remediation recommendations and preventing successful hacking activities, cyberattacks, data breaches, and other cyber incidents. Systems and methods disclosed herein facilitate connections of systems to suitable vendors and other entities, offering security plans customized to vulnerabilities and technical needs identified. Implementations of customized cybersecurity frameworks can improve the process of identifying and addressing vulnerabilities by streamlining resources, facilitating continuous monitoring of the system's cybersecurity status by vendors, providing dynamic responses to potential threats, and maintaining the integrity and security of system infrastructure. Customized frameworks provide technical capabilities to facilitate determinations about cybersecurity strategies by selecting from a range of vendor plans and services, activating plans as needed, and ensuring cybersecurity is actively monitored and managed.

A technical improvement in dynamic cybersecurity architecture comprehension is provided by identifying and mapping cybersecurity vulnerabilities within customized cybersecurity frameworks. The need to maintain separate inventories of network weaknesses, infrastructure vulnerabilities, and operating system susceptibilities can be reduced or eliminated. The implementations of the customized cybersecurity framework can include identifying potential security gaps associated with system identifiers, such as domain identifiers, IP addresses, or subnets. Rather than assessing each subclass of vulnerabilities separately, a computing system utilizes a unified view into the computing environment of the target system and centrally manages the identification of different types of vulnerabilities and associated potential security threats. Vulnerability identification operations can include computer-executed processes to model one or more cybersecurity statuses, determine vulnerabilities based on statuses, and integrate or connect systems to suitable vendors offering appropriate cybersecurity plans.

Additionally, the cybersecurity framework enhances data management and sharing through tokenization of cybersecurity information. Tokenization can encrypt cybersecurity posture and insurance information for secure access and storage, with access controlled by smart contracts. Tokenization can be used to prevent unauthorized access and improves data integrity, enhancing data sharing and trust among stakeholders. Additionally, Distributed Non-Fungible Tokens (DNFTs) can provide transparency in tracking and verifying cybersecurity management events and insurance-related activities. Transparency in these processes can improve the accuracy of cyber risk assessments and reduces the likelihood of fraud, as all parties verify the authenticity of performance history events through mechanisms such as multi-signature wallets or signature verification within smart contracts. Tokenization of cybersecurity information, using NFTs or DNFTs, provides real-time visibility into a client's cyber risk posture. For example, dynamic visibility can facilitate monitoring of compliance and adjustments to policies based on the client's current risk status. That is, access to up-to-date information allows insurers to provide accurate and fair policy pricing, aligning incentives between insurers, brokers, and policyholders. Real-time monitoring capabilities can also provide responsive updates to potential threats, enhancing the overall security posture. The ability to adapt to changes in the cyber threat landscape and organizational infrastructure provides a cybersecurity framework that is improved and remains responsive to evolving risks.

Token integration within cybersecurity frameworks provides a unified view of system cybersecurity status. By consolidating information from various security systems into a single platform, the implementations can conduct cyber threat and risk assessments with greater accuracy and efficiency by accessing data mapped to tokens. That is, the implementations facilitate communication and collaboration between systems, vendors, and carriers, ensuring systems can identify cyber risks collectively. Data location mapping, connection of security stacks, and provision of targeted protection strategies can improve alignment of incentives between various cyber resilience entities. Tokenization also enhances systems through improved protection and fair policy pricing.

Decentralized ledger implementation, such as Blockchain, can be used to enhance the security and integrity of the data exchange process. Decentralized ledgers verify that transactions and data entries are immutable and verifiable, providing a secure and transparent audit trail for cybersecurity activities. Blockchain architecture provides a distributed consensus mechanism that validates transactions without requiring a central authority, reducing the risk of data tampering and unauthorized access. The decentralized nature of Blockchain enhances interoperability between different security platforms, allowing seamless integration and communication among various cybersecurity tools and stakeholders. Resilient infrastructure capable of withstanding cyberattacks facilitates secure and efficient data sharing and management. Tokens on a decentralized ledger improve reliability in cyber risk assessments and strengthen stakeholder confidence in implemented security measures.

Integration of decentralized compute and data store interface (DCDSI) endpoints into cybersecurity frameworks streamlines management and execution of endpoint requests across diverse systems with various integrations and implementations. Identifying and mapping endpoint access information into a standardized format enhances compatibility and interoperability between different APIs and decentralized endpoints. This mapping capability reduces errors during data retrieval and enforces accurate access permissions, improving the overall security posture. Integration of endpoint information into object packages dynamically invoked for tasks provides consistent and adaptable system operations, aligning endpoint interactions with current security policies and access rules.

Generating object packages customized to endpoint types increases flexibility and scalability within cybersecurity frameworks. This approach facilitates the incorporation of new endpoints and the updating of existing endpoints without disrupting ongoing operations. That is, the structuring object packages according to endpoint types and mapping access information to predefined schemes integrates endpoints into the broader cybersecurity infrastructure more efficiently with improved accuracy. Additionally, using machine learning models to extract and update access information from relevant documents can maintain the latest endpoint configurations and requirements, minimizing potential for misconfigurations.

The disclosed system provides an improved model for verifying authenticity and integrity of data exchanged through DCDSI endpoints. Incorporating token-based authorization and rule-based access controls into endpoint management processes restricts access to data to authorized entities. Enhanced data security is achieved by preventing unauthorized access while logging and auditing endpoint interactions. Validation of access information against rules, either before or after data retrieval, improves the security framework through access controls and real-time monitoring of endpoint activities. Additionally, the mapping of output data to predefined formats for storage can facilitate consistent organization and accessibility for future analysis, contributing to a technically improved, dynamic, and responsive cybersecurity infrastructure.

Referring to FIG. 1 generally, system 100 is an implementation of a security architecture utilizing modeling to provide an incident response management platform that includes multiple components, such as client device 110, response system 130, third-party devices 150, and data sources 160. These components can be interconnected through a network 120 that supports secure communication protocols such as TLS, SSL, and HTTPS. In some implementations, the response system 130 can generate and provide an application for incident response readiness that guides users through the steps to prepare for and manage incidents effectively. The application can integrate with various technologies and vendors to purchase services to resolve issues, and provides integration points for incident response workflow management. For example, users can access a marketplace within the application to purchase products, insurance, and services, and can determine their organization's capabilities, limitations, and threat focus. In some implementations, the response system 130 also presents the organization's readiness to incident response providers and automatically routes them to pre-associated panel vendors or organization-selected vendors at the point of need, contracting and activating the incident room immediately.

In some implementations, the response system 130 can integrate readiness, including insurer data, into various third-party systems via APIs. In some implementations, the response system 130 can map an incident response (IR) plan from a static document or documents to the task enablers in Responder that bring them to life, showing where the tasks used by partners such as IR firms, insurers, and breach counsel are covered by the IR plan and IR playbook. The response system 130 can decompose the response plan into associated actionable tasks and activities by the organization, incident response providers, and other stakeholders, and provides different users and partners with a unified view of tasks, activities, and progress/status tracking.

In some implementations, the response system 130 stores data regarding key milestones in an authoritative data source such as blockchain (e.g., database 140), ensuring that results are traceable and linkable. For example, issues can be identified, tasks can be created, work can be routed to vendors, and proof of resolution can be recorded. In some implementations, the response system 130 can also supports real-time status tracking of policy-aligned tasks to status updates provided for incident response. In some implementations, instant intake is achieved by a remote embeddable widget on a website, which starts an incident response process that begins with a proposal stage and continues through workflows to achieve response readiness based on pre-defined logic and automation. For example, services can be purchased or extended within the application, and in the event of an inbound incident, the application facilitates routing to a claim manager.

In some implementations, the response system 130 can provide an application for incident response readiness that guides users through the steps to ensure they are prepared for any potential incidents. The application can be configured to integrate with technology and vendors to purchase services that are used to resolve issues. For example, the user can access the application through a variety of devices, including client device 110. In particular, the application can offer integration points for incident response workflow management, allowing users to streamline their incident response process. The organization incident readiness feature of the response system 130 offers several features, including the integration of readiness, including insurer data, into various third-party systems, such as via an API. By integrating with third-party systems, the response system 130 can ensure that users have access to the most up-to-date information regarding their organization's readiness for potential incidents. In addition, the response system 130 can offer incident response plan mapping from a static plan document to the task enablers in Responder, which brings the tasks used by partners such as IR firms, insurers, and breach counsel to be measurable and identified.

In some implementations, Still referring to FIG. 1 generally, the response system 130 can offer a marketplace for purchasing products, insurance, and services that may be used in the event of an incident. The marketplace includes various vendors that offer different products and services, allowing users to choose the best fit for their organization based on their capabilities, limitations, and threat focus. The application also determines organization readiness levels with proof of date, time stamps, and artifacts (e.g., on the blockchain), which can be used to identify any gaps in the organization's incident response plan. In some implementations, the response system 130 can automate the routing of incidents to pre-associated, panel vendors or organization-selected vendors at the point of need and immediately contracts and activates the incident room (e.g., when a cyber incident occurred or potentially occurred). Accordingly, the system 100 can ensure that the organization can respond to an incident as quickly and efficiently as possible. Additionally, the response system 130 can decompose the response plan into associated actionable tasks and activities by the organization, incident response providers, and others. This allows users to better understand their organization's response plan and identify areas for improvement.

In general, the application (e.g., graphical user interface provided by content management circuit 135) provides different users/partners with a unified view of tasks, activities, and progress/status tracking. For example, the status tracking can be tied back to incident readiness and managing the incident through resolution. Users can collaborate via the tool instead of via phone calls and emails, which ensures that everyone is working from the same information and avoids any miscommunication. The application can also offers real-time (or near real-time) status tracking of policy aligned tasks to status updates provided for incident response, allowing users to quickly and easily see how their incident response plan is progressing. In some implementations, data regarding key milestones is stored in an authoritative data source such as blockchain (e.g., database 140 (private ledger) or data sources 160 (public ledger)), ensuring that results can be traceable and linkable. Thus, this can allow users to identify areas for improvement in their incident response plan and make changes as necessary. In some implementations, the response system 130 offers an instant intake feature that can be integrated into a remote embeddable widget on a website. For example, the widget can start an incident response process that starts with a proposal stage and continues through workflows to achieve response readiness based on pre-defined logic and automation. This ensures that incidents are quickly identified and resolved, and that the organization is prepared for any potential incidents.

Still referring to FIG. 1A generally, the response system 130 of system 100 includes a data acquisition engine 180 and analysis circuit 136 that democratizes posture threats, incidents, and claim data. In particular, all stakeholders in the incident response process can have access to relevant data to make informed decisions. The analysis circuit 136 can use the democratized data in underwriting, claims, and the resilience process to enhance the overall response to an incident. With the data acquisition engine 180, the response system 130 can collect and process data from various sources, such as third-party devices 150 and data sources 160, to provide a view of the organization's security posture. In some implementations, the response system 130 also implement incident response protocols and features via analysis circuit 136 that provide a centralized location for managing and configuring incident responses. For example, an application can walk users through the steps of incident response readiness and integrates with technology and vendors to purchase services to resolve issues. The response system 130 can automate the routing of incident response tasks to pre-associated, panel vendors, or organization-selected vendors at the point of need and immediately contracts and activates the incident room. By decomposing the response plan into associated actionable tasks and activities by the organization, incident response providers, and other stakeholders, the response system 130 ensures that all parties are working together to manage the incident through resolution.

In some implementations, the response system 130 includes a vendor-provider marketplace that allows organizations to purchase products, insurance, and services that enhance their incident response capabilities. For example, the marketplace can be integrated into the response system 130, allowing users to easily access relevant products and services during an incident. Additionally, the response system 130 can determine the organization's capabilities, limitations, and threat focus to present readiness to incident response providers. In some implementations, the response system 130 can include collection, recall, and proof of state features that provide that data regarding key milestones is stored in an authoritative data source such as the blockchain. This includes capabilities pre-incident, what happened after the incident occurred, what was the root cause, and recording. For example, results are traceable and linkable, and issues are identified, tasks are created, work is routed to vendors, and proof of resolution is recorded. In some implementations, the response system 130 can include a drag and drop file tokenization feature that allows users to securely tokenize and store sensitive files. In particular, this feature is useful when organizations desire to share sensitive information with third parties or with internal stakeholders. The system ensures that the information is secure and that only authorized parties can access it. Thus, this feature is designed to streamline the incident response process and ensure better collaboration between all stakeholders.

Referring now to FIG. 1A in more detail, a block diagram depicting an implementation of a system 100 for managing and configuring incident responses. System 100 includes client device 110, response system 130, third party devices 150, and data sources 160. In various implementations, components of system 100 communicate over network 120. Network 120 may include computer networks such as the Internet, local, wide, metro or other area networks, intranets, satellite networks, other computer networks such as voice or data mobile phone communication networks, combinations thereof, or any other type of electronic communications network. Network 120 may include or constitute a display network. In various implementations, network 120 facilitates secure communication between components of system 100. As a non-limiting example, network 120 may implement transport layer security (TLS), secure sockets layer (SSL), hypertext transfer protocol secure (HTTPS), and/or any other secure communication protocol.

In general, the client device(s) 110 and third party device(s) 150 can execute a software application (such as application 112 or application 150, e.g., a web browser, an installed application, or other application) to retrieve content from other computing systems and devices over network 120. Such an application may be configured to retrieve an interfaces and dashboards from the response system 130. In one implementation, the client device 110 and third party device 150 may execute a web browser application, which provides the interface (e.g., from content management circuit 135) on a viewport of the client device 110 or third party device 150. The web browser application that provides the interface may operate by receiving input of a uniform resource locator (URL), such as a web address, from an input device (such as input/output circuit 118 or 158, e.g., a pointing device, a keyboard, a touch screen, or another form of input device). In response, one or more processors of the client device 110 or third party device 150 executing the instructions from the web browser application may request data from another device connected to the network 120 referred to by the URL address (e.g., the response system 130). The other device may then provide webpage data and/or other data to the client device 110 or third party device 150, which causes the interface (or dashboard) to be presented by the viewport of the client device 110 or third party device 150. Accordingly, the browser window presents the interface to facilitate user interaction with the interface. In some embodiments, the interface (or dashboard) can be presented via an application stored on the client device 110 and third party device 150.

The network 120 can facilitate communication between various nodes, such as the response system 130, third party device 150, client device 110, and data sources 160. In some arrangements, data flows through the network 120 from a source node to a destination node as a flow of data packets, e.g., in the form of data packets in accordance with the Open Systems Interconnection (OSI) layers. A flow of packets may use, for example, an OSI layer-4 transport protocol such as the User Datagram Protocol (UDP), the Transmission Control Protocol (TCP), or the Stream Control Transmission Protocol (SCTP), transmitted via the network 120 layered over an OSI layer-3 network protocol such as Internet Protocol (IP), e.g., IPv4 or IPv6. The network 120 is composed of various network devices (nodes) communicatively linked to form one or more data communication paths between participating devices. Each networked device includes at least one network interface for receiving and/or transmitting data, typically as one or more data packets. An illustrative network 120 is the Internet; however, other networks may be used. The network 120 may be an autonomous system (AS), i.e., a network that is operated under a consistent unified routing policy (or at least appears to from outside the AS network) and is generally managed by a single administrative entity (e.g., a system operator, administrator, or administrative group).

Client device 110 (sometimes referred to herein as a "mobile device") may be a mobile computing device, smartphone, tablet, smart watch, smart sensor, or any other device configured to facilitate receiving, displaying, and interacting with content (e.g., web pages, mobile applications, etc.). Client device 110 may include an application 112 to receive and display content and to receive user interaction with the content. For example, application 112 may be a web browser. Additionally, or alternatively, application 112 may be a mobile application. Client device 110 may also include an input/output circuit 118 for communicating data over network 120 (e.g., receive and transmit to response system 130).

In various implementations, application 112 interacts with a content publisher to receive online content, network content, and/or application content. For example, application 112 may receive and present various dashboards and information resources from distributed by the content publisher (e.g., content management circuit 135). Dashboards and/or information resources may include web-based content such as a web page or other online documents. The dashboards information resources may include instructions (e.g., scripts, executable code, etc.) that when interpreted by application 112 cause application 112 to display a graphical user interface such as an interactable web page and/or an interactive mobile application to a user (e.g., dashboards of FIGS. 2-49). In various implementations, application 112 can include one or more application interfaces for presenting an application (e.g., mobile application, web-based application, virtual reality/augmented reality application, smart TV application and so on).

Application 112 is shown to include library 114 having an interface circuit 116. The library 114 may include a collection of software development tools contained in a package (e.g., software development kit (SDK), application programming interface (API), integrated development environment (IDE), debugger, etc.). For example, library 114 may include an application programming interface (API). In another example, library 114 may include a debugger. In yet another example, the library 114 may be an SDK that includes an API, a debugger, and IDE, and so on. In some implementations, library 114 includes one or more libraries having functions that interface with a particular system software (e.g., iOS, Android, Linux, etc.). Library 114 may facilitate embedding functionality in application 112. For example, a user may use library 114 to automatically transmit event logs whenever an event occurs on application 112. As a further example, library 114 may include a function configured to collect and report device analytics and a user may insert the function into the instructions of application 112 to cause the function to be called during actions of application 112 (e.g., during testing as described in detail below). In some implementations, interface circuit 116 functionalities are provided by library 114.

In various implementations, interface circuit 116 of system 100 can provide one or more interfaces to users, which can be accessed through an application interface presented in the viewport of client device 110. These interfaces can take the form of dashboards and other graphical user interfaces, offering a variety of functionality to the user. For example, a user can view incident responses, remediate claims, communicate with team members, purchase or extend products and services, and more. The interfaces provided by interface circuit 116 can be customizable and dynamic, allowing users to configure and adjust them to suit their needs. They can also be designed to present real-time data associated with current incident responses, potential incidents or threats, and other important information, allowing users to make informed decisions and take proactive steps to manage risk.

For example, interface circuit 116 can generate dashboards that provide real-time data and insights. These dashboards can be customized to suit the needs of individual users or groups, providing a view of incident responses, potential threats, and the status of remediation efforts. For example, a dashboard might show the status of incident responses across different regions, or highlight areas where additional resources are needed. In another example, the interface circuit 116 can generate a landscape of all currently connected devices to the entity, such as a company or institution. This can include information on the types of devices, their locations, and other data that can help inform incident response efforts. With this information, users can better understand the scope of potential threats, identify vulnerable areas, and take steps to improve security and resilience.

In another example implementation, the application 112 executed by the client device 110 can cause a web browser to the display the interfaces (e.g., dashboards) on the client device 110. For example, the user may connect (e.g., via the network 120) to a website structured to host the interfaces. In various implementations, interface can include infrastructure such as, but not limited to, host devices (e.g., computing device) and a collection of files defining the interface and stored on the host devices (e.g., in database 140). The web browser operates by receiving input of a uniform resource locator (URL) into a field from an input device (e.g., a pointing device, a keyboard, a touchscreen, mobile phone, or another form of input device). In response, the interface circuit 116 executing the interface in the web browser may request data such as from content (e.g., vendor information, settings, current incident response, other dashboards, etc.) from database 140. The web browser may include other functionalities, such as navigational controls (e.g., backward and forward buttons, home buttons). In some implementations, the debugging interface can include both a client-side interface and a server-side interface. For example, a client-side interface can be written in one or more general purpose programming and can be executed by client device 110. The server-side interface can be written, for example, in one or more general purpose programming languages and can be executed by the response system 130.

Interface circuit 116 may detect events within application 112. In various implementations, interface circuit 116 may be configured to trigger other functionality based on detecting events (e.g., transactions, in-app purchases, performing a test of a vendor, scrolling through an incident response plan, sending a contract to a vendor, spending a certain amount of time interacting with an application, etc.). For example, interface circuit 116 may trigger a pop-up window (overlayed on an interface) upon selecting an actionable object (e.g., button, drop-down, input field, etc.) within a dashboard. In various implementations, library 114 includes a function that is embedded in application 112 to trigger interface circuit 116. For example, a user may include a function of library 114 in a transaction confirmation functionality of application 112 that causes interface circuit 116 to detect a confirmed transaction (e.g., purchase cybersecurity protection plans, partnering). It should be understood that events may include any action important to a user within an application and are not limited to the examples expressly contemplated herein. In various implementations, interface circuit 116 is configured to differentiate between different types of events. For example, interface circuit 116 may trigger a first set of actions based on a first type of detected event (e.g., selecting actionable objects within the static response plan) and may trigger a second set of actions based on a second type of detected event (e.g., running a test). In various implementations, interface circuit 116 is configured to collect event logs associated with the detected event and/or events and transmit the collected event logs to content management circuit 135.

In various implementations, the interface circuit 116 can collect events logs based on a designated session. In one example, the designated session may be active from when application 112 is opened/selected to when application 112 is closed/exited. In another example, the designated session may be active based on a user requesting a session to start and a session to end. Each session, the interface circuit 116 can collect event logs while the session is active. Once completed, the event logs may be provided to any system described herein. During the session, the event logs may trace each event in the session such that the events are organized in ascending and/or descending order. In some implementations, the events may be organized utilizing various other techniques (e.g., by event type, by timestamp, by malfunctions, etc.).

In various implementations, the interface circuit 116 of the client device 110 (or third party device 150) may start collecting event logs when application 112 is opened (e.g., selected by the user via an input/output circuit 118 of the client device 110), thus starting a session. In some implementations, once the application is closed by the user the interface circuit 116 may stop collecting event logs, thus ending the session. In various implementations, the user may force clear event logs or force reset application 112 such that the current session may reset, thus ending a particular session and starting a new session. Additional details regarding the interface circuit 116 functionalities, and the dashboards and interfaces presented within a viewport of client device 110 are described in additional detail with reference to FIGS. 2-14.

The input/output circuit 118 is structured to send and receive communications over network 120 (e.g., with response system 130 and/or third-party device 150). The input/output circuit 118 is structured to exchange data (e.g., bundled event logs, content event logs, interactions), communications, instructions, etc. with an input/output component of the response system 130. In one implementation, the input/output circuit 118 includes communication circuitry for facilitating the exchange of data, values, messages, and the like between the input/output circuit 118 and the response system 130. In yet another implementation, the input/output circuit 118 includes machine-readable media for facilitating the exchange of information between the input/output device and the response system 130. In yet another embodiment, the input/output circuit 118 includes any combination of hardware components, communication circuitry, and machine-readable media.

In some embodiments, the input/output circuit 118 includes suitable input/output ports and/or uses an interconnect bus (not shown) for interconnection with a local display (e.g., a touchscreen display) and/or keyboard/mouse devices (when applicable), or the like, serving as a local user interface for programming and/or data entry, retrieval, or other user interaction purposes. As such, the input/output circuit 118 may provide an interface for the user to interact with various applications stored on the client device 110. For example, the input/output circuit 118 includes a keyboard, a keypad, a mouse, joystick, a touch screen, a microphone, a haptic sensor, a car sensor, an IoT sensor, a biometric sensor, an accelerometer sensor, a virtual reality headset, smart glasses, smart headsets, and the like. As another example, input/output circuit 118, may include, but is not limited to, a television monitor, a computer monitor, a printer, a facsimile, a speaker, and so on. As used herein, virtual reality, augmented reality, and mixed reality may each be used interchangeably yet refer to any kind of extended reality, including virtual reality, augmented reality, and mixed reality.

In some implementations, input/output circuit 118 of the client device 110 can receive user input from a user (e.g., via sensors, or any other input/output devices/ports described herein). A user input can be a plurality of inputs, including by not limited to, a gesture (e.g., a flick of client device 110, a shake of client device 110, a user-defined custom gesture (e.g., utilizing an API), biological data (e.g., stress level, heart rate, hand geometry, facial geometry, psyche, and so on) and/or behavioral data (e.g., haptic feedback, gesture, speech pattern, movement pattern (e.g., hand, food, arm, facial, iris, and so on), or combination thereof, etc. In some embodiments, one or more user inputs can be utilized to perform various actions on client device 110.

For example, a user can use a gesture, such as a flick or a shake, to quickly invoke an incident response through the response system 130 from their client device 110. With the use of biological and behavioral data, a user could trigger an incident response, access the vendor marketplace, or recall proof of state using custom-defined gestures via an API with input/output circuit 118. The drag and drop file tokenization feature can also be activated by a gesture, allowing a user to seamlessly tokenize files and secure them on the blockchain with a simple motion or touch on their client device 110.

Input/output circuit 118 may exchange and transmit data information, via network 120, to all the devices described herein. In various implementations, input/output circuit 118 transmits data via network 120. Input/output circuit 118 may confirm the transmission of data. For example, input/output circuit 118 may transmit requests and/or information to response system 130 based on selecting one or more actionable items within the interfaces and dashboards described herein. In another example, input/output circuit 118 may transmit requests and/or information to third party devices 150 operated one or more vendors. In various implementations, input/output circuit 118 can transmit data periodically. For example, input/output circuit 118 may transmit data at a predefined time. As another example, input/output circuit 118 may transmit data on an interval (e.g., every ten minutes, every ten hours, etc.).

The third party device 150 includes application 152, library 154, interface circuit 156, and input/output circuit 158. The application 152, library 154, interface circuit 156, and input/output circuit 158 may function substantially similar to and include the same or similar components as the components of client device 110, such as application 112, library 114, interface circuit 116, and input/output circuit 118, described above. As such, it should be understood that the description of the client device 110, such as application 112, library 114, interface circuit 116, and input/output circuit 118 of the client device 110 provided above may be similarly applied to the application 152, library 154, interface circuit 156, and input/output circuit 158 of the third party device 150. However, instead of a user of a company or institution operations the third party device 150, a vendor or providers (e.g., goods or services) operates the third party device 150.

The response system 130 may include a logic device, which can be a computing device equipped with a processing circuit that runs instructions stored in a memory device to perform various operations. The processing circuit can be made up of various components such as a microprocessor, an ASIC, or an FPGA, and the memory device can be any type of storage or transmission device capable of providing program instructions. The instructions may include code from various programming languages commonly used in the industry, such as high-level programming languages, web development languages, and systems programming languages. The response system 130 may also include one or more databases for storing data and an interface, such as a content management circuit 135, that receives and provides data to other systems and devices on the network 120.

The response system 130 can be run or otherwise be executed on one or more processors of a computing device, such as those described below in FIG. 2. In broad overview, the response system 130 can include a processing circuit 132, a processor 133, memory 134, a content management circuit 135, an analysis circuit 136, a database 140, a front and 142. The interface and dashboards generated by content management circuit 135 can be provided to the client devices 110 and third party devices 150. Generally, the interfaces and dashboards can be rendered at the client devices 110 and/or third party devices 150. The content management circuit 135 can include a plurality of interfaces and properties, such as those described below in FIGS. 2-14. The interfaces and dashboards can execute at the response system 130, the client device 110, the third party devices 150, or a combination of the three to provide the interfaces and dashboards. In some implementations, the interfaces and dashboards generated and formatted by content management circuit 135 can be provided within a web browser. In another implementation, the content management circuit 135 executes to provide the interfaces and dashboards at the client devices 110 and third party devices 150 without utilizing the web browser.

The response system 130 may be a server, distributed processing cluster, cloud processing system, or any other computing device. Response system 130 may include or execute at least one computer program or at least one script. In some implementations, response system 130 includes combinations of software and hardware, such as one or more processors configured to execute one or more scripts. Response system 130 is shown to include database 140 and processing circuit 132. Database 140 may store received data. For example, the database 140 can include data structures for storing information such as, but not limited to, the front end information, interfaces, dashboards, incident information, claim information, user information, vendor information, contact information, invoices, a blockchain ledger, etc. The database 140 can be part of the response system 130, or a separate component that the response system 130, the client device 110, or the third party device 150 can access via the network 120. The database 140 can also be distributed throughout system 100. For example, the database 140 can include multiple databases associated with the response system 130, the client device 110, or the third party device 150, or all three. Database 140 may include one or more storage mediums. The storage mediums may include but are not limited to magnetic storage, optical storage, flash storage, and/or RAM. Response system 130 may implement or facilitate various APIs to perform database functions (i.e., managing data stored in database 140). The APIs can be but are not limited to SQL, ODBC, JDBC, NOSQL and/or any other data storage and manipulation API.

Processing circuit 132 includes processor 133 and memory 134. Memory 134 may have instructions stored thereon that, when executed by processor 133, cause processing circuit 132 to perform the various operations described herein. The operations described herein may be implemented using software, hardware, or a combination thereof. Processor 133 may include a microprocessor, ASIC, FPGA, etc., or combinations thereof. In many implementations, processor 133 may be a multi-core processor or an array of processors. Memory 134 may include, but is not limited to, electronic, optical, magnetic, or any other storage devices capable of providing processor 133 with program instructions. Memory 134 may include a floppy disk, CD-ROM, DVD, magnetic disk, memory chip, ROM, RAM, EEPROM, EPROM, flash memory, optical media, or any other suitable memory from which processor 133 can read instructions. The instructions may include code from any suitable computer programming language.

The data sources 160 can provide data to the response system 130. In some arrangements, the data sources 160 can be structured to collect data from other devices on network 120 (e.g., user devices 110 and/or third-party devices 150) and relay the collected data to the response system 130. In one example, a user and/or entity may have a server and database (e.g., proxy, enterprise resource planning (ERP) system) that stores network information associated with the user and/or entity. In this example, the response system 130 may request data associated with various data stored in the data source (e.g., data sources 160) of the user or entity. For example, in some arrangements, the data sources 160 can host or otherwise support a search or discovery engine for Internet-connected devices. The search or discovery engine may provide data, via the data acquisition engine 180, to the response system 130. In some arrangements, the data sources 160 can be scanned to provide additional data. The additional data can include newsfeed data (e.g., articles, breaking news, and television content), social media data (e.g., Facebook, Twitter, Snapchat, and TikTok), geolocation data of users on the Internet (e.g., GPS, triangulation, and IP addresses), governmental databases, generative artificial intelligence (GAI) data, and/or any other intelligence data associated with the entity of interest.

The system 100 can include a data acquisition engine 180. In various arrangements, the response system 130 can be communicatively and operatively coupled to the data acquisition engine 180. The data acquisition engine 180 can include one or more processing circuits configured to execute various instructions. In various arrangements, the data acquisition engine 180 can be configured to facilitate communication (e.g., via network 120) between the response system 130 and systems described herein. The facilitation of communication can be implemented as an application programming interface (API) (e.g., REST API, Web API, customized API), batch files, and/or queries. In various arrangements, the data acquisition engine 180 can also be configured to control access to resources of the response system 130 and database 140.

The API can be used by the data acquisition engine 180 and/or computing systems to exchange data and make function calls in a structured format. The API may be configured to specify an appropriate communication protocol using a suitable electronic data interchange (EDI) standard or technology. The EDI standard (e.g., messaging standard and/or supporting technology) may include any of a SQL data set, a protocol buffer message stream, an instantiated class implemented in a suitable object-oriented programming language (e.g., Java, Ruby, C#), an XML file, a text file, an Excel file, a web service message in a suitable web service message format (e.g., representational state transfer (REST), simple object access protocol (SOAP), web service definition language (WSDL), JavaScript object notation (JSON), XML remote procedure call (XML RPC)). As such, EDI messages may be implemented in any of the above or using another suitable technology.

In some arrangements, data is exchanged by components of the data acquisition engine 180 using web services. Where data is exchanged using an API configured to exchange web service messages, some or all components of the computing environment may include or may be associated with (e.g., as a client computing device) one or more web service node(s). The web service may be identifiable using a unique network address, such as an IP address, and/or a URL. Some or all components of the computing environment may include circuits structured to access and exchange data using one or more remote procedure call protocols, such as Java remote method invocation (RMI), Windows distributed component object model (DCOM). The web service node(s) may include a web service library including callable code functions. The callable code functions may be structured according to a predefined format, which may include a service name (interface name), an operation name (e.g., read, write, initialize a class), operation input parameters and data type, operation return values and data type, service message format, etc. In some arrangements, the callable code functions may include an API structured to access on-demand and/or receive a data feed from a search or discovery engine for Internet-connected devices. Further examples of callable code functions are provided further herein as embodied in various components of the data acquisition engine 180.

The data sources 160 can provide data to the response system 130 based on the data acquisition engine 180 scanning the Internet (e.g., various data sources and/or data feeds) for data associated with a user or entity (e.g., vendor, insurer). That is, the data acquisition engine 180 can hold (e.g., in non-transitory memory, in cache memory, and/or in database 140) the executables for performing the scanning activities on the data sources 160. Further, the response system 130 can initiate the scanning operations. For example, the response system 130 can initiate the scanning operations by retrieving domain identifiers or other user/entity identifiers from a computer-implemented DBMS or queue. In another example, a user can affirmatively request a particular resource (e.g., domain or another entity identifier) to be scanned, which triggers the operations. In various arrangements, the data sources 160 can facilitate the communication of data between the client devices 140 and third party devices 150, such that the data sources 160 receive data (e.g., over network 120) from the client devices 140 and third-party devices 150 before sending the data other systems described herein (e.g., response system 130). In other arrangements and as described herein, the client devices 140 and third-party devices 150, and the data sources 160 can send data directly, over the network 120, to any system described herein and the data sources 160 may provide information not provided by any of the client devices 140 and third party devices 150.

As used herein, the terms "scan" and "scanning" refer to and encompass various data collection operations, which may include executing and/or causing to be executed any of the following operations: query(ies), search(es), web crawl(s), interface engine operations structured to allow the data acquisition engine 180 to activate an appropriate system interface to continuously or periodically receive inbound data, document search(es), dataset search(es), retrieval from internal systems of previously received data, etc. These operations can be executed on-demand and/or on a scheduled basis. In some embodiments, these operations include receiving data (e.g., device connectivity data, IP traffic data) in response to requesting the data (e.g., data "pull" operations). In some embodiments, these operations include receiving data without previously requesting the data (e.g., data "push" operations). In some embodiments, the data "push" operations are supported by the interface engine operations.

One of skill will appreciate that data received as a result of performing or causing scanning operations to be performed may include data that has various properties indicative of device properties, hardware, firmware, software, configuration information, and/or IP traffic data. For example, in an arrangement, a device connectivity data set can be received. In some embodiments, device connectivity data can include data obtained from a search or discovery engine for Internet-connected devices which can include a third-party product (e.g., Shodan), a proprietary product, or a combination thereof. Device connectivity data can include structured or unstructured data.

Various properties (sometimes referred to as "attributes") (e.g., records, delimited values, values that follow particular pre-determined character-based labels) can be parsed from the device connectivity data. The properties can include device-related data and/or IP traffic data. Device-related data can encompass data related to software, firmware, and/or hardware technology deployed to, included in, or coupled to a particular device. Device-related data can include IP address(es), software information, operating system information, component designation (e.g., router, web server), version information, port number(s), timestamp data, host name, etc. IP traffic data can include items included in packets, as described elsewhere herein. Further, IP traffic data included in the device connectivity data can include various supplemental information (e.g., in some arrangements, metadata associated with packets), such as host name, organization, Internet Service Provider information, country, city, communication protocol information, and Autonomous System Number (ASN) or similar identifier for a group of devices using a particular defined external routing policy. In some embodiments, device connectivity data can be determined at least in part based on banner data exposed by the respective source vendor or insurer. For example, device connectivity data can include metadata about software running on a particular device of a source entity.

In various arrangements, vendors and users can utilize Internet-wide scanning tools (e.g., port scanning, network scanning, vulnerability scanning, Internet Control Message Protocol (ICMP) scanning, TCP scanning, UDP scanning, semi-structured and unstructured parsing of publicly available data sources) for collecting data (e.g., states and performance of companies, corporations, users). Further, in addition to this data, other data collected and fused with the data obtained via scanning may be newsfeed data (e.g., articles, breaking news, television), social media data (e.g., Facebook, Twitter, Snapchat, TikTok), geolocation data of users on the Internet (e.g., GPS, triangulation, IP addresses), governmental databases, and any other data associated with the user or entity (e.g., vendor or insurer), their capabilities, configurations, cyber insurance policy, coverage, attestations, questionnaires and overall state of aforementioned attributes.

In some arrangements, scanning occurs in real-time such that the data acquisition engine 180 continuously scans the data sources 160 for data associated with a vendor or user (e.g., real-time states of vendors or users, real-time threats, real-time performance). In various arrangements, scanning may occur in periodic increments such that the data acquisition engine 180 can scan the Internet for data associated with the vendor or user periodically (e.g., every minute, every hour, every day, every week, and any other increment of time.) In some embodiments, data acquisition engine 180 may receive feeds from be various data aggregating systems that collect data associated with vendors or users. For example, the response system 130 can receive vendor or user data from the data sources 160, via the network 120 and data acquisition engine 180. The information collected by the data acquisition engine 180 may be stored in database 140. In some arrangements, an entity (e.g., company, vendor, insurer, any service or goods provider, etc.) may submit data to response system 130 and provide information about their products or services, pricing, capabilities, statuses, etc., which may be stored in database 140.

Memory 134 may include analysis circuit 136. The analysis system 136 can be configured to perform data fusion operations, including operations to generate and/or aggregate various data structures stored in database 140, which may have been acquired as a result of scanning operations or via another EDI process. For example, the analysis circuit 136 can be configured to aggregate entity data stored in the database 140. The entity data may be a data structure associated with an entity and include various data from a plurality of data channels. In some embodiments, the analysis circuit 136 can be configured to aggregate line-ofbusiness data stored in the database 140. The line-of-business data may be a data structure associated with a plurality of line-of-business of an entity and indicate various data from a plurality of data channels based on line-of-business (e.g., information technology (IT), legal, marketing and sales, operations, finance and accounting).

The analysis circuit 136 can also be configured to receive a plurality of user and entity data. In some arrangements, the analysis circuit 136 can be configured to receive data regarding the network 120 as a whole (e.g., stored in database 140) instead of data specific to particular users or entities. The received data that the analysis circuit 136 receives can be data that response system 130 aggregates and/or data that the response system 130 receives from the data sources 160 and/or any other system described herein. As previously described, the response system 130 can be configured to receive information regarding various entities and users on the network 120 (e.g., via device connectivity data). Further, the response system 130 can be configured to receive and/or collect information regarding interactions that a particular user or entity has on the network 120 (e.g., via IP traffic data). Further, the response system 130 can be configured to receive and/or collect additional information. Accordingly, the received or collected information may be stored as data in database 140. In various arrangements, the database 140 can include user and entity profiles.

The response system 130 can be configured to electronically transmit information and/or notifications relating to various metrics, dashboards (e.g., graphical user interfaces) and/or models it determines, analyzes, fuses, generates, or fits to user data, entity data, and/or other data. This may allow a user of a particular one of the client devices 110 and third party devices 150 to review the various metrics, dashboards, or models which the response system 130 determines. Further, the response system 130 can use the various metrics to identify remediation actions for users and entities. The analysis circuit 136 implements data fusion operations of the response system 130. In various arrangements, the analysis circuit 136 can be configured to receive a plurality of data (e.g., user and entity data) from a plurality of data sources (e.g., database 140, client devices 140, third party devices 150, data sources 160) via one or more data channels (e.g., over network 120). Each data channel may include a network connection (e.g., wired, wireless, cloud) between the data sources and the response system 130.

In some arrangements, the analysis circuit 136 can also be configured to collect a plurality of data from a particular data source or from a plurality of data sources based on electronically transmitting requests to the data sources via the plurality of data channels, managed and routed to a particular data channel by the data acquisition engine 180. A request submitted via the data acquisition engine 180 may include a request for scanning publicly available information exposed by a user or entity. In some embodiments, the request submitted via the data acquisition engine 180 may include information regarding access-controlled data being requested from the user or entity. In such cases, the request can include trust verification information sufficient to be authenticated by the target entity (e.g., multi-factor authentication (MFA) information, account login information, request identification number, a pin, certificate information, a private key of a public/private key pair). This information should be sufficient to allow the target entity to verify that a request is valid.

In various arrangements, the analysis circuit 136 can be configured to initiate a scan, via the data acquisition engine 180, for a plurality of data from a plurality of data sources based on analyzing device connectivity data, vendor information, scheduling information (e.g., team members), network properties (e.g., status, nodes, element-level (sub-document level), group-level, network-level, size, density, connectedness, clustering, attributes) and/or network information (e.g., IP traffic, domain traffic, sub-domain traffic, connected devices, software, infrastructure, bandwidth) of a target computer network environment and/or environments of the entity or associated with the entity. The operations to fuse various properties of data returned via the scan can include a number of different actions, which can parse device connectivity data, packet segmentation, predictive analytics, cross-referencing to data regarding known vulnerabilities, and/or searching data regarding application security history. These operations can be performed to identify costs of vendors, services offered, hosts, ports, and services in a target computer network environment. The target computer network environment can be identified by a unique identifier, such as a domain identifier (e.g., a top-level domain (TLD) identifier, a subdomain identifier, a URL string pointing to a particular directory), an IP address, a subnet, etc. Further, the target computer network environment can be defined with more granularity to encompass a particular component (e.g., an entity identified by an IP address, software/applications/operating systems/exposed API functions associated with a particular port number, IP address, subnet, domain identifier). In some arrangements, one or more particular target computer network environments can be linked to an entity profile (e.g., in the database 140). In one example, scanning can include parsing out packet and/or device connectivity data properties that may indicate available UDP and TCP network services running on the target computer network environment. In another example, scanning can include parsing out packet and/or device connectivity data that indicates the operating systems (OS) in use on the target computer network environment.

In various arrangements, vendor information can be determined based accessing a vendor device (e.g., 150) or website of the vendor to collect vendor information (e.g., via an API call). In various arrangements, vulnerabilities and incidents can be determined based on any software feature, hardware feature, network feature, or combination of these, which could make an entity vulnerable to cyber threats, incidents, such as hacking activities, data breaches, and cyberattacks. In turn, cyber-threats (sometimes referred to herein as "cyber-indents" or "incidents") increase the probability of cyber-incidents. Accordingly, a vulnerability or incident can be a weakness that could be exploited to gain unauthorized access to or perform unauthorized actions in a computer network environment (e.g., system 100). For example, obsolete computing devices and/or obsolete software may present vulnerabilities and/or threats in a computer network environment. In another example, certain network frameworks may present vulnerabilities and/or threats in a computer network environment. In yet another example, business practices of an entity may present vulnerabilities and/or threats in a computer network environment. In yet another example, published content on the Internet may present vulnerabilities in a computer network environment. In yet another example, third-party computing devices and/or software may present vulnerabilities and/or threats in a computer network environment. Accordingly, as shown, all devices (e.g., servers, computers, any infrastructure), all data (e.g., network information, vendor data, network traffic, user data, certificate data, public and/or private content), all practices (e.g., business practices, security protocols), all software (e.g., frameworks, protocols), and any relationship an entity has with another entity can present vulnerabilities and/or threats in a computer network environment that could lead to one or more cyber-incidents.

In broad view, the analysis circuit 136 can also be configured to receive company and vendor information regarding the company/vendor. In some implementations, the analysis circuit 136 can receive a registration request and register user accounts (e.g., accounts). For example, a user of library 114 may register their user account with a client device such that the client device 110 can execute the library 114 and perform various actions. Registering a client device 110 or user (or vendor) can include, but not limited to, providing various identifying information (e.g., device name, geolocation, identifier, etc.), platform designations (e.g., iOS, Android, WebOS, BlackBerry OS, etc.), user actions (e.g., activation gesture, haptic, biometric, etc.), authentication information (e.g., username, password, two-step criteria, security questions, address information, etc.). Once the analysis circuit 136 approves a registration request, the information associated with the request may be stored in database 140. Additionally, a notification may be transmitted to the client device 110 indicating the user, vendor, or client device 110 (or third party device 150) is registered and can utilize the dashboards to perform actions associated with one or more applications.

In various implementations, analysis circuit 136 performs statistical operations on received data to produce statistical measurements describing the received data. For example, analysis circuit 136 may determine capabilities of individuals, objectives, cost estimates, etc. In various implementations, the statistical operations can be calculated based on performing various statistical operations and analysis. In some implementations, received data and previously collected data stored in database 140 can be used to train a machine-learning model. That is, predictions regarding vulnerabilities and incidents could be based on artificial intelligence or a machine-learning model. For example, a first machine-learning model may be trained to identify particular incidents and output a prediction. In this example, a second machine-learning model may be trained to identify remediation actions based on incident. In various implementations, machine learning algorithms can include, but are not limited to, a neural network, convolutional neural network, recurrent neural network, linear regression model, and sparse vector machine). The various computing systems/devices described herein can input various data (e.g., event logs, debugging information and so on) into the machine learning model, and receive an output from the model indicating a particular action to perform. In some implementations, analysis circuit 136 can be configured to perform source testing on one or more networks. Source testing on one or more networks can include performing various test plans. During the source testing, various malfunctions and exceptions can be identified. Additionally, the network can be identified such that the testing occurs on a designated network (e.g., or multiple designated content networks).

Memory 134 also includes content management circuit 135. The content management circuit 135 may be configured to generate content for displaying to users and vendors. The content can be selected from among various resources (e.g., webpages, applications). The content management circuit 135 is also structured to provide content (e.g., via a graphical user interface (GUI)) to the user devices 140 and/or third party devices 150), over the network 120, for display within the resources. For example, in various arrangements, a claim dashboard or incident response dashboard may be integrated in a mobile application or computing application or provided via an Internet browser. The content from which the content management circuit 135 selects may be provided by the response system 130 via the network 120 to one or more user devices 110 and/or third party devices 150. In such implementations, the content management circuit 135 may determine content to be generated and published in one or more content interfaces of resources (e.g., webpages, applications).

The content management circuit 135 can be configured to interact with a database management system or data storage vault, where clients can obtain or store information. Clients can use queries in a formal query language, inter-process communication architecture, natural language or semantic queries to obtain data from the DBMS. In some implementations, one or more clients obtain data from the DBMS using queries in a custom query language such as a Visualization API Query Language. In some implementations, the content management circuit 135 can be configured to provide one or more customized dashboards (e.g., stored in database 140) to one or more computing devices (e.g., user devices 140, third party devices 150) for presentation. That is, the provided customized dashboards (also referred to herein as "customized interface") can execute and/or be displayed at the computing devices described herein. In some arrangements, the customized dashboards can be provided within a web browser or installed application. In some arrangements, the customized dashboards can include PDF files. In some arrangements, the customized dashboards can be provided via email. According to various arrangements, the customized dashboards can be provided on-demand or as part of push notifications.

In various arrangements, the content management circuit 135 executes operations to provide the customized dashboards to the user devices 140 and third party devices 150, without utilizing the web browser. In various arrangements, the customized dashboards can be provided within an application (e.g., mobile application, desktop application). The dashboard from which the content management circuit 135 generates may be provided to one or more users or entities, via the network 120. In some arrangements, the content management circuit 135 may select dashboards and/or interfaces associated with the user or entity to be displayed on the user devices 140 or third party devices 150. Additional details regarding the dashboards and the content presented are described in detail with reference to FIGS. 2-14.

In an example arrangement, an application executed by the user devices 140 and/or third party devices 150 can cause the web browser to display on a monitor or screen of the computing devices. For example, the user may connect (e.g., via the network 120) to a website structured to host the customized dashboards. In various arrangements, hosting the customized dashboard can include infrastructure such as host devices (e.g., computing device) and a collection of files defining the customized dashboard and stored on the host devices (e.g., in a database). The web browser operates by receiving input of a uniform resource locator (URL) into a field from an input device (e.g., a pointing device, a keyboard, a touchscreen, mobile phone, or another form of input device). In response, the content management circuit 135 executing the web browser may request data such as from the database 140. The web browser may include other functionalities, such as navigational controls (e.g., backward and forward buttons, home buttons, other navigational buttons or items). The content management circuit 135 may execute operations of the database 140 (or provide data from the database 140 to the user devices 140, and/or third-party devices 150 for execution) to provide the customized dashboards at the user devices 140 and/or third-party devices 150.

In some arrangements, the content management circuit 135 can include both a client-side application and a server-side application. For example, a content management circuit 135 can be written in one or more general purpose programming languages and can be executed by user devices 140 and/or third-party devices 150. The server-side content management circuit 135 can be written, for example, in one or more general purpose programming, or a concurrent programming language, and can be executed by the response system 130. The content management circuit 135 can be configured to generate a plurality of customized dashboards and their properties, such as those described in detail below relative to example FIGS. 7-21. The content management circuit 135 can generate customized user-interactive dashboards for one or more users and entities, such as the client device 110 and third party devices 150, based on data received, collected, and/or aggregated from the analysis circuit 136, any other computing device described herein, and/or any database described herein (e.g., 140).

The generated dashboards can include various data (e.g., data stored in database 140 and/or data sources 160) associated with one or more entities including scheduling information, profile information, cybersecurity risk and/or vulnerabilities cybersecurity vulnerabilities (e.g., malware, unpatched security vulnerabilities, expired certificates, hidden backdoor programs, super-user and/or admin account privileges, remote access policies, other policies and procedures, type and/or lack of encryption, type and/or lack of network segmentation, common injection and parameter manipulation, automated running of scripts, unknown security bugs in software or programming interfaces, social engineering, and IoT devices), insurer and vendor information (e.g., policies, contracts, products, services, underwriting, limitations), incident information, cyberattack information (e.g., phishing attacks, malware attacks, web attacks, and artificial intelligence (AI)-powered attacks), remediation items, remediation actions/executables, security reports, data analytics, graphs, charts, historical data, historical trends, vulnerabilities, summaries, help information, domain information, and/or subdomain information. As used herein, a "cyber-incident" may be any incident where a party (e.g., user, individual, institution, company) gains unauthorized access to perform unauthorized actions in a computer network environment. The database 140 can also include data structures for storing information such as system definitions for customized dashboards generated by content management circuit 135, animated or other content items, actionable objects, graphical user interface data, and/or additional information.

The analysis circuit 136 can be configured to determine organization incident readiness. Readiness is the process an organization follows to prepare for a cyber incident before it happens. This includes entering information that may be used at the initiation of an incident by incident response teams and breach counsel. Readiness levels are calculated by binary completion of the n tasks that are included in that organization's readiness activities. An organization with 10 readiness steps and 5 completed shows as 50%. In some implementations, determining organization incident readiness can include integrating readiness (e.g., insurer data and other vendor data) into third party devices 150. For example, the insurer data of a company's insurer can be recorded and stored at a third party device 150. In various implementations, determining organization incident readiness can include the analysis circuit determining organization capabilities, limitations, cyber threats, and focus associated with cyber threats. Additionally, organization incident readiness can be provided to incident response providers (e.g., security providers, firmware providers, software providers, infostructure providers). The analysis circuit 136 can also be configured to automatically route incidents and claims to vendors associated with a company or user (e.g., client device 110) and in turn contracting and activating an incident response. In some implementations, a response plan can be submitted by a company and the analysis circuit 136 can decompose and analyze the response plan to determine actionable tasks and activities to complete (e.g., by the company or after contracting with a vendor).

In various implementations, the determined organization incident readiness can be stored (e.g., by the analysis circuit 136) as a block in a blockchain (or on a ledger) that can metadata identifying the readiness including, but not limited to, a time stamp, proof of date, and artifacts. In various implementations, the data regarding key milestones (e.g., capabilities pre-incident, what happened after the incident occurred, root cause, recoding) can be stored on a blockchain (e.g., such that it is immutable). In particular, key milestones can be traceable and linkable within a blockchain (or ledger) such that issues can be identified, actionable tasks can be tracked, work is routed to vendors (e.g., 150), and proof of resolution is recorded. In some implementations, database 140 can include a plurality of ledgers or blockchains and the database 140 can be a node of a plurality of nodes on a ledger or blockchain. It should be understood that the various data and information described herein can be implemented on a blockchain. For example, the blockchain can be used to provide for irrefutable proof in a data set of the data, locations, capabilities, configurations, that were in place prior to an incident. In another example, the block can be used to link the incident occurrence with what worked (e.g., effective in preventing an incident) and what did not work (e.g., vulnerability that led to the incident). For example, the irrefutable permanent ledgers (or blockchain) may be used by users at points in the process where they wish to record proofs on chain. This may include configurations, capabilities, assets, policies, threats, actors, claims, incident reports, cyber threat intelligence artifacts, and any other state-based attribute that needs to be recorded and may be shared with others to irrefutably prove that the state of that attribute was "x" at time "t". Combinations of attributes for different data, assets, configurations, capabilities, are collected and rolled up to show if any elements have changed through the use of Merkel Trees, allowing a check of the top-most hash of the combination of downstream values facilitating a single checkpoint to determine if any other elements and configurations, combinations of parameters is the same or if they have changed.

In various implementations, the analysis circuit 136 can intake potential or current incidents based on an embedded widget on remote web sites or within remote web applications. This allows an incident response provider or vendor (sometimes referred to herein as "IR providers" or IR vendors") the ability to seamlessly intake incident response requests for assistance from their web site or one of their sales channel partner sites and have it load into the incident intake process within responder. In turn, an embedded widget could be communicably coupled to the analysis circuit 136 (e.g., via network 120) to allow the analysis circuit to start an incident response process (e.g., at proposal stage) and continue through a workflow to achieve response readiness based on pre-defined logic or rules. This rule mechanism can allow for the user to specify attributes, collection of attributes, order, and routing method for connecting inbound requests to those who are best-fit to execute on the requests. For example, when an inbound instance of an incident response can be routed to a claim manager based on pre-defined logic or rules, such as to route inbound cases to the IR provider that is active currently, or to the provider who specializes in ransomware extortion cases where the ransom exceeds 10 million, or to round-robin inbound cases among a set of panel IR providers, etc.

In some implementations, the analysis circuit 136 can facilities invoice processing within an incident response process across different insurers. Furthermore, throughout an incident response conditions can be modified, added, or removed to route tasks (or work) to different vendors or partners (e.g., 150). In some implementations, the analysis circuit 136 can also be configured to collect incident submission data, normalize the data (e.g., based on historical data or trends), and automatically submit insurance claims based on the normalized data. Moreover, the analysis circuit 136 can connect the underlying root cause to the capability failure or procedural issue and have that data submitted with the insurance claim. For example, the analysis circuit 136 can connect underlying root cause back to the insurers underwriting questions. In various implementations, the analysis circuit 136 can integrate organization incident readiness into all related parties to a company. As such, the analysis circuit 136 can integrate incident response activation and collaborative across business, teams, insurers, etc. Further, the analysis circuit 136 can be configured to link the root cause of an incident to the capability failure or procedural issue and then link back the insurers underwriting questions.

The content management circuit 135 can also be configured to allow a user (e.g., of a company) to purchase and extended services via the generated dashboards. In some implementations, the content management circuit 135 allows the user (e.g., via a step through process) to integrate into technology and vendors to resolve issues (e.g., incidents) and/or prevent incidents in the future. For example, the dashboards can provide users integration points for incident response workflow management. As such, the content management circuit 135 can generate dashboards (and/or interfaces) on an application (e.g., 112 or 152) for purchasing products, insurances, and services. In particular, the generated dashboards can provide users of the application with a unified (or universal) view of tasks, activities, and progress/status tracking of incidents, claims, etc. The dashboards can also tie back to incident readiness and managing the incidents through resolution. The content management circuit 135 can also generate the dashboards to include collaboration tools (e.g., video calls, calendar, chats), and the dashboards can include real-time status tracking of policies, incidents, claims, insurers such that policy aligned tasks and status updated can be provide for incident responses and claims.

Figure 1B:
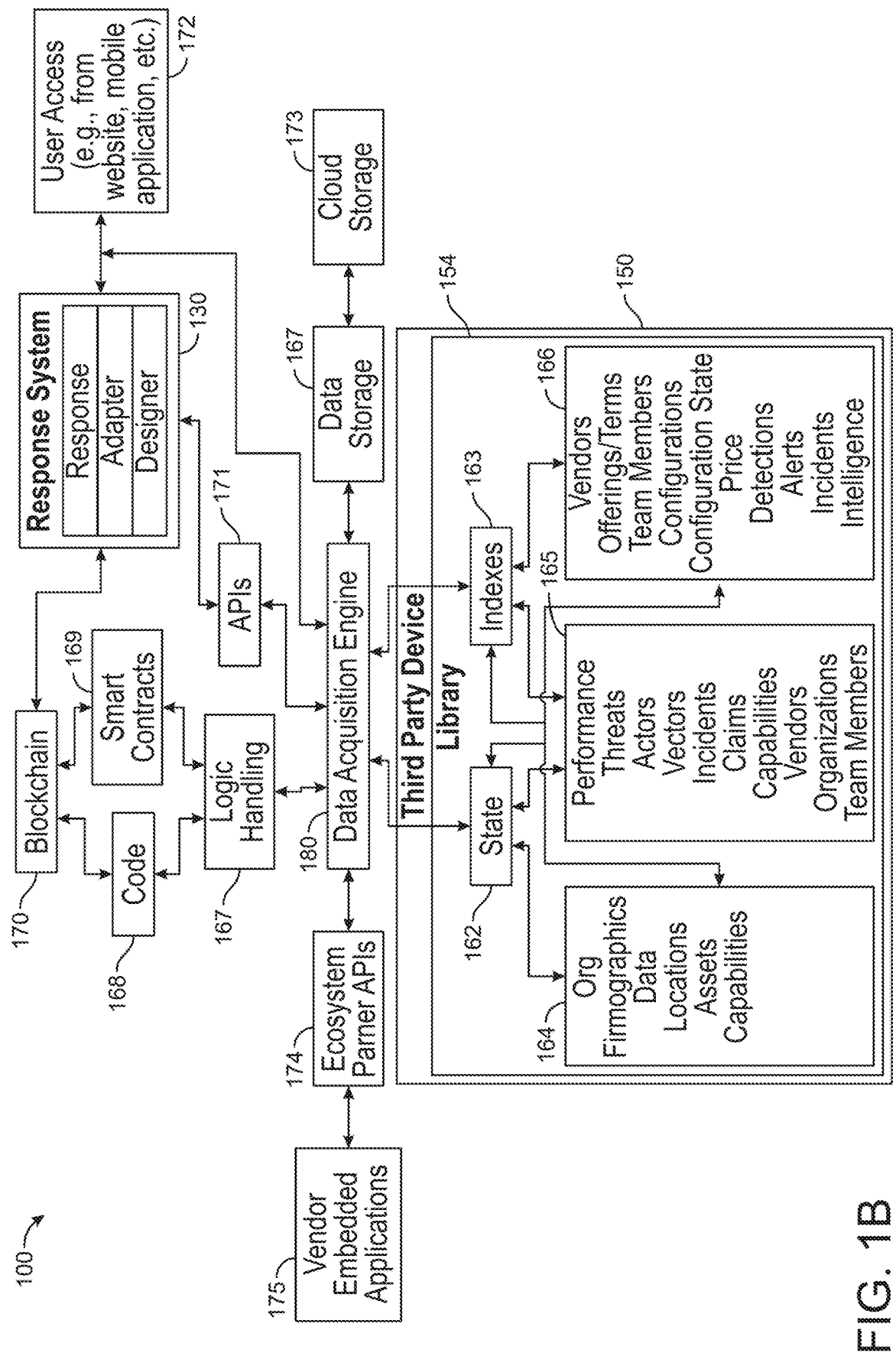
FIG. 1B depicts a block diagram of a more detailed architecture of certain systems or devices of FIG. 1A, according to some arrangements.

Referring now to FIG. 1B, a block diagram depicting a more detailed architecture of certain systems or devices of system 100. System 100 includes the data acquisition engine 180 and response system 130 described in detail with reference to FIG. 1A. However, it should be understood that the response system 130 also encompasses the capability to generate content and dashboards tailored for each aspect of the response process, including the response, adapter, and designer components. These content and dashboards are generated by the content management circuit 135 and can be seen in various figures ranging from FIGS. 2-14.

To illustrate further, the response system 130 facilitates the presentation of diverse information related to an organization's security and threats through the adapter dashboard and architecture. This facilitates an understanding of the security landscape and helps inform decision-making processes. Additionally, the dashboard functionality can be customized by the vendor and/or organization using the designer dashboard and architecture. This empowers them to tailor the visual representation of data, making it more intuitive and aligned with their requirements. Furthermore, the responder dashboard and architecture provided by the response system 130 allows the vendor and/or organization to effectively prepare for, track, and update incidents and readiness. This dashboard encompasses the entire incident response lifecycle, from the initial incident detection and response through to the final incident closure and claim submission. By leveraging the responder dashboard and architecture, the vendor and/or organization can facilitate smooth incident management, streamline processes, and facilitate efficient collaboration among stakeholders.

In the depicted architecture, both organizations and vendors operating the third party devices 150 or client devices 110 have the ability to store states 162 and indexes 163 within the library 154 (or library 114). In some implementations, these states 162 and indexes 163 can be determined based on data derived from various datasets, including the organization dataset 164, performance dataset 165, and vendor dataset 166.

In some implementations, the organization dataset 164 encompasses a wide range of information such as firmographics, data related to locations, assets, and capabilities of the third-party or client organization. This dataset provides an understanding of the organization's profile and resources. In some implementations, the performance dataset 165 includes diverse sets of data, including threat data, actor data, vector data, incident data, claim data, capability data, vendor data, organization data, and team member data. These performance-related datasets capture information for assessing the organization's security posture, incident history, and overall operational performance. They facilitate effective monitoring, analysis, and decision-making in incident response activities. In some implementations, the vendor dataset 166 contains information related to offerings (cybersecurity protection plans), terms, team member data, configuration data, configuration state data, pricing data, detection data, alert data, incident data, and intelligence data. This dataset allows organizations to gain insights into the capabilities and services provided by vendors, facilitating informed decision-making when selecting and collaborating with vendors.

In general, the states 162 and indexes 163, derived from the datasets, are utilized as input by the data acquisition engine 180 (or analysis circuit 136) to output a security posture. In some implementations, the data acquisition engine 180 is configured to scan and perform data collection based on accessing vendor embedded applications 175, via ecosystem partner APIs 174. This facilitates integration with vendor systems, allowing for efficient retrieval and synchronization of relevant data. In the depicted architecture, the states 162 and indexes 163 improve the efficient operations of the response system 130. These states 162 and indexes 163 can stored within the library 154 (or library 114) and are determined based on data from various datasets, including the organization dataset 164, performance dataset 165, and vendor dataset 166.

In some implementations, the states 162 represent the current condition or status of the organization or vendor operating the third-party 150 or client devices 110. They encapsulate information such as system configurations, security policies, incident response readiness, and other relevant parameters. By maintaining these states, the response system 130 can quickly access and reference the most up-to-date information about the organization's or vendor's environment. Additionally, in some implementations, the indexes 163 serve as pointers or references to data or resources within the library 154 (or library 114). They streamline the retrieval and access of information, ensuring efficient data processing and analysis. These indexes are designed to optimize search operations and allow access to relevant datasets, contributing to the overall responsiveness and effectiveness of the response system 130.

Accordingly, to verify the accuracy and currency of the states 162 and indexes 163, the data acquisition engine 180 can be configured to scan and collect data by interacting with the vendor embedded applications 175. The communication can occur through ecosystem partner APIs 174, establishing a connection between the response system 130 and the embedded applications 175 used by vendors. Through this communication, the data acquisition engine 180 can retrieve real-time (or near real-time) information from the vendor's systems, including offerings, configurations, alerts, incidents, and other relevant data. In some implementations, the engine 180 can utilize the retrieved data to update and synchronize the states 162 and indexes 163, providing that the response system 130 has the latest and accurate information to support incident response activities.

Expand further on states 162 and indexes 163, the data acquisition engine 180 can maintain the security posture of the organization. That is, the data acquisition engine 180 can actively check a vendor's API for any changes in the configuration "State," the data acquisition engine 180 that the security posture remains up to date and aligned with the evolving environment. By recording these configuration updates to the corresponding index, the data acquisition engine 180 and response system 130 establishes a view of the organization's security landscape. This approach goes beyond static assessments and provides a dynamic and real-time perspective on the organization's security posture. By linking the configuration data with real incident data and other relevant metadata, the response system 130 enhances the accuracy and actionability of the match, facilitating quick and effective response to potential threats. In various arrangements, this continuous monitoring and adaptation of the security posture over time is provided and/or presented in a posture stream (as shown with reference to FIG. 18A), which captures and analyzes the evolving information. As new data points are gathered and recorded in the posture stream, the response system 130 can execute proactive incident response activities.

As used herein, a "security posture" refers to the current state and overall cybersecurity profile of an organization or vendor. It is determined based on various factors and information collected from entity data, including system configurations, security policies, incident response readiness, and other relevant parameters. In some arrangements, the data acquisition engine 180 (or analysis circuit 136) scans and collects data from vendor embedded applications through ecosystem partner APIs, ensuring the accuracy and currency of the states and indexes used to represent the security posture. In various arrangements, the analysis circuit 136 utilizes a distributed ledger to tokenize and broadcast the security posture, ensuring transparency and immutability. The analysis circuit 136 can also be configured to model the security posture and multiple security objectives to generate a set of cybersecurity attributes specific to the entity.

Furthermore, the data acquisition engine 180 is shown to gather data from blockchain 170 (e.g., ledgers storing various immutable information about entities, vendors, and corporations) via code 168 and smart contracts 169 that are executed by logic handling 167 (e.g., of the data acquisition engine 180). In some implementations, data acquisition engine 180 can communicate with response system 130 directly (e.g., via a wired or hard-wired connection) or via APIs 171. To allow user access and interaction with the dashboards and content generated by the response system 130, user access 172 is provided. Users, including organizations, vendors, and entities, can access the dashboards and content through dedicated applications such as application 112 or application 152. These applications can be accessed through user devices, such as client device 110, or through third-party devices 150.

Additionally, user access 172 to the dashboards and content can be provided to users (e.g., organizations, vendors, entities) via an application (e.g., 112 or 152) a user device (e.g., 110) and/or third party device 150. Additional, fewer, or different systems and devices can be used. It is important to note that the depicted system and devices are not exhaustive, and additional, fewer, or different systems and devices may be employed depending on implementation requirements. The architecture can be tailored to suit the unique needs of organizations, vendors, and entities, allowing for flexibility and customization in the deployment of the response system 130.

In addition to gathering data from the blockchain 170, the response system 130 can establish a communication channel with the blockchain 170. This communication allows the response system 130 to interact with the blockchain 170 in a secure and decentralized manner. By accessing the blockchain 170, the response system 130 can leverage its inherent properties of immutability, transparency, and distributed consensus to enhance the integrity and reliability of incident-related data and information. Accordingly, the response system 130 can use blockchain 170 to record and verify incident data, maintain an auditable trail of actions and transactions, and ensure the integrity of information throughout the incident response process.

It will be recognized that some or all of the figures are schematic representations for purposes of illustration. The figures are provided for the purpose of illustrating one or more embodiments with the explicit understanding that they will not be used to limit the scope or the meaning of the claims.

Figure 2:
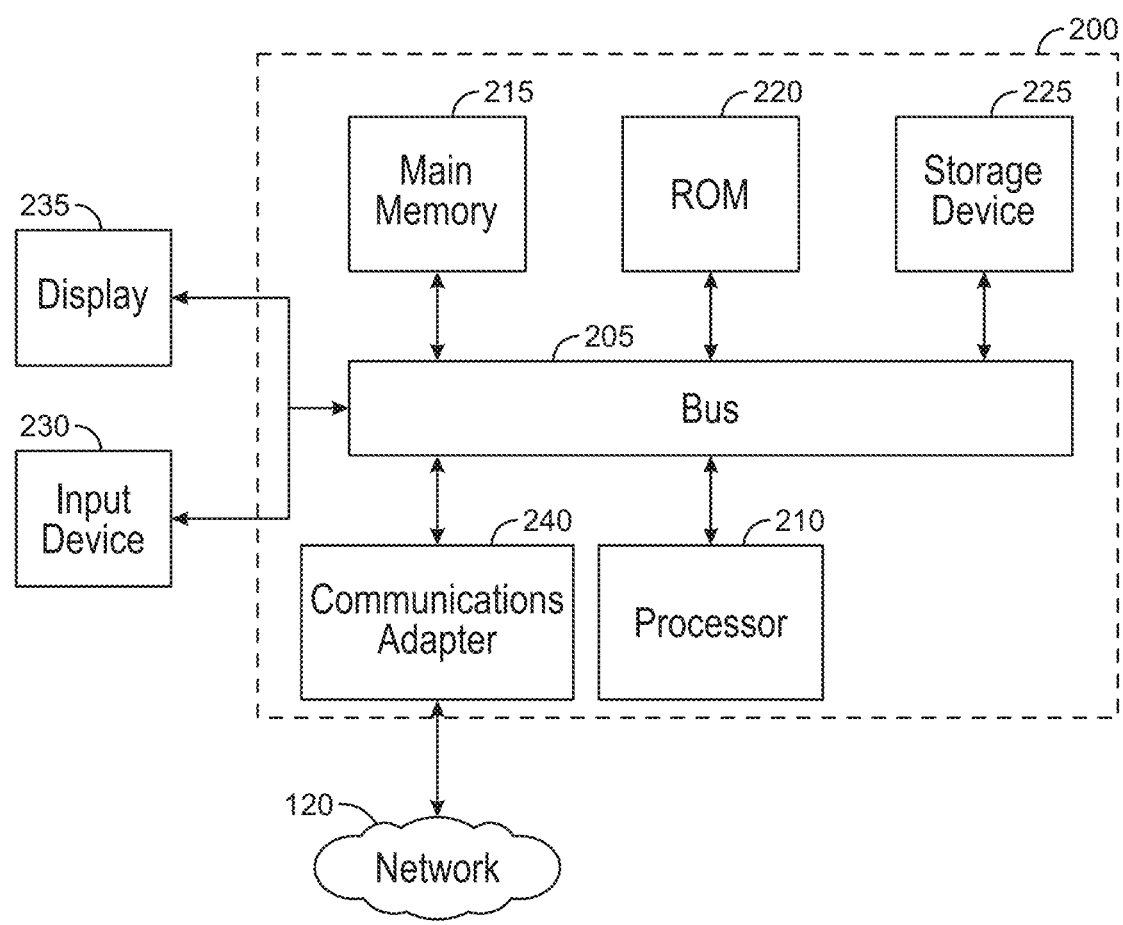
FIG. 2 depicts a computer system, according to some arrangements.

Referring now to FIG. 2, a depiction of a computer system 200 is shown. The computer system 200 that can be used, for example, to implement a system 100, response system 130, client devices 110, third party devices 150, data sources 160, and/or various other example systems described in the present disclosure. The computing system 200 includes a bus 205 or other communication component for communicating information and a processor 210 coupled to the bus 205 for processing information. The computing system 200 also includes main memory 215, such as a random-access memory (RAM) or other dynamic storage device, coupled to the bus 205 for storing information, and instructions to be executed by the processor 210. Main memory 215 can also be used for storing position information, temporary variables, or other intermediate information during execution of instructions by the processor 210. The computing system 200 may further include a read only memory (ROM) 220 or other static storage device coupled to the bus 205 for storing static information and instructions for the processor 210. A storage device 225, such as a solid-state device, magnetic disk or optical disk, is coupled to the bus 205 for persistently storing information and instructions.

The computing system 200 may be coupled via the bus 205 to a display 235, such as a liquid crystal display, or active matrix display, for displaying information to a user. An input device 230, such as a keyboard including alpha-numeric and other keys, may be coupled to the bus 205 for communicating information, and command selections to the processor 210. In another arrangement, the input device 230 has a touch screen display 235. The input device 230 can include any type of biometric sensor, a cursor control, such as a mouse, a trackball, or cursor direction keys, for communicating direction information and command selections to the processor 210 and for controlling cursor movement on the display 235.

In some arrangements, the computing system 200 may include a communications adapter 240, such as a networking adapter. Communications adapter 240 may be coupled to bus 205 and may be configured to facilitate communications with a computing or communications network 120 and/or other computing systems. In various illustrative arrangements, any type of networking configuration may be achieved using communications adapter 240, such as wired (e.g., via Ethernet), wireless (e.g., via Wi-Fi, Bluetooth), satellite (e.g., via GPS) pre-configured, ad-hoc, LAN, WAN.

According to various arrangements, the processes that effectuate illustrative arrangements that are described herein can be achieved by the computing system 200 in response to the processor 210 executing an arrangement of instructions contained in main memory 215. Such instructions can be read into main memory 215 from another computer-readable medium (e.g., CRM, non-transitory memory, etc.), such as the storage device 225. Execution of the arrangement of instructions contained in main memory 215 causes the computing system 200 to perform the illustrative processes described herein. One or more processors in a multi-processing arrangement may also be employed to execute the instructions contained in main memory 215. In alternative arrangements, hard-wired circuitry may be used in place of or in combination with software instructions to implement illustrative arrangements. Thus, arrangements are not limited to any specific combination of hardware circuitry and software.

Figure 3:
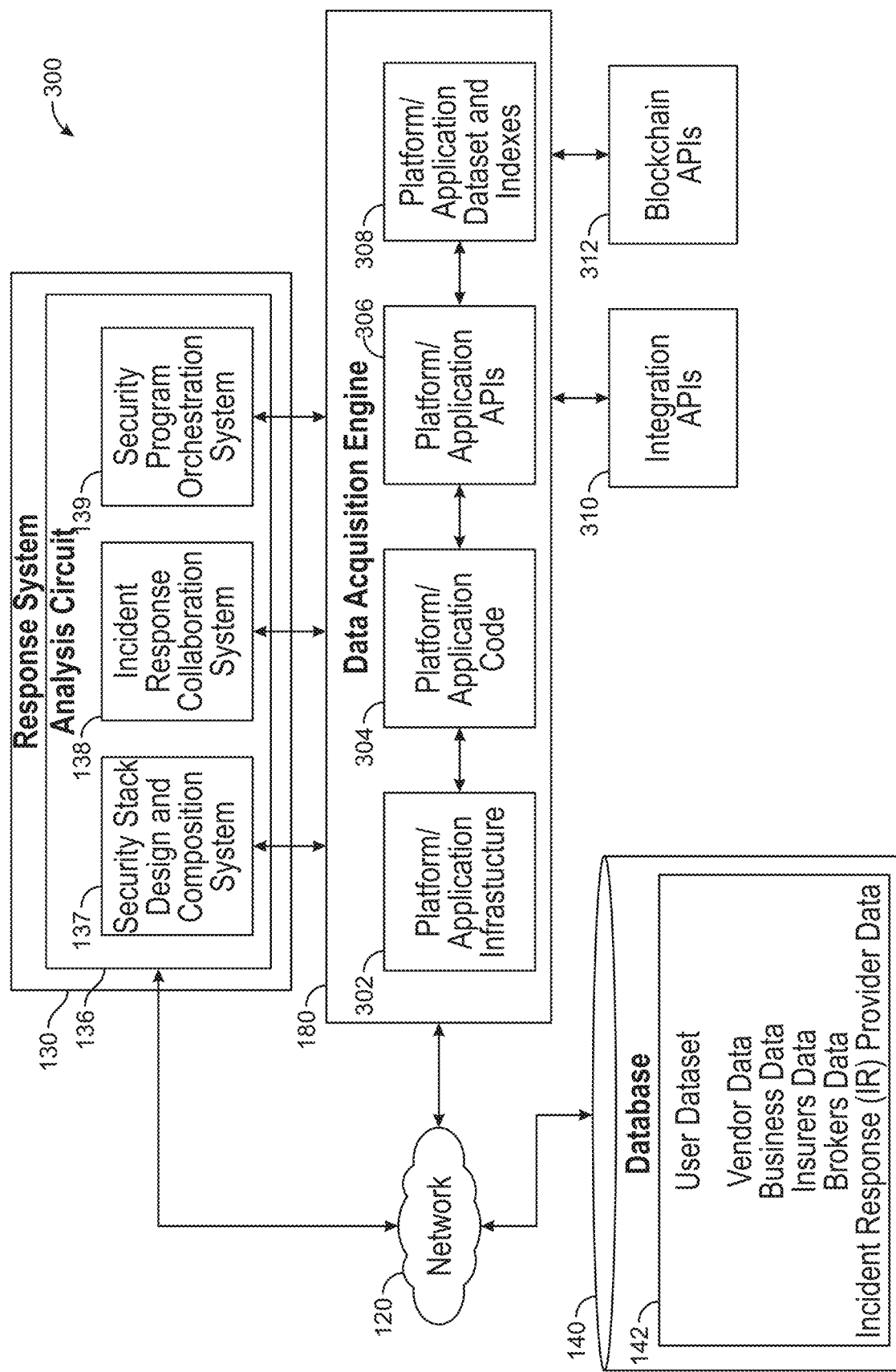
FIG. 3 depicts an architecture that facilitates data acquisition and analysis, according to some arrangements.

Referring now to FIG. 3, the data acquisition engine 180 and analysis circuit 136 of the response system 130, as depicted in FIG. 1, depict an architecture that facilitates efficient data acquisition and analysis. In some implementations, a user dataset 142, containing diverse data associated with different entities and users, can be securely stored in the database 140. The systems and devices illustrated in FIG. 3 communicate and exchange information over the network 120, which facilitates integration and collaboration among the components.

The data acquisition engine 180 encompasses various components designed to support the execution of applications 112 and 152. These components include, but are not limited to, the platform application infrastructure 302, platform application code 304, platform application APIs 306, and platform application datasets and indexes 308. Together, these elements form the support of the data acquisition engine 180, providing the structures and resources to ensure the efficient functioning of the applications. Additionally, integration APIs 310 and blockchain APIs 312 are integrated into the data acquisition engine 180, facilitating execution of API requests, data retrieval from blockchains, access to data sources 160, and integration with various vendors and third parties for streamlined data exchange. These integration APIs 310 facilitate the secure and reliable flow of information, ensuring the responsiveness and effectiveness of the data acquisition process.

The analysis circuit 136 is shown to include, but is not limited to, a security stack designer and composition (SSDC) system 137, an incident response collaboration (IRC) system 138, and a security program orchestration (SPO) system 139. For example, the SSDC system 137 walk users through identifying what data and computations are most important, where the data resides, what vendor product, service, and procedural capabilities are in place to prevent/detect/respond to cyber-attacks, and based on these visualized gaps, determine what to prioritize.

The analysis circuit 136 includes several components that improve the capabilities of the response system 130. One of these components is the security stack designer and composition (SSDC) system 137, which is configured to guide users through the process of identifying and addressing potential vulnerabilities and gaps in their security infrastructure. In some implementations, the SSDC system 137 provides users with a systematic approach to evaluate the significance of their data and computational processes, determining their criticality in the context of cybersecurity. By utilizing the SSDC system 137, users can gain insights into the locations where their data is stored and processed, allowing for understanding of potential security risks. In general, the SSDC system 137 employs various techniques to identify locations where data is stored and processed within an organization's infrastructure. In particular, by leveraging data mapping and inventory techniques that allows the SSDC system 137 to identify data repositories, databases, file systems, and other storage systems where data is stored. For example, the SSDC system 137 can analyze network traffic and data flows within an organization's network to identify sources and destinations of data. By monitoring network communication and analyzing data packets, the SSDC system 137 can trace the path of data transmission and determine the endpoints where data is stored or processed.

Additionally, the SSDC system 137 can utilize data discovery and scanning mechanisms (e.g., using data acquisition engine 180) to identify data repositories within an organization's infrastructure. This may involve scanning file systems, databases, cloud storage, and other data repositories to identify the locations where sensitive or critical data resides. In some implementations, the SSDC system 137 can integrate with data classification tools or metadata repositories (e.g., data sources 160) to gather information about the nature and sensitivity of the data. By understanding the characteristics and classification of data, the SSDC system 137 can identify the specific locations where sensitive data is stored or processed. By combining these techniques, the SSDC system 137 can provide organizations with a view of the locations where data is stored and processed. It allows organizations to understand the data flow across their infrastructure and gain insights into the potential security risks associated with data storage and processing environments.

For example, an organization that utilizes both on-premises servers and cloud storage for data storage. The SSDC system 137 can perform an analysis of the organization's network and infrastructure, monitoring data flows between different systems. It would identify the on-premises servers, databases, and file systems where certain data is stored. Additionally, it would detect the cloud storage providers and cloud repositories where data is stored. By mapping out these locations, the SSDC system 137 provides the organization with a clear understanding of the data storage landscape and allows them to apply appropriate security measures to protect the data in each location.

In some implementations, the SSDC system 137 facilitates an assessment of the existing vendor products, services, and procedural capabilities that are currently in place to prevent, detect, and respond to cyber-attacks. This evaluation allows users to identify any gaps or areas of improvement in their security stack. Through visualizations and analysis, the SSDC system 137 helps users prioritize their security measures based on identified gaps and vulnerabilities. By highlighting areas that require attention, the SSDC system 137 empowers organizations to allocate their resources effectively and take proactive steps to enhance their overall security posture. Moreover, the SSDC system 137 is designed to be dynamic and adaptable, accommodating the ever-evolving threat landscape and the changing needs of organizations. It provides a user-friendly interface that simplifies the complex task of security stack design and composition, making it accessible to users with varying levels of technical expertise.

In some implementations, the IRC system 138 can be configured to collect, aggregate, and generate data and data structure that can be presented via application 112 and 152 and can be configured to determine level of importance related to matter pre-incidents, pre-associate to internal incident team members, cyber insurers, breach counsel, incident response firms, and security vendors to reduce the time it takes to activate and triage live incidents in the future. By leveraging the capabilities of the IRC system 138, organizations can efficiently manage incidents, reduce response times, and ensure collaboration among various stakeholders.

In some implementations, the IRC system 138 can collect and aggregate relevant data. This can include gathering information from various sources such as incident reports, security logs, system alerts, and user-generated data. The IRC system 138 employs data collection mechanisms to capture and centralize this information, ensuring that incident responders have a consolidated view of the incident landscape. The term "incident landscape" refers to the overall environment and context in which incidents occur within an organization's systems and networks. It encompasses the various factors, elements, and conditions that shape the occurrence and impact of security incidents. The incident landscape includes aspects such as the organization's infrastructure, network architecture, data assets, applications, user activities, potential vulnerabilities, and threat landscape. Understanding the incident landscape is important for incident responders as it allows them to gain insights into the organization's unique security challenges, identify potential attack vectors, assess risks, and develop effective incident response strategies. By mapping and analyzing the incident landscape using the IRC system 138, organizations can proactively strengthen their defenses, detect and respond to incidents promptly, and minimize the impact of security breaches.

In some implementations, the IRC system 138 can generate data structures that facilitate the organization and presentation of incident-related information. These data structures facilitate the categorization, classification, and correlation of incident data, making it easier for incident responders to analyze and make informed decisions. The IRC system 138 can employ various techniques such as data modeling, schema design, and indexing to create efficient and structured data representations. By leveraging the data and data structures generated by the IRC system 138, organizations can determine the level of importance related to pre-incident matters. This involves assessing the potential impact and severity of different incident scenarios, identifying assets and systems, and evaluating the potential risks and vulnerabilities. This information helps organizations prioritize their incident response efforts, allocating appropriate resources and attention to high-priority incidents.

In some implementations, the IRC system 138 also facilitates pre-association of internal incident team members, cyber insurers, breach counsel, incident response firms, and security vendors. By establishing these pre-associations, organizations can expedite the activation and triaging of live incidents in the future. The IRC system 138 can maintain a database of trusted contacts and partners, allowing incident responders to quickly engage the expertise and support when responding to incidents. This reduces response times and enhances the overall efficiency of technology and incident handling. Moreover, the IRC system 138 facilitates seamless collaboration among various stakeholders involved in incident response. It provides a unified platform where team members can share information, communicate, and coordinate their efforts. The IRC system 138 may include features such as real-time messaging, task assignment, document sharing, and incident status tracking, facilitating collaboration and ensuring that stakeholders are aligned and working towards a common goal.

The security program orchestration (SPO) system 139 can be configured to manage and adapt an organization's security program to address changes in the security posture and cyber threats. In some implementations, it operates by receiving inputs that indicate the changing state of the security posture, which can come from various sources such as technical indicators or human-assisted inputs through APIs or social media sharing. These inputs provide valuable information about emerging threats, vulnerabilities, or changes in the organization's security landscape. Once the SPO system 139 receives these inputs, it analyzes and evaluates the information to determine the adjustments and changes to be implemented in the security program. This involves identifying areas or aspects of the security program that need to be modified, such as updating security policies, configurations, access controls, or implementing additional security measures.

The orchestration aspect of the SPO system 139 coordinates and manages the implementation of these changes across the organization's various vendor tools and configurations. It ensures that the modifications are applied consistently and effectively across different security systems and technologies, minimizing any potential gaps or inconsistencies that could compromise the organization's overall security posture. Furthermore, the SPO system 139 can be configured to automate and streamline the process of implementing security program changes, reducing the manual effort and potential errors associated with manual intervention. It can leverage automation capabilities to efficiently propagate changes to the appropriate security tools, configurations, and policies, ensuring that the organization's security program remains up-to-date and aligned with the evolving threat landscape.

Referring to the interplay of the analysis circuit 136 generally, the SSDC system 137 designs and composes the security stack. It guides users through the process of identifying data, determining its storage locations, and understanding the vendor products, services, and procedural capabilities to protect against, detect, and respond to cyber-attacks. By visualizing the existing gaps and vulnerabilities, the SSDC system 137 helps organizations prioritize their security efforts and make informed decisions to strengthen their security posture. The IRC system 138 focuses on collaboration and information sharing during incident response. It collects, aggregates, and generates data to be presented via applications 112 and 152. This system facilitates the efficient and effective communication among internal incident team members, cyber insurers, breach counsel, incident response firms, and security vendors. By pre-associating relevant parties and establishing clear lines of communication, the IRC system 138 reduces the time it takes to activate and triage live incidents in the future, leading to improved incident response capabilities. The SPO system 139, on the other hand, plays a crucial role in managing the organization's security program. It receives inputs indicating changes in the security posture or emerging cyber threats, whether through technical indicators or human-assisted inputs. Leveraging these inputs, the SPO system 139 determines adjustments in the security program and orchestrates the implementation of those changes across the organization's various vendor tools and configurations. This ensures that the security program remains up-to-date and aligned with the evolving threat landscape, enhancing the organization's overall security resilience.

Accordingly, together, these three systems create a powerful synergy within the organization's security ecosystem. The SSDC system 137 helps design a robust security infrastructure, the IRC system 138 facilitates collaboration and information sharing during incident response, and the SPO system 139 ensures the agility and adaptability of the organization's security program. By working in tandem, these systems contribute to a proactive approach to improve security, empowering organizations to mitigate risks, respond effectively to incidents, and continuously improve their security posture in a rapidly evolving threat landscape.

Figure 4A:
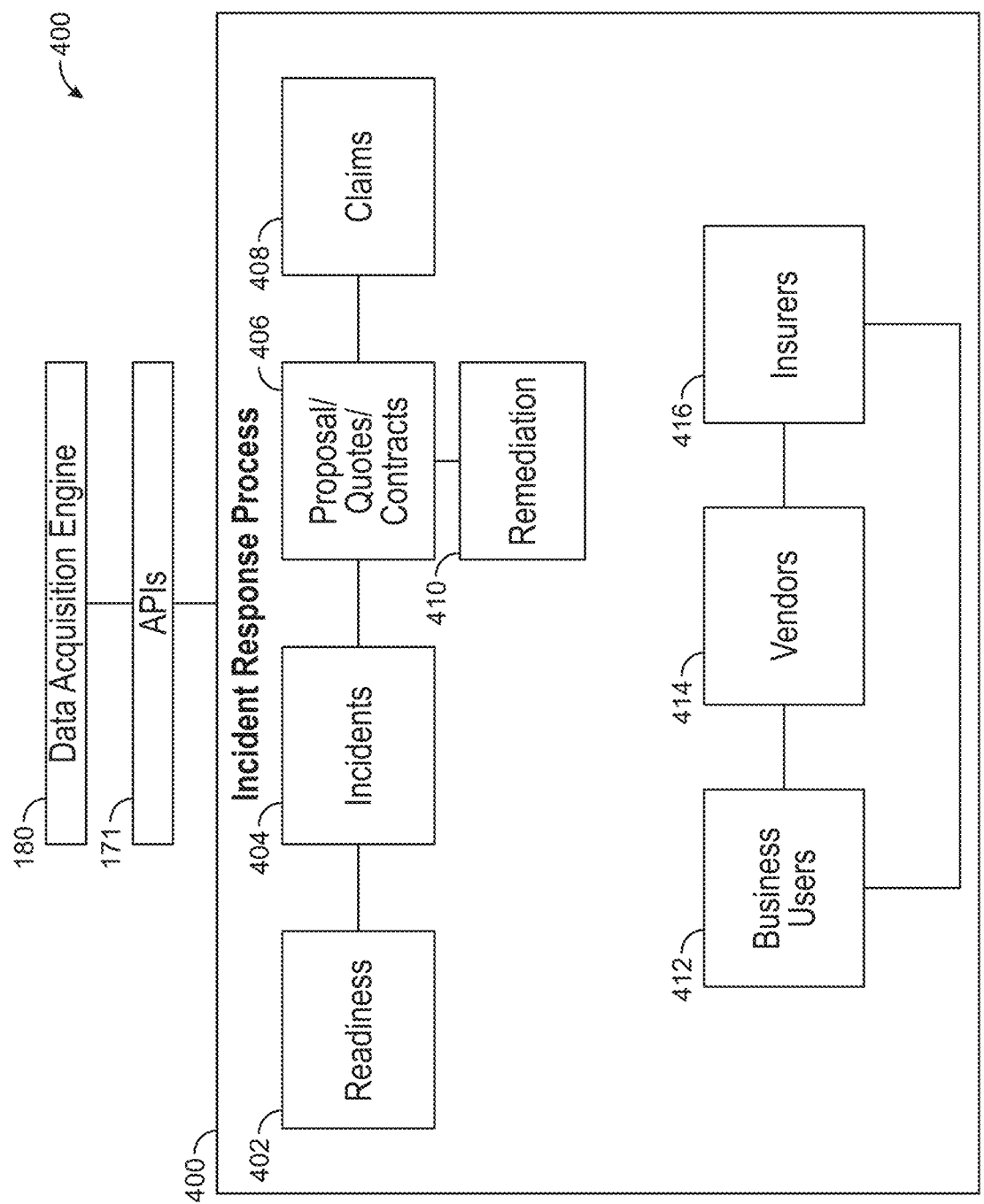
FIGS. 4A-B depicts a flowchart for a method for incident response preparedness and readiness, according to some arrangements.
Figure 4B:
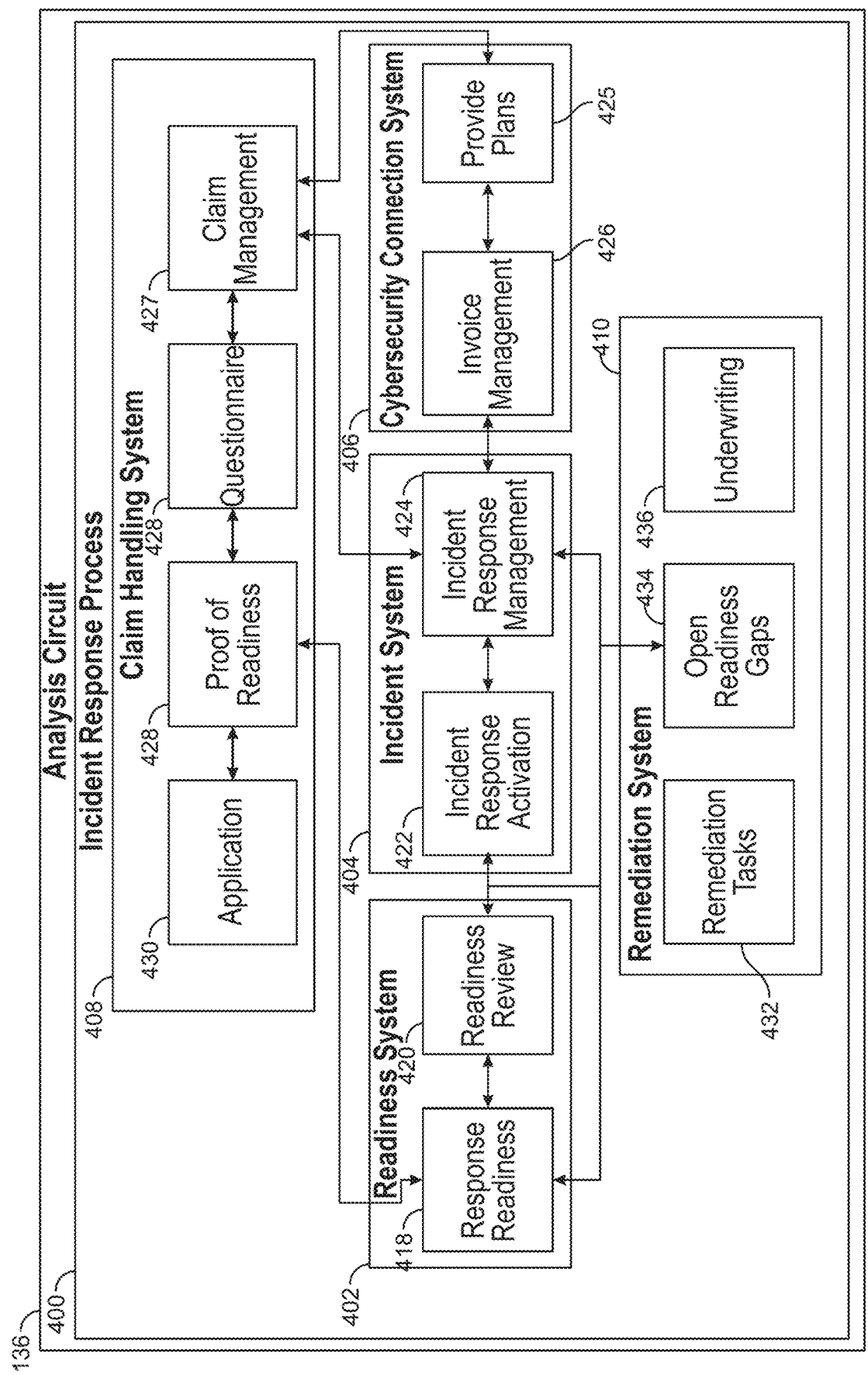

Referring now to FIGS. 4A-4B, a method 400 for incident response preparedness and readiness through the final incident closure and claim submission. Response system 130 (e.g., in particular analysis circuit 136) or third party device 150 can be configured to perform method 400. Further, any computing device or system described herein can be configured to perform method 400. Additionally, the functions and features described in method 400 can be performed on an application. The data acquisition engine 180 can communicate using APIs with the response system 130.

In broad overview of the incident response process (i.e., method 400), the analysis circuit 136 can implement method 400. The analysis circuit can include various computing systems such as readiness system 402, incident system 404, cybersecurity connection system 406, claim handling system 408, and remediation system 410 can each be systems configured to implement steps within an incident response process. In particular, FIG. 4B shows exemplary activities or tasks performed in each of the steps shown in FIG. 4A. Throughout the steps and activities data and data structures can be utilized (e.g., aggregate, collected, or generated) including data of business users 412, vendors 414, and insurers 416. APIs 171 and API request and returns can be sent and received by the one or more processing circuits to perform method 400. Additionally, fewer, or different operations may be performed depending on the particular arrangement. In some arrangements, some or all operations of method 400 may be performed by one or more processors executing on one or more computing devices, systems, or servers. In various arrangements, each operation may be re-ordered, added, removed, or repeated.

Referring to method 400 in more detail, the analysis circuit 136 can execute a readiness step by readiness system 402, where a readiness analysis is executed. In some implementations, during the readiness step by readiness system 402, the analysis circuit 136 can perform response readiness 418 and readiness review 420. During the response readiness 418, the analysis circuit 136 evaluates the organization's level of preparedness to effectively respond to incidents. It assesses various factors such as the availability of incident response teams, the adequacy of incident response plans and procedures, the integration of incident response tools and technologies, and the establishment of communication channels and protocols. This evaluation helps identify any gaps or deficiencies in the organization's response capabilities, ensuring measures are taken to address them.

Simultaneously (or in a logical order), the readiness review 420 conducted by the analysis circuit 136 involves a thorough examination of the organization's overall readiness for incident response. It encompasses a review of the organization's incident response framework, including its policies, procedures, documentation, and training programs. The analysis circuit 136 examines whether the organization's incident response framework aligns with industry best practices, regulatory requirements, and internal objectives. It also assesses the organization's ability to effectively coordinate and collaborate with external stakeholders, such as incident response providers, cyber insurers, breach counsel, and other relevant parties.

In some arrangements, the readiness system 402 is configured to access the entity data of an organization and utilize this information to determine the organization's security posture. The readiness system 402 can take into account various parameters such as the entity's cybersecurity policies, system configurations, incident response readiness, and others. It can then model the security posture along with a plurality of security objectives of the organization to generate a set of cybersecurity attributes.

The analysis circuit 136 can also execute an incident step by incident system 404, where an incident analysis is executed. In some implementations, during the incident step by incident system 404, the analysis circuit 136 can perform incident response activation 422 and incident response management 424. During the incident response activation 422, the analysis circuit 136 triggers the actions to initiate the incident response process. It activates the predefined incident response plans, procedures, and resources to ensure a swift and coordinated response. This includes notifying the incident response team, engaging relevant stakeholders and vendors, and initiating communication channels to exchange information.

In some arrangements, the incident system is configured to maintain the relationship between the entity and third-party cybersecurity providers. That is, it is configured to model a plurality of cybersecurity protection plans between the entity and a third-party. In particular, it provides a framework for integrating third-party cybersecurity solutions into the entity's systems, ensuring that these solutions align with the entity's security objectives and can effectively address its cybersecurity needs.

Simultaneously (or in a logical order), the analysis circuit 136 executes incident response management 424, which involves the ongoing coordination, monitoring, and control of the incident response activities. For example, it ensures that the incident response team follows the established procedures, communicates effectively, and collaborates seamlessly to address the incident. The analysis circuit 136 provides real-time insights and updates on the incident's status, facilitates information sharing between team members, and tracks the progress of incident containment, eradication, and recovery efforts. By effectively managing the incident response, the analysis circuit 136 helps minimize the impact of the incident and accelerates the return to normal operations. By performing the incident response activation 422, it initiates a rapid and coordinated response, while the incident response management 424 ensures effective coordination and control throughout the incident response process. This incident analysis and response approach facilitated by the analysis circuit 136 allows organizations to mitigate the impact of incidents, minimize downtime, and protect their assets and operations.

The analysis circuit 136 can also execute a proposal/quote/contract step by cybersecurity connection system 406, where a proposal/quote/contract generation is executed. In some implementations, during the proposal/quote/contract step by cybersecurity connection system 406, the analysis circuit 136 can perform invoice management 426. During the proposal/quote/contract step by cybersecurity connection system 406, the analysis circuit 136 leverages its capabilities to generate proposals, quotes, and contracts. It takes into account the requirements, parameters, and preferences of the involved parties, ensuring that the proposed terms align with their respective needs. The analysis circuit 136 utilizes relevant data, such as pricing information, service level agreements (SLAs), and contractual obligations, to generate customized proposals and quotes. In some implementations, within the proposal/quote/contract step by cybersecurity connection system 406, the analysis circuit 136 incorporates invoice management 426 functionality. This feature facilitates the handling and tracking of invoices related to the proposed services or products. The analysis circuit 136 ensures that accurate and timely invoices are generated, shared, and managed throughout the invoicing process. It may include features such as invoice creation, validation, tracking, and payment processing, streamlining the financial aspect of the proposal/quote/contract lifecycle.

In some arrangements, the cybersecurity connection system 406 can be configured to determine and provide (i.e., connect) a cybersecurity protection plan, utilizing one or more protection parameters. The plans can correspond to a new cybersecurity attribute that has been identified as to protect the organization. The cybersecurity connection system 406 makes this protection plan available to the entity, which can then choose to activate it based on its needs and acceptance of the plan's terms.

The analysis circuit 136 can also execute a claims step by claim handling system 408, where claims are generated and tracked. In some implementations, during the claims step by claim handling system 408, the analysis circuit 136 can perform proof of readiness 429, provide an application 430 (e.g., application 112 and 152), generate and provide questionaries 428, and perform claim management 427. In some implementations, proof of readiness 429 involves gathering and presenting evidence to substantiate the readiness of the organization in handling incidents and responding effectively. The analysis circuit 136 collects relevant data, such as incident response plans, documentation, training records, and compliance certifications, to demonstrate the organization's preparedness. Additionally, the analysis circuit 136 provides an application 430, such as application 112 and 152, to facilitate the claims process. This application serves as a centralized platform where users can access and submit their claims. It streamlines the entire claims workflow, facilitating efficient communication, documentation, and tracking of the claims from initiation to resolution.

In some arrangements, the claim handling system 408 is configured to monitor the environmental data of the entity while modeling at least one of the plurality of cybersecurity protection plans. That is, the claim handling system 408 monitors for any anomalies or signs of potential cybersecurity incidents in the entity's environment. When it detects a new cybersecurity incident associated with the entity from the environmental data, it generates a report, allowing the entity or vendor to promptly respond to the incident and prevent further damage.

In some implementations, as part of the claims step by claim handling system 408, the analysis circuit 136 also generates and provides questionnaires 428. These questionnaires are designed to gather information related to the incident or the claim being submitted. They serve as a structured means to collect relevant details and documentation that are used for claim evaluation and processing. Moreover, the analysis circuit 136 encompasses claim management 427 functionalities during the claims step by claim handling system 408. This includes activities such as claim validation, documentation management, claim status tracking, and communication with involved parties. The analysis circuit 136 ensures that claims are effectively managed, providing transparency and visibility into the progress and status of each claim.

The analysis circuit 136 can also execute a remediation step by remediation system 410, where remediations are executed. In some implementations, during the remediation step by remediation system 410, the analysis circuit 136 can perform remediation tasks 432, open readiness issues and gaps 434, and execute underwriting 436 (e.g., of organizations to determine what type of vendor plans, products, or services they may qualify for). The execution of remediation tasks 432 includes implementing actions or measures to mitigate vulnerabilities, resolve security gaps, and address any identified weaknesses in the organization's security infrastructure. The analysis circuit 136 can provide guidance and instructions to stakeholders, outlining the steps to remediate the identified issues effectively.

In some arrangements, the remediation system 410 is configured to execute one or more remediation actions to mitigate a vulnerability or security gap. It bases its actions on the security posture of the entity. If a vulnerability is detected or a security gap is identified, the remediation system 410 executes to address the issue, employing a range of remediation actions such as patching software, modifying system configurations, or enhancing security policies.

Additionally, the analysis circuit 136 facilitates the process of opening readiness issues and gaps 434. It identifies areas where the organization may have shortcomings or deficiencies in its preparedness for potential incidents or security threats. By highlighting these gaps, the analysis circuit 136 helps organizations prioritize and allocate resources to address the identified issues and enhance their overall readiness posture. Moreover, the analysis circuit 136 can execute underwriting 436, which involves evaluating organizations to determine the type of vendor plans, products, or services they may qualify for. Through an assessment, the analysis circuit 136 analyzes various factors, such as the organization's security measures, incident response capabilities, risk management practices, and compliance with industry standards. Based on the evaluation, the analysis circuit 136 provides insights and recommendations on suitable vendor offerings that align with the organization's requirements and level of readiness.

In some arrangements, the readiness system 402 is configured to continuously update the security posture of the entity. It does this by monitoring dynamic changes in the entity data, which can involve alterations in system configurations, updates to security policies, new cyber threats, and shifts in the cyber risk landscape. This continuous updating of the security posture ensures that the organization's security status always reflects the most current conditions. It allows the analysis circuit 136 to react to emerging threats or vulnerabilities, providing real-time protection for the entity's data and systems.

In some arrangements, the readiness system 402 can also be configured to tokenize and broadcast the security posture to a distributed ledger. This process involves converting the security posture into a format suitable for recording on a blockchain (e.g., a type of distributed ledger). It then broadcasts this tokenized data across the network of computers that maintain the ledger. Additionally, the readiness system 402 provides a public address of the tokenized updated security posture on the distributed ledger. This public address can be accessed by a plurality of third-parties for verification. This transparent and immutable record-keeping enhances trust among stakeholders and provides a verifiable proof of the entity's security posture.

In some arrangements, the readiness system 402 is further configured to generate a security roadmap. This roadmap includes a plurality of phases associated with the modeling of the set of cybersecurity attributes. Each cybersecurity attribute of the set is assigned a phase associated with the security roadmap of the entity. For example, the roadmap serves as a strategic plan that outlines the steps the entity needs to (or should) take to enhance its security posture. It provides a clear pathway to achieving the entity's security objectives, ensuring that efforts are well-coordinated and resources are optimally utilized. By assigning each cybersecurity attribute to a phase of the roadmap, the readiness system 402 ensures that each aspect of the entity's security is appropriately addressed.

In some arrangements, the cybersecurity connection system 406 can create and set in motion a cybersecurity protection obligation, in provide plans 425, between the entity and the third-party upon receiving an activation of the cybersecurity protection plan. The cybersecurity protection obligation can be a binding agreement or contract that outlines the responsibilities and roles of the entity and the third-party in securing the entity's systems and data. This protection obligation is characterized by several protection attributes, which may involve various elements such as the scope of protection, the duration of the contract, the cybersecurity services to be provided, the response time in the event of a security incident, and the terms of service termination or renewal. Moreover, the cybersecurity connection system 406 can identify multiple cybersecurity protection plans (e.g., at provide plans 425) associated with various third-parties. These could include a wide array of cybersecurity service providers, each offering distinct protection plans. For instance, a first cybersecurity protection plan could be offered by a first third-party, while a second cybersecurity protection plan could be offered by a different third-party. Each of these protection plans can be associated with the new cybersecurity attribute identified during the modeling process, indicating that they are specifically designed to address this aspect of the entity's cybersecurity needs.

In some arrangements, each cybersecurity protection plan, in turn, is associated with one of several availability states. These states provide an immediate understanding of the plan's status regarding its accessibility for the entity. The "available now" state means that the plan is currently accessible for implementation. The "available pending" state signifies that the plan will become accessible in the future, perhaps subject to certain conditions or the passing of a certain period. Conversely, an "unavailable" state denotes that the plan is not currently accessible, possibly due to it being phased out, fully subscribed, or not being offered in the entity's region. Additional or fewer states can be added. This system of availability states allows the entity to quickly determine which plans are viable options for enhancing their cybersecurity posture.

In some arrangements, the incident system 404 can establish a data (e.g., continuous, in real-time, periodically) monitoring channel between the entity and the third-party. This communication stream allows for real-time (or near real-time) detection and response to any potential cybersecurity incidents. To achieve this, a first communication connection is established using a first application programming interface (API) between the entity's computing system (e.g., 110) or one or more entity assets (e.g., 110) and the incident system 404. This connection allows the incident system 404 to continuously monitor the entity's systems and data for any signs of a cybersecurity incident. Simultaneously, a second communication connection is established using a second API between a third-party computing system (e.g., 150) and the incident system 404. This connection allows the third-party, often a cybersecurity service provider, to also monitor the entity's systems and data, providing an additional layer of protection and vigilance.

Moreover, the claim handling system 408 can be configured to quickly respond to any detected cybersecurity incidents. Upon detection of a new cybersecurity incident, the claim handling system 408 generates alerts and provides a real-time dashboard for the entity and vendor. This dashboard provides an overview of the entity's cybersecurity posture, data of the detected incident, recommended response actions, and updates on the response process. This real-time information allows the entity to rapidly understand and react to the cybersecurity incident, minimizing potential damage and downtime.

In some arrangements, the remediation system 410 can use predictive analytics to identify potential security gaps before they can be exploited. It analyses patterns in the entity's data and behaviors, as well as trends and threats in the broader cybersecurity landscape, to predict where vulnerabilities might arise. Upon identifying a potential security gap, the remediation system 410 proactively executes one or more remediation actions. These actions could involve updating security policies, patching software vulnerabilities, reconfiguring system settings, providing cybersecurity training to employees, or implementing additional cybersecurity measures.

Figure 5:
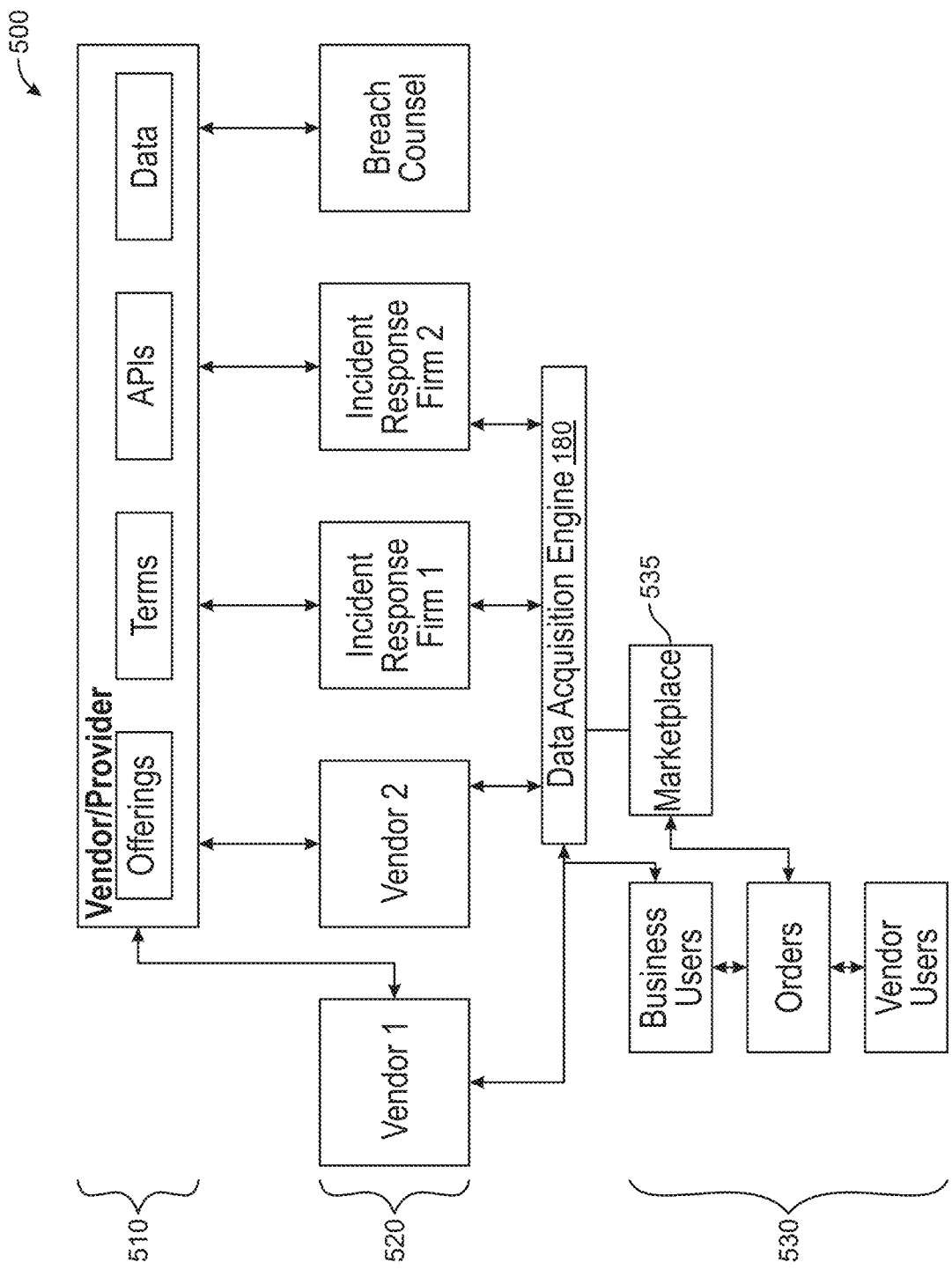
FIG. 5 depicts an example vendor-provider marketplace, according to some arrangements.

Referring now to FIG. 5, a vendor-provider marketplace 500, according to some arrangements. The vendor-provider marketplace 500 depicts generally the interactions between vendors 510 and users 530 (e.g., directly or through partners 420) as well as vendors 510 to partners 520. For example, each vendor 520 can include, but is not limited to, offerings, terms, APIs, and data that can be provided and/or exchanged with to the response system 130 via the data acquisition engine 180 and other vendors, incident response firms, and breach counsel (e.g., law firm) (collectively referred to as "partners 520"). In some implementations, those partners 520 can communicate with the data acquisition engine 180 of FIG. 1A to generate dashboards of an application (e.g., 112, 152) and store data in database 140 for future use.

Expanding on the vendor-provider marketplace 500 depicted in FIG. 5, this marketplace serves as a central hub for interactions between vendors 510, users 530, and partners 520, facilitating the exchange of offerings, terms, APIs, and data. Each vendor 510 within the marketplace encompasses a range of products, services, and resources that can be made available to users 530 directly or through the engagement of partners 520. These partners 520, which include incident response firms, breach counsel (such as law firms), and other relevant entities, play a crucial role in providing expertise and additional support to enhance incident response capabilities (i.e., a type of cybersecurity attribute). Through communication with the data acquisition engine 180, the partners 520 can actively engage in generating dashboards within the application interfaces (e.g., 112, 152). These dashboards offer real-time insights and analytics, allowing users 530 to visualize and assess their incident response readiness, track ongoing incidents, and access relevant data stored in the database 140 for future reference. The data acquisition engine 180 serves as a communication bridge, allowing partners 520 to contribute information and leverage the functionalities of the response system 130. It should be understood that the vendors 510, partners 520, and users 530 depicted in the vendor-provider marketplace 500 can be executed by computer systems, exemplified by the computing system 200 shown in FIG. 2. These computer systems facilitate collaboration, data exchange, and transactional activities within the marketplace, ensuring a dynamic and efficient ecosystem for incident response management.

In certain implementations, the vendor-user interaction within the marketplace 535 extends beyond mere browsing and exploration. Vendors 510 and users 530 have the capability to place orders directly through the marketplace 535, initiating a streamlined process facilitated by the data acquisition engine. This integration of ordering functionality enhances the efficiency and convenience of the marketplace, facilitating transactions between vendors and users. Notably, the marketplace 535 serves as a platform for programmatic connectivity, allowing new partners to establish collaborative relationships efficiently. The marketplace incorporates contracting workflows and partnering processes, which are seamlessly facilitated through the application interface. Once a partnership is ratified, the partners can immediately engage in business activities within the platform, leveraging the full range of services and offerings available. This includes the ability to submit proposals, engage in reselling, establish technical connectivity for provisioning and licensing, establish API connections for data sharing, utilization, and presentation on the platform, and leverage pre-defined programmable logic for user, vendor, and partner interactions.

In some implementations, the marketplace 535 introduces dynamic and automated workflows that facilitate routing of inbound orders to the appropriate partner based on pre-defined criteria. This programmable logic ensures that orders are seamlessly directed to the designated partner for processing and fulfillment. Furthermore, programmatic activation of contracts and seamless order fulfillment processes are executed, ensuring a smooth and rapid delivery of the purchased offering, whether it is a product or service. The marketplace ecosystem facilitates the seamless integration of vendors, partners, and users, streamlining the entire order management process and facilitating timely and efficient delivery of products and services.

Distinguishing itself from other vendor marketplaces, this embedded marketplace 535 is seamlessly integrated within the applications and APIs (171) spanning the entire system architecture. This integration allows vendor offerings to be presented to users precisely when they need them, seamlessly integrating within the user flow during various stages of cybersecurity incident response planning, testing, and execution. Moreover, the marketplace becomes an integral part of the design and composition processes for constructing a robust cybersecurity stack, as well as during security program orchestration and adaptation to ensure the ongoing effectiveness of the cybersecurity program. By embedding the marketplace within the applications and APIs, users 530 have immediate access to an array of vendor offerings precisely at the point of need. Whether users are developing their incident response plans, conducting tests, executing response strategies, or adapting their security programs, the marketplace seamlessly integrates within their workflow, providing timely and relevant vendor options to enhance their cybersecurity capabilities (i.e., cybersecurity attributes). This unique approach eliminates the need for users to navigate separate platforms or search for vendors independently, streamlining the entire process and promoting efficiency in decision-making and procurement.

Additionally, this embedded marketplace fosters a holistic approach to cybersecurity management, facilitating collaboration between users 530 and vendors 510 throughout the entire ecosystem. By offering vendor options during incident response planning, testing, and execution, users can make informed decisions and select the most suitable solutions to mitigate risks effectively. Similarly, during the design and composition of their cybersecurity stack, users 530 can access a diverse range of vendor offerings directly within the application interface, allowing them to build a tailored security infrastructure. Additionally, during security program orchestration and adaptation, the marketplace 535 provides users with valuable insights and options to enhance the effectiveness and resilience of their security programs, ensuring continuous protection against evolving threats.

It should be understood that the embedded marketplace's architecture allows for flexibility and scalability, accommodating additional systems, devices, data structures, and data sources as required. The marketplace can adapt to the evolving needs of users and vendors, expanding its offerings and functionalities to meet the dynamic nature of the cybersecurity landscape. This adaptability ensures that the marketplace remains a valuable resource for users, providing access to the latest innovations and vendor solutions while facilitating seamless collaboration and partnership within the cybersecurity ecosystem.

Figure 6:
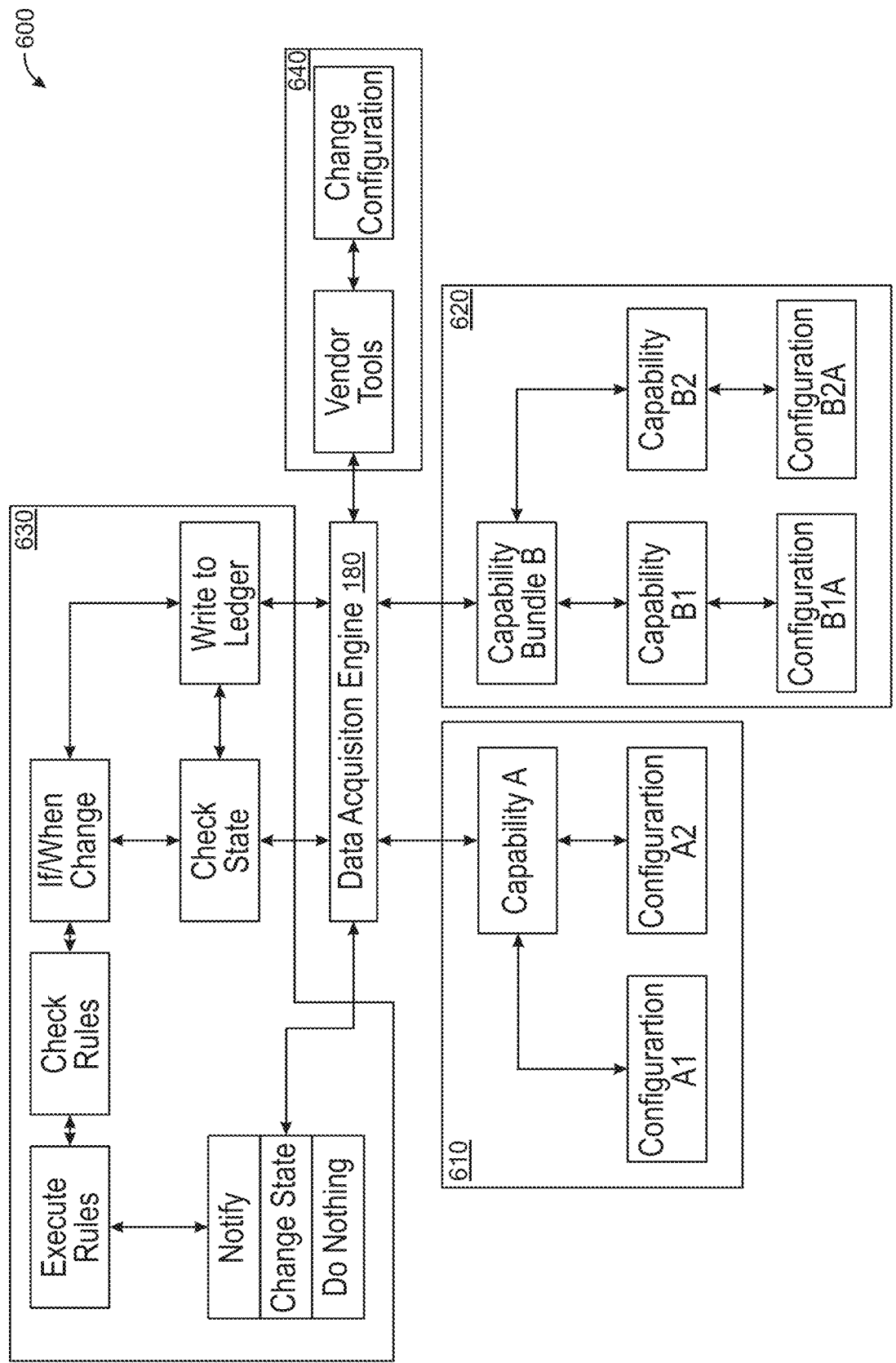
FIG. 6 depicts a flowchart for a method for capturing the state of capabilities, according to some arrangements.

Referring now to FIG. 6, a method 600 for capturing the state of capabilities (sometimes referred to herein as "cybersecurity attributes") (e.g., vendor technologies or configurations) in place and in use by users, retrieving state, and sharing of state at points in time as well as over a time period. Response system 130 (e.g., in particular analysis circuit 136 or data acquisition engine 180) or third party device 150 can be configured to perform method 600. Further, any computing device or system described herein can be configured to perform method 600. Additionally, the functions and features described in method 600 can be performed on an application.

In broad overview of method 600, capabilities 610 and 620 associated with a corporation of business can be received (e.g., capability A with configuration A1 and configuration A2, and capability bundle B with capability B1 and B2, where capability B1 has a configuration B1A and capability B2 has a configuration B2A). The capabilities 610 and 620 can be checked (e.g., check state) and the capabilities can be written to a ledger (e.g., database and/or blockchain 170) in steps 630. Once the capabilities 610 and 620 are received, a thorough check is conducted to verify their state and ensure their accuracy and validity. This check entails examining the current status and parameters of each capability, evaluating factors such as readiness, compatibility, and compliance with established standards or requirements. By performing this assessment, any discrepancies or issues pertaining to the capabilities can be identified and addressed.

In some implementations, following the verification process, the next step involves recording the capabilities into a ledger. This ledger serves as a secure and reliable storage medium, which can take the form of a database or a blockchain 170. The capabilities, along with their associated configurations, are meticulously documented and stored within the ledger, ensuring the integrity and traceability of the information. This facilitates access to the capabilities' data, their respective configurations, and any historical changes or updates that may occur over time. By writing the capabilities to the ledger, organizations gain a centralized and auditable repository that securely maintains a record of their capabilities. Additionally, the ledger ensures transparency and accountability by providing an immutable and tamper-proof audit trail of the capabilities and their configurations.

In turn in steps 630, a process can occur if a state has changed including, but not limited to, checking rules, execute rules, and notifying, changing state, and/or do nothing. If a change occurred (i.e., trigger condition, e.g., capability A changed, the data acquisition engine 180 may determine to change it back (or role it back), capability B changed and in turn then vendor technology is configured to change Y associated with the business or corporation) then the one more processing circuits can programmatically connect to vendor technology to change a configuration (e.g., utilizing API calls). In some implementations, at steps 640, the data acquisition engine 180 can communicate with vendor tools to change particular configurations.

Upon detecting a change in state, the data acquisition engine 180 evaluates the trigger condition, such as the alteration of capability A or capability B. Based on this evaluation, a decision is made regarding the appropriate course of action. For example, if capability A experiences a change, the data acquisition engine 180 may determine that a rollback is to be performed to revert the capability back to its previous state. Similarly, if capability B undergoes a change, the vendor technology associated with the business or corporation can be configured to adjust Y accordingly, aligning it with the modified capability. To effectuate these changes, the processing circuits within the data acquisition engine 180 (or within response system 130) establish programmatic connections with the vendor technology responsible for managing the configurations (e.g., at step 640). Moving forward to step 640, the data acquisition engine 180 actively engages in communication with the vendor tools to implement the desired changes. Through this interaction, the data acquisition engine 180 can efficiently orchestrate the configuration changes to align the capabilities with the desired state.

With reference to FIG. 6, the one or more processing circuits can utilize the various data structures (e.g., assets, locations, capabilities, threats) to collect, attribute, and adapt to determine if a trigger condition occurred (e.g., historical data of the corporation or business can be used to determine if a trigger condition occurred) In turn, the one or more processing circuits can execute one or more functions such as make an API request (e.g., to vendor, insurer, or business), store information in a database, and/or update a blockchain ledger (e.g., at step 630). Additionally, fewer, or different operations may be performed depending on the particular arrangement. In some arrangements, some or all operations of method 600 may be performed by one or more processors executing on one or more computing devices, systems, or servers.

In some implementations, in order to identify the occurrence of a trigger condition, historical data of the corporation or business is often utilized. This historical data provides valuable insights into the past behavior and patterns of the organization, allowing the processing circuits to make informed decisions regarding trigger condition identification. Upon determining that a trigger condition has indeed occurred, the one or more processing circuits initiate a series of functions and operations to address the situation. These functions may include making API requests to relevant entities such as vendors, insurers, or other businesses. Through these API requests, the processing circuits can retrieve crucial information or initiate actions to respond to the trigger condition effectively. Additionally, in certain implementations, the processing circuits can update a blockchain ledger, providing a secure and immutable record of the trigger condition and any associated changes made as a result.

In various arrangements, each operation may be re-ordered, added, removed, or repeated. This system will be used to deliver state of a business security configuration to facilitate insurance underwriting, whereby the facts of the state of the business user computing environment are known, and provable. This provides the underwriting insurer the ability to collect irrefutable proof-of-state of the business environment as part of their pre-underwriting and risk selection process and can be then used to facilitate programmatic binding as part of their application process. The system can be further utilized to provide programmatically and dynamically adaptable insurance products that change the coverage level based on the factual changes in state of the computing environment at the insured through the policy period. This allows the insurer to ensure that the insured has followed the underwriting criteria throughout the term of the policy. Cyber insurance renewals can be programmatically generated and automatically bound based on the binary data provided by the system during renewal as the insurer knows what the compliance history has been for the insured as well as the facts of the current state of the vendor capabilities and configurations in the insureds computing environment.

In various arrangements, the underwriting process begins by collecting data from the insured's security tools and configurations. This data can then be analyzed and matched against the underwriting requirements defined by the insurer. The collected data acts as irrefutable proof of the insured's security posture, providing the insurer with a holistic understanding of the risk associated with the insured's business environment. In some arrangements, once the data has been collected and matched to underwriting requirements, the processing circuits can wrap this information with the context and metadata through a broker. The broker acts as an intermediary, consolidating and structuring the data in a standardized format that can be seamlessly transmitted to the insurer's quoting API. This integration improves the underwriting application process, allowing the insurer to access the factual data of the insured's security configuration and computing environment. With this data in hand, the insurer can programmatically assess the risk and make informed decisions regarding coverage and policy terms. This automated and dynamic approach empowers insurers to offer adaptable insurance products that can be adjusted based on the factual changes in the insured's computing environment throughout the policy period, ensuring ongoing compliance with underwriting criteria and tailored coverage for the insured. Additionally, the system facilitates the automatic generation and binding of cyber insurance renewals based on the binary data provided during the renewal process. By utilizing the compliance history and the up-to-date facts of the insured's computing environment, the insurer can renew the policy while maintaining an understanding of the insured's risk profile and providing continuous coverage.

Cyber Resilience Tokenization

Figure 7:
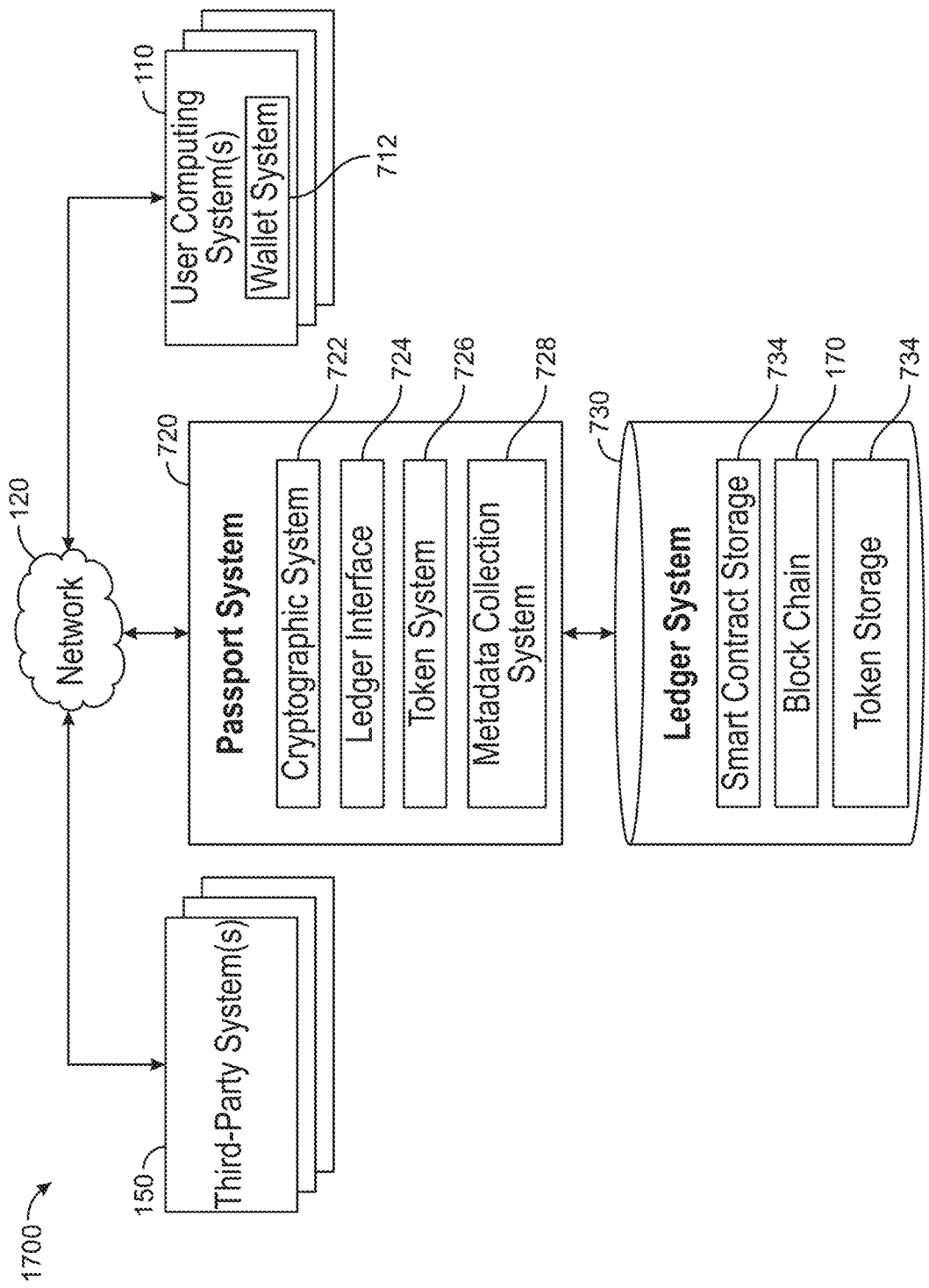
FIG. 7 depicts a block diagram of an implementation of a system for cyber resilience tokenization, according to some arrangements.

Referring to FIG. 7, a block diagram of an implementation of a system for cyber resilience tokenization is shown, according to some arrangements. The implementation shown in FIG. 7 can include user computing system(s) 110, third-party system(s) 150 (also referred to herein as "third-party devices 150", "third party systems 150", and "third party devices 150"), a passport system 720, and a ledger system 730. In some arrangements, the user computing system(s) 110 can include a wallet system 712. In some arrangements, the passport system 720 can include a cryptographic system 722, a ledger interface 724, a token system 726, and a metadata collection system 728. In some arrangements, the ledger system 730 can include smart contract storage 732, blockchain 170, and token storage 734. These components can be interconnected through a network 120 that supports secure communications profiles (e.g., TLS, SSL, HTTPS, etc.). In some arrangements, the passport system 720 can incorporate the same or similar features and/or functionality as described regarding the response system 130 of FIG. 1. Although the various computing elements of FIG. 7 can be described in the singular form (e.g., user computing system 110, third-party system 150, etc.), it should be understood that the implementation shown in FIG. 7 can include two or more of any device/system described herein (e.g., two or more user computing system(s) 110, two or more third-party system(s) 150, etc.).

Each system or device of FIG. 7 may include one or more processors, memories, network interfaces (sometimes referred to herein as a "network circuit") and user interfaces. The memory may store programming logic that, when executed by the processor, controls the operation of the corresponding computing system or device. The memory may also store data in databases. For example, memory may store programming logic that when executed by a processor within a processing circuit, causes a database to update parameters or store a system or event log. The network interfaces may allow the computing systems and devices to communicate wirelessly or otherwise. The various components of devices in system 100 may be implemented via hardware (e.g., circuitry), software (e.g., executable code), or any combination thereof. Devices, systems, and components in FIG. 7 can be added, deleted, integrated, separated, and/or rearranged in various embodiments of the disclosure.

Generally, the user computing system(s) 110, third-party system(s) 150, passport system 720, and ledger system 730, wallet system 712, cryptographic system 722, ledger interface 724, token system 726, metadata collection system 728, smart contract storage 732, blockchain 170, token storage 734, and/or network 120 can include one or more logic devices, which can be one or more computing devices equipped with one or more processing circuits that run instructions stored in a memory device to perform various operations. The processing circuit can be made up of various components such as a microprocessor, an ASIC, or an FPGA, and the memory device can be any type of storage or transmission device capable of providing program instructions. The instructions may include code from various programming languages commonly used in the industry, such as high-level programming languages, web development languages, and systems programming languages. The user computing system(s) 110, third-party system(s) 150, passport system 720, and other various components of FIG. 7 may also include one or more databases for storing data that receive and provide data to other systems and devices on the network 120.

Generally, the passport system 720 can execute and/or be utilized to execute various processes and/or tasks corresponding with modeling cyber resilience data. For example, the passport system 720 can provide a single sign-on gateway (e.g., using an identity management system like AuthO) facilitating access to a user's associated security posture, threat, incident, and insurance data sets using data sets encapsulated within various tokens. For example, the passport system 720 can generate a token (e.g., a passport) linked to various additional tokens and further linked to a control structure restricting access to one or more of the additional tokens based on rules (e.g., RBACs). For example, a cyber resilience identifier (e.g., passport) of an entity can include entity data and/or additional cyber resilience data stored in tokens, and the passport system 720 can provide and/or restrict access to one or more portions of the tokenized data based on various conditions, entity types, data types, regulations, and so on. That is, an entity can have a container with access controls and a passport created by the passport system 720 linked to both sensitive (e.g., private) and non-sensitive (e.g., public) data, and the passport system 720 can deny access (e.g., to sensitive data) and provide access (e.g., to non-sensitive data) based the access control (e.g., whether the user to access the data is a customer, insurer, vendor, MDR/XDR provider, etc.).

Generally, the passport system 720 can provide secure access to token-related data and facilitate interactions between different cybersecurity systems and data sources of FIG. 7 (e.g., user computing systems 110, third party systems 150, ledger system 730, etc.) based on various access controls. For example, the passport system 720 can create a cyber resilience identity with tokens and rule-based access controls controlling access to the tokens. For example, the passport system 720 can generate a passport for a third party linked to controls such that the third party can only access their own data within the token structure. In some arrangements, a third-party entity can use the passport system 720 to access performance tokens stored in the token structure, such as in a passport associated with the cybersecurity status of an entity, with RBAC rules restrict other entities from viewing or modifying these tokens. Another example can include third-party vendors having access to their own evaluation tokens that include the results of security assessments relevant to their services, without the ability to access data from other vendors.

In some arrangements, the passport system 720 can include one or more processing circuits, including processor(s) and memory. The memory may have instructions stored thereon that, when executed by processor(s), cause the one or more processing circuits to perform the various operations described herein. The operations described herein may be implemented using software, hardware, or a combination thereof. The processor(s) may include a microprocessor, ASIC, FPGA, etc., or combinations thereof. In many implementations, the processor(s) may be a multi-core processor or an array of processors. Memory may include, but is not limited to, electronic, optical, magnetic, or any other storage devices capable of providing processor(s) with program instructions. The instructions may include code from any suitable computer programming language. In some embodiments, the passport system 720 can include an interface circuit and function circuit.

In some arrangements, the passport system 720 can model cyber resilience data using cyber resilience identities and associated metadata. For example, the passport system 720 can use templates to structure cyber resilience data and apply attributes to model various cyber resilience metrics (e.g., threat detection capabilities, response readiness). In some arrangements, the passport system 720 can receive or identify cyber resilience data. For example, the passport system 720 can collect data from various sources, including security incident reports, vulnerability assessments, and system performance metrics. In some arrangements, the passport system 720 can encrypt a portion of the cyber resilience data. For example, the passport system 720 can apply cryptographic techniques to secure sensitive information within the cyber resilience dataset, such as private keys or confidential incident data. In some arrangements, the passport system 720 can generate a metadata object including metadata of cyber resilience data. For example, the metadata object can include information such as data creation timestamps, data source identifiers, and encryption keys. In some arrangements, the passport system 720 can generate a cyber resilience identity including at least a link with the metadata object, a unique identifier (UID), and a performance event dataset. For example, the cyber resilience identity can include a URI linking to the metadata object, a UID for tracking the identity, and a dataset summarizing key performance events.

In some arrangements, the passport system 720 can encapsulate the cyber resilience identity within a container including a control structure restricting one or more updates and redemptions of the metadata object. For example, the container can use access controls and permission rules to prevent unauthorized modifications or access to the metadata object. In some arrangements, the passport system 720 can determine at least one access data structure being compatible with the control structure. For example, the passport system 720 can analyze data structures such as access control lists (ACLs) or role-based access controls (RBAC) to facilitate compatibility with the control structure. In some arrangements, the passport system 720 can broadcast, using the control structure, the cyber resilience identity to a ledger or distributed ledger. For example, the passport system 720 can publish the cyber resilience identity to a blockchain or distributed ledger, and the identify can be securely recorded and accessed by authorized entities via the distributed ledger.

In some arrangements, the token system 102 can generates various tokens. In some arrangements, the token system 102 can generate cyber resilience identities (e.g., a passport including a token linked to various additional tokens with metadata). That is, generating the cyber resilience identities can include generating tokens that include metadata objects or metadata with information corresponding to components and/or metrics of an entity's cybersecurity posture, such as firmographic information, security safeguards, threat detection capabilities, incident response data, compliance metrics, or other relevant cybersecurity information. For example, the token system 102 can generate, mint, or otherwise create unified safeguard tokens, unified requirements tokens, performance tokens, coverage tokens, incident readiness tokens, insurability readiness tokens, gap tokens, effectiveness tokens, and/or various additional tokens. For example, the token system 102 can structure a token to encapsulate data sets related to different aspects of cybersecurity such that a set of tokens can facilitate an evaluation of an entity's security status (e.g., by an insurer or vendor). The various tokens generated by the token system 102 and encapsulated in cyber resilience identities are described in greater detail herein.

In some arrangements, the cyber resilience identities can include a coverage token. The coverage token can be structured to store information about insurance policies, including policy numbers, premium amounts, and coverage data. That is, the token system 102 can generate a coverage token when an entity's insurance coverage data is to be documented and managed. For example, the coverage token can be created to include policy information such as the insured client, domain, and premium data. In generating the cyber resilience identities, the coverage token generated by the token system 102 can include data on insurance coverage, retention terms, and claims associated with the policy. For example, the coverage token may store data related to premium payment schedules, policy numbers, and claim UIDs that are linked to an insurance policy of an entity corresponding to a cyber resilience identity.

In some arrangements, the cyber resilience identities can include an effectiveness token. The effectiveness token can be structured to store a record of an organization's security effectiveness over time, linking to historical data through performance tokens and capturing outcomes related to incidents and claims. That is, the token system 102 can generate an effectiveness token to document and evaluate the results of past and ongoing security measures within an organization. For example, the effectiveness token can be generated to include the unique effectiveness token UID, the creation date, a list of performance tokens, and outcomes related to security incidents and claims. In generating the cyber resilience identities, the effectiveness token generated by the token system 102 can include references to associated performance tokens, incident tokens, and claims tokens, providing a longitudinal view of security effectiveness. For example, the effectiveness token may include data indicative of how various incidents have impacted the organization's security posture over time, including the effectiveness of response efforts and any gaps identified during evaluations.

In some arrangements, the cyber resilience identities can include a gaps token. The gaps token can be structured to record and track information about vulnerabilities and compliance issues within an organization's IT infrastructure. That is, the token system 102 can generate a gaps token to identify and monitor security gaps that could affect an organization's cybersecurity posture. For example, the gaps token may be generated to include a unique gap UID, timestamp, description of the vulnerability, impact description, severity rating, and recommended actions for remediation. In generating the cyber resilience identities, the gaps token generated by the token system 102 can include metadata about each identified gap, including the category of the threat, impact on confidentiality, integrity, and availability, and references to external resources for further information. For example, the gaps token may capture the severity of a local privilege escalation vulnerability in an organization's IT infrastructure and provide recommendations for mitigating the threat.

In some arrangements, the cyber resilience identities can include an IOCs (Indicators of Compromise) token. The IOCs token can be structured to store and describe indicators of malicious activity detected within an organization's environment. That is, the token system 102 can generate an IOCs token when there is a need to catalog and track known indicators of compromise that are associated with cybersecurity incidents. For example, the IOCs token may be generated to include a unique indicator UID, type of indicator (e.g., file hash), description of the indicator, and a pattern representing the malicious activity. In generating the cyber resilience identities, the IOCs token generated by the token system 102 can include data such as the confidence level in the indicator, the type of malicious activity it represents, and the pattern or signature detected. For example, the IOCs token may store information about a malicious file hash associated with a known malware instance, helping to identify and respond to similar threats in the future.

In some arrangements, the cyber resilience identities can include an incident token. The incident token can be structured to capture data about a cybersecurity incident, including the type, date, outcome, and associated claims data. That is, the token system 102 can generate an incident token when to document and manage the lifecycle of a cybersecurity incident within an organization. For example, the incident token may be generated to include a unique incident UID, the title of the incident, incident data such as the type of attack, impacted data, response actions taken, and the associated costs. In generating the cyber resilience identities, the incident token generated by the token system 102 can include references to related tokens, such as TTPs (Tactics, Techniques, and Procedures) tokens, IOCs tokens, and breach team data, providing an overview of the incident. For example, the incident token may document the timeline of a ransomware attack, the response efforts, the root cause analysis, and the financial impact on the organization.

In some arrangements, the cyber resilience identities can include a performance token. The performance token can be structured to provide a record of evaluations associated with safeguards and requirements within an organization (e.g., at a time). That is, the token system 102 can generate a performance token when to store the results of evaluations and assessments related to the organization's cybersecurity safeguards. For example, the performance token may be generated to include a unique performance token UID, the date of creation, safeguard results, safeguard transformation results, and comparison results against predefined requirements. In generating the cyber resilience identities, the performance token generated by the token system 102 can include outcomes of safeguard evaluations, transformation proofs, and any identified gaps in compliance at a point in time. For example, the performance token may track the effectiveness of endpoint security measures, document how well the measures meet the thresholds, and identify areas for improvement.

In some arrangements, the cyber resilience identities can include a ransom token. The ransom token can be structured to capture data about a ransomware incident, including ransom demands, payment data, and outcomes. That is, the token system 102 can generate a ransom token to document and manage the specifics of a ransomware event within an organization. For example, the ransom token may be generated to include a unique ransom UID, the incident UID it is associated with, data of the ransomware attack such as the group involved, payment wallet address, currency type, and the outcome of the payment. In generating the cyber resilience identities, the ransom token generated by the token system 102 can include references to the breach team involved, post-incident follow-up data, and information about the threat actor. For example, the ransom token may document the financial impact of the ransom payment, the success rate of data decryption, and ongoing risks posed by the threat actor.

In some arrangements, the cyber resilience identities can include a TTPs (Techniques, Tactics, and Procedures) token. The TTPs token can be structured to provide an overview of a detected cybersecurity threat event, outlining the tactics, techniques, and procedures identified. That is, the token system 102 can generate a TTPs token to document and analyze adversarial behaviors detected during a cybersecurity incident. For example, the TTPs token may be generated to include a unique TTP UID, event data such as the event code, provider, start and end time, and description of the event, as well as information about the threat, including the tactic employed, techniques used, procedures followed, and the threat actor involved. In generating the cyber resilience identities, the TTPs token generated by the token system 102 can include observations from the event, such as the actions taken by the adversary, the outcome of those actions, and any data artifacts observed. For example, the TTPs token may document a phishing attack, including how the attack was executed, the tools used by the attacker, and the impact on the organization.

In some arrangements, the cyber resilience identities can include a unified asset token. The unified asset token can be structured to provide information about the assets managed within an organization, including types, operational statuses, and associated identifiers. That is, the token system 102 can generate a unified asset token when to document and manage the lifecycle of assets within an organization's IT infrastructure. For example, the unified asset token may be generated to include a unique asset UID, the date of creation, asset data such as type, name, description, location, and owner, and the operational status of the asset. In generating the cyber resilience identities, the unified asset token generated by the token system 102 can include identifiers and sources related to the asset, such as inventory data, cloud provider information, and any additional metadata. For example, the unified asset token may document a server's operational status, its cloud instance data, and any associated identifiers such that an organization can track and monitor assets.

In some arrangements, the cyber resilience identities can include an incident readiness token. The incident readiness token can be structured to capture the attributes that demonstrate an organization's preparedness for responding to cybersecurity incidents. That is, the token system 102 can generate an incident readiness token to document and verify an organization's ability to handle cybersecurity incidents effectively. For example, the incident readiness token may be generated to include a unique incident readiness UID, the associated passport UID, and a description of the organization's readiness to respond to cybersecurity incidents. In generating the cyber resilience identities, the incident readiness token generated by the token system 102 can include attributes such as the incident response plan, training and awareness programs, tools and technologies used, and testing exercises conducted. For example, the incident readiness token can document the organization's annual incident response plan updates, quarterly training sessions, and various additional tools and technologies in place to detect and mitigate cybersecurity threats.

In some arrangements, the cyber resilience identities can include an insurability readiness token. The insurability readiness token can be structured to capture attributes for an organization to qualify for cybersecurity insurance, including risk assessments, security measures, and incident history. That is, the token system 102 can generate an insurability readiness token to document and assess an organization's preparedness for obtaining cybersecurity insurance. For example, the insurability readiness token may be generated to include a unique insurability readiness UID, the carrier UID, the associated passport UID, and a description of the organization's preparedness for cybersecurity insurance. In generating the cyber resilience identities, the insurability readiness token generated by the token system 102 can include attributes such as risk assessments, security measures, documentation and compliance, and incident history. For example, the insurability readiness token may document the organization's annual risk assessments, the implementation of strong cybersecurity controls, and the effective mitigation of past incidents, providing an overview of the organization's qualifications for cybersecurity insurance.

In some arrangements, the cyber resilience identities can include or be associated with a passport, which can be a token or a distinct entity interacting with other tokens. The passport can be structured to encapsulate information about an entity, including firmographic data, indicators of cybersecurity readiness, and more. That is, the token system 102 can generate or link to a passport to provide certain information corresponding to an entity's cybersecurity posture and readiness for insurance purposes. For example, the passport can contain or link to various tokens, such as unified safeguard tokens, unified requirements tokens, performance tokens, coverage tokens, incident readiness tokens, insurability readiness tokens, gap tokens, effectiveness tokens, and/or various additional tokens. For example, the token system can generate a cyber resilience identity or passport providing access to metadata inclusive of various cyber resilience data (e.g., entity's legal structure, number of protected records, preparedness for cyber insurance, etc.) through linked tokens. Additional, token system can 102 can generate the passport linked with a control structure to limit access to data and updates, as further described herein.

In some arrangements, the wallet system 712 can include one or more processing circuits, including processor(s) and memory. The memory may have instructions stored thereon that, when executed by processor(s), cause the one or more processing circuits to perform the various operations described herein. The operations described herein may be implemented using software, hardware, or a combination thereof. The processor(s) may include a microprocessor, ASIC, FPGA, etc., or combinations thereof. In many implementations, the processor(s) may be a multi-core processor or an array of processors. Memory may include, but is not limited to, electronic, optical, magnetic, or any other storage devices capable of providing processor(s) with program instructions. The instructions may include code from any suitable computer programming language. In some embodiments, the wallet system 712 can include an interface circuit and function circuit.

In some arrangements, the wallet system 712 can include a storage mechanism for holding digital assets, including cyber resilience tokens, private keys, and access credentials. In some examples, the wallet system 712 can perform cryptographic operations to encrypt and decrypt token-related data and sign transactions, authenticating the user computing system 110 during interactions with the passport system 720 and the ledger system 730. The wallet system 712 can manage permissions and access control so that authorized can entities initiate or authorize updates to the cyber resilience tokens stored within the ledger system 730. In some arrangements, the wallet system 712 can communicate with dynamic non-fungible tokens (DNFTs) or other various tokens associated with the cyber resilience identity. For example, the wallet system 712 can store and manage multiple NFTs or DNFTs representing different aspects of a cybersecurity posture (e.g., cyber resilience status) of an organization or entity. The wallet system 712 can facilitate updates to the tokens by performing cryptographic operations that validate and record changes to the cybersecurity data encapsulated within the DNFTs. The wallet system 712 can also provide an interface that authorized entities use to access and manage the DNFTs, facilitating the review and assessment of the cybersecurity posture of the entity over time.

In some arrangements, the wallet system 712 can store, create, and update a variety of tokens associated with the cybersecurity posture of an organization or entity. The wallet system 712 can create and update performance tokens, which can include results of cybersecurity events, assessments, or incident responses (e.g., a security breach response or a periodic vulnerability assessment). The wallet system 712 can create and maintain unified tokens, which can include data representing the state of various cybersecurity elements over time (e.g., safeguards implemented across the organization, internal and third-party requirements compliance, or asset management). The wallet system 712 can capture and record evaluation tokens, which can include cybersecurity data captured at multiple points in time (e.g., snapshots of the organization cybersecurity posture at regular intervals). The wallet system 712 can aggregate and store roll-up tokens, which can include combined data from unified and real-time tokens to provide a view of the cybersecurity performance over a specified period (e.g., annual security performance summary). The wallet system 712 can create and update resilience tokens, which can include tokens representing different dimensions of the organization cybersecurity posture (e.g., tokens for cybersecurity resilience metrics). The wallet system 712 can further provide interfaces for entities to access, manage, and review the various tokens.

In some arrangements, the systems or components of FIG. 7 can communicate over network 120. Network 120 can include computer networks such as the Internet, local, wide, metro or other area networks, intranets, satellite networks, other computer networks such as voice or data mobile phone communication networks, combinations thereof, or any other type of electronic communications network. Network 120 can include or constitute a display network. As a non-limiting example, network 120 can implement transport layer security (TLS), secure sockets layer (SSL), hypertext transfer protocol secure (HTTPS), and/or any other secure communication protocol. In some arrangements, network 120 can be composed of various network devices (nodes) communicatively linked to form one or more data communication paths between participating devices. The network 120 can facilitate communication between the various nodes, such as the user computing system(s) 110, third-party system(s) 150, passport system 720, etc. (e.g., using an OSI layer-4 transport protocol such as the User Datagram Protocol (UDP), the Transmission Control Protocol (TCP), Stream Control Transmission Protocol (SCTP), etc.). Each networked device can include at least one network interface for receiving and/or transmitting data, typically as one or more data packets. An illustrative network 120 is the Internet (however, other networks can be used). Network 120 can be an autonomous system (AS), i.e., a network that is operated under a consistent unified routing policy (or at least appears to from outside the AS network) and is generally managed by a single administrative entity (e.g., a system operator, administrator, or administrative group).

In some arrangements, the ledger system 730 can include one or more processing circuits, including processor(s) and memory. The memory may have instructions stored thereon that, when executed by processor(s), cause the one or more processing circuits to perform the various operations described herein. The operations described herein may be implemented using software, hardware, or a combination thereof. The processor(s) may include a microprocessor, ASIC, FPGA, etc., or combinations thereof. In many implementations, the processor(s) may be a multi-core processor or an array of processors. Memory may include, but is not limited to, electronic, optical, magnetic, or any other storage devices capable of providing processor(s) with program instructions. The instructions may include code from any suitable computer programming language. In some embodiments, the ledger system 730 can include an interface circuit and function circuit.

In some arrangements, the ledger system 730 can be a ledger or a decentralized ledger. For example, the ledger system 730 can include a distributed ledger technology (DLT) that supports immutable record-keeping and secure data transactions. The ledger system 730 can store various types of tokens and cybersecurity data, including performance tokens, unified tokens, evaluation tokens, roll-up tokens, and resilience tokens. The ledger system 730 can securely record updates and changes to tokens (e.g., providing data integrity and traceability). For example, the ledger system 730 can use blockchain to provide a tamper-evident record of token-related transactions.

In some arrangements, the ledger system 730 can include smart contract storage 732, blockchain 170, and token storage 734. In some arrangements, the smart contract storage 732, blockchain 170, and/or token storage 734 can include one or more processing circuits, including processor(s) and memory. The memory may have instructions stored thereon that, when executed by processor(s), cause the one or more processing circuits to perform the various operations described herein. The operations described herein may be implemented using software, hardware, or a combination thereof. The processor(s) may include a microprocessor, ASIC, FPGA, etc., or combinations thereof. In many implementations, the processor(s) may be a multi-core processor or an array of processors. Memory may include, but is not limited to, electronic, optical, magnetic, or any other storage devices capable of providing processor(s) with program instructions. The instructions may include code from any suitable computer programming language. In some embodiments, the smart contract storage 732, blockchain 170, and/or token storage 734 can include an interface circuit and function circuit.

In some arrangements, smart contract storage 732 can manage and execute predefined agreements related to token transactions and updates. In one example, smart contract storage 732 can store role-based access controls (RBACs or other rule-based control systems) or other access control mechanisms restricting access or updates to tokenized cyber resilience data stored via the ledger system 730. In some examples, the smart contract storage 732 can store rules or other data to automate processes such as token validation, data access control, and compliance checks. For example, smart contract storage 732 can store smart contracts that define the rules and logic for managing token transactions and updates. In some examples, smart contract storage 732 can manage contract templates that specify access permissions, including RBACs to restrict access based on user roles. That is, the smart contract storage 732 can implement RBAC to control permissions for executing transactions or modifying token data. Smart contract storage 732 can execute stored access controls/smart contracts to enforce access permissions, validate transactions, and verify compliance of entities or organizations with various cyber resilience parameters. In some arrangements, smart contract storage 732 can process transactions according to terms, parameters, or rules to restrict access to tokens or other cyber resilience data.

In some arrangements, blockchain 170 can include a decentralized ledger that records and validates token transactions. For example, blockchain 170 can utilize consensus mechanisms (e.g., proof of provenance, proof of work, proof of stake) to validate transactions involving tokenized cyber resilience data across a distributed network. In some examples, blockchain 170 can provide a tamper-evident and/or immutable record of token data by employing cryptographic techniques (e.g., hashing functions) to record and verify token transactions. That is, blockchain 170 can provide transparency and traceability of token-related activities by securely recording token transactions on a distributed computing architecture.

In some arrangements, token storage 734 can store tokenized cyber resilience data. For example, token storage 734 can store and/or manage tokens including performance tokens, unified tokens, evaluation tokens, and roll-up tokens generated and/or provided by the token system 102. In some examples, token storage 734 interfaces with blockchain 170 to manage and organize token data. For example, token storage 734 can handle different token types, including performance tokens, unified tokens, evaluation tokens, and roll-up tokens. Token storage 734 can utilize data structures such as relational databases, NoSQL databases, or file systems to organize and manage tokens and/or corresponding data. In some examples, token storage 734 can maintain data accuracy by integrating with blockchain 170 to validate and update token records.

In some arrangements, the passport system 720 can include one or more systems and/or subsystems to model cyber resilience data using cyber resilience identities and associated metadata (e.g., cryptographic system 722, ledger interface 724, token system 726, and metadata collection system 728). In some arrangements, the cryptographic system 722, ledger interface 724, token system 726, and/or metadata collection system 728 can include one or more processing circuits, including processor(s) and memory. The memory may have instructions stored thereon that, when executed by processor(s), cause the one or more processing circuits to perform the various operations described herein. The operations described herein may be implemented using software, hardware, or a combination thereof. The processor(s) may include a microprocessor, ASIC, FPGA, etc., or combinations thereof. In many implementations, the processor(s) may be a multi-core processor or an array of processors. Memory may include, but is not limited to, electronic, optical, magnetic, or any other storage devices capable of providing processor(s) with program instructions. The instructions may include code from any suitable computer programming language. In some embodiments, the cryptographic system 722, ledger interface 724, token system 726, and/or metadata collection system 728 can include an interface circuit and function circuit.

In some arrangements, the metadata collection system 728 can receive or identify cyber resilience data. That is, receiving or identifying can include the metadata collection system 728 acquiring, processing, and categorizing data from various sources, such as cybersecurity events, system performance metrics, and vulnerability assessments stored on ledger system 730. For example, the metadata collection system 728 can gather and/or organize data attributes like event timestamps, sources, and types corresponding to an entity's cyber resilience status and other cyber protection information. Additionally, the metadata collection system 728 can link these data attributes to cyber resilience metrics and update the corresponding records to reflect changes in the entity's cyber protection posture.

In some arrangements, the cryptographic system 722 can encrypt a portion of the cyber resilience data. That is, encrypting can include the cryptographic system 722 securing sensitive data using cryptographic techniques tailored to the requirements of the data. For example, the cryptographic system 722 can apply encryption algorithms to protect sensitive data, such as performance metrics or identifiers of an organization or entity. Further, the cryptographic system 722 can utilize key management techniques to facilitate secure data encryption and decryption process such that only authorized entities can access the encrypted data. Additionally, the cryptographic system 722 can use asymmetric encryption to secure data before it is stored or transmitted. For example, the cryptographic system 722 can apply hashing algorithms to verify the integrity of data associated with cyber resilience events and assessments such that the data remains unaltered during transmission or storage.

In some arrangements, the token system 726 and/or metadata collection system 728 can generate a metadata object including metadata of cyber resilience data. That is, the token system 726 can create structured metadata objects that include information about tokenized data, such as fields, tags, headers, and other relevant attributes like data type, source, and context. For example, the token system 726 can organize metadata into formats that provide descriptions and classifications for each element of cyber resilience data. Further, the metadata collection system 728 can collect and integrate various metadata elements, such as timestamps, source identifiers, and data relevance indicators, into the metadata object. Additionally, the token system 726 can structure the metadata to improve the understanding and usability of the collected cyber resilience data.

In some arrangements, the token system 726 can generate a cyber resilience identity including at least a link with the metadata object, a unique identifier (UID), and a performance event dataset. That is, generating can include creating, associating, and linking metadata objects, unique identifiers, and performance datasets with an identifier of n organization or entity. For example, the token system 726 can generate a passport that links to metadata stored in one or more tokens, each containing data related to different aspects of an entity's cyber resilience. The passport can include a unique identifier for tracking and linking the metadata object to other associated tokens. Further, the performance event dataset within the passport can capture and store cyber resilience performance data, such as that stored in multiple performance tokens, which may be collected at different points in time. For example, the token system 726 can issue or mint tokens linked to a single token that reference metadata objects and include unique identifiers for tracking, and the token system 726 can embed performance metrics and historical data within the tokens to provide insights into cyber resilience.

In some arrangements, the token system 726 can encapsulate the cyber resilience identity within a container that includes a control structure restricting one or more updates and redemptions of the metadata object. That is, encapsulating can include implementing token gating mechanisms or smart contracts to enforce rules on who can update or redeem the cyber resilience identity, based on predefined criteria and access control policies. For example, the token system 726 can establish a control structure that allows a customer to view relevant data within their own passport while restricting an insurer's access to only tokenized data for underwriting decisions. Generally, the passport system 720 can implement a control structure that enforces rules on who can update or redeem the cyber resilience identity based on predefined criteria (e.g., entity type, user preferences/selections, etc.).

In some arrangements, the ledger interface 724 can determine at least one access data structure that is compatible with the control structure. That is, determining can include analyzing various data structures to identify or determine alignment with the access control policies and update restrictions defined by the control structure. For example, the ledger interface 724 can evaluate different data structures to verify compatibility with access levels and permissions for interacting with the cyber resilience identity. Additionally, the ledger interface 724 can select and implement data structures that support the secure and compliant management of access and updates within the token system 726.

The control structure (e.g., implemented as a smart contract) governs access to a token structure containing various tokens, such as performance tokens, unified tokens, evaluation tokens, and roll-up tokens. The token structure can include metadata, such as unique identifiers (UIDs), creation timestamps, and links to related data sets. The smart contract specifies predefined rules for accessing and updating these tokens. The ledger interface 724 can process the smart contract to extract rules that define role-based access control (RBAC) permissions. For example, the smart contract can specify that each third party can only access their own data within the token structure. In some arrangements, a third-party entity can have access its own performance tokens stored in the token structure, such as in a passport associated with the cybersecurity status of an entity. The RBAC rules restrict other entities from viewing or modifying these tokens. Another example can include third-party vendors having access to their own evaluation tokens that include the results of security assessments relevant to their services, without the ability to access data from other vendors.

The ledger interface 724 can configure the selected access data structure to enforce these RBAC permissions as extracted from the smart contract. That is, the configuration can include mapping the access permissions to the token structure, linking each token type to the appropriate access control mechanisms. For example, performance tokens related to a particular third-party can be linked to a role of the third-party. Similarly, unified tokens related to internal compliance can only be accessible by authorized roles within the organization itself (e.g., excluding third-party access). The ledger interface 724 can integrate the configuration within the ledger system 730 to apply the rules of the control structure to token-related operations. The RBAC can facilitate access to tokens to entities or individuals that have been granted access or authorized to read, update, or add. For example, the control structure can use an access level of an entity or individual to determine whether to allow a user to read data but not update or add to the data (e.g., a third-party insurer can access performance datasets on performance tokens linked to a passport of the prosecutive insured, but can be restricted from modifying certain performance data stored thereon), to have full rights (e.g., read/update/add, etc.), and so on. That is, the passport system 720 can provide an access level or permissions to a person or entity attempting to access or otherwise interact with tokenized data corresponding to a cyber resilience identity, and the access level/permissions can be used by the passport system 720 to restrict or allow the user or entity to perform various actions related to the tokens.

In some arrangements, if the smart contract is modified, the ledger interface 724 can reconfigure the access data structures to match the updated RBAC rules. For example, if the smart contract is updated to change access permissions for a particular third-party entity, the ledger interface 724 can adjust the RBAC configurations to reflect this change such that the access control mechanisms allows access and is consistent with the control structure. In some arrangements, an access data structure can function as a token or another access control mechanism within the token structure. That is, the access data structure can facilitate operations, such as reading, writing, adding, or removing metadata objects associated with tokens in the cyber resilience identity (e.g., also operating and implemented as a token). For example, an access control token can link to other tokens representing performance, evaluation, or resilience data. The access control token can encapsulate the permissions for interacting with the tokens and can include metadata defining allowed operations and roles or entities authorized to perform each operation. Additionally, an access data structure can implement write access to one or more metadata objects within the token structure. For example, an access control token can identify which entities have permission to update particular aspects of the cyber resilience identity, such as modifying performance metrics or altering the status of an evaluation token. Another access data structure can be used to manage read permissions, restricting a third-party entity to viewing metadata associated with its own tokens within the structure without granting modification rights. In some arrangements, an access control structure can function as a token that defines hierarchical permissions across multiple tokens. For example, a control structure token can specify that only a designated role within an organization has the authority to add or remove tokens from the cyber resilience identity. Additionally, the access control token can be used to facilitate interactions with other tokens within the token structure to apply these permissions.

In some arrangements, the ledger interface 724 can broadcast, using the control structure, the cyber resilience identity to a ledger or distributed ledger. That is, broadcasting can include publishing, sharing, or otherwise transmitting a passport (e.g., cyber resilience identity) of an entity. For example, the ledger interface 724 can transmit the cyber resilience identity to a blockchain or similar distributed ledger to maintain an immutable record of the cyber resilience identity and associated data. Additionally, the ledger interface 724 can store the cyber resilience identity locally (e.g., in a back-end database or other local data store). Further, the ledger interface 724 can transmit or send the cyber resilience identity (e.g., via a shareable link) to various entities, who can access a portion of the data corresponding with the cyber resilience identity but not access another portion of the data based on various access controls.

Figure 8:
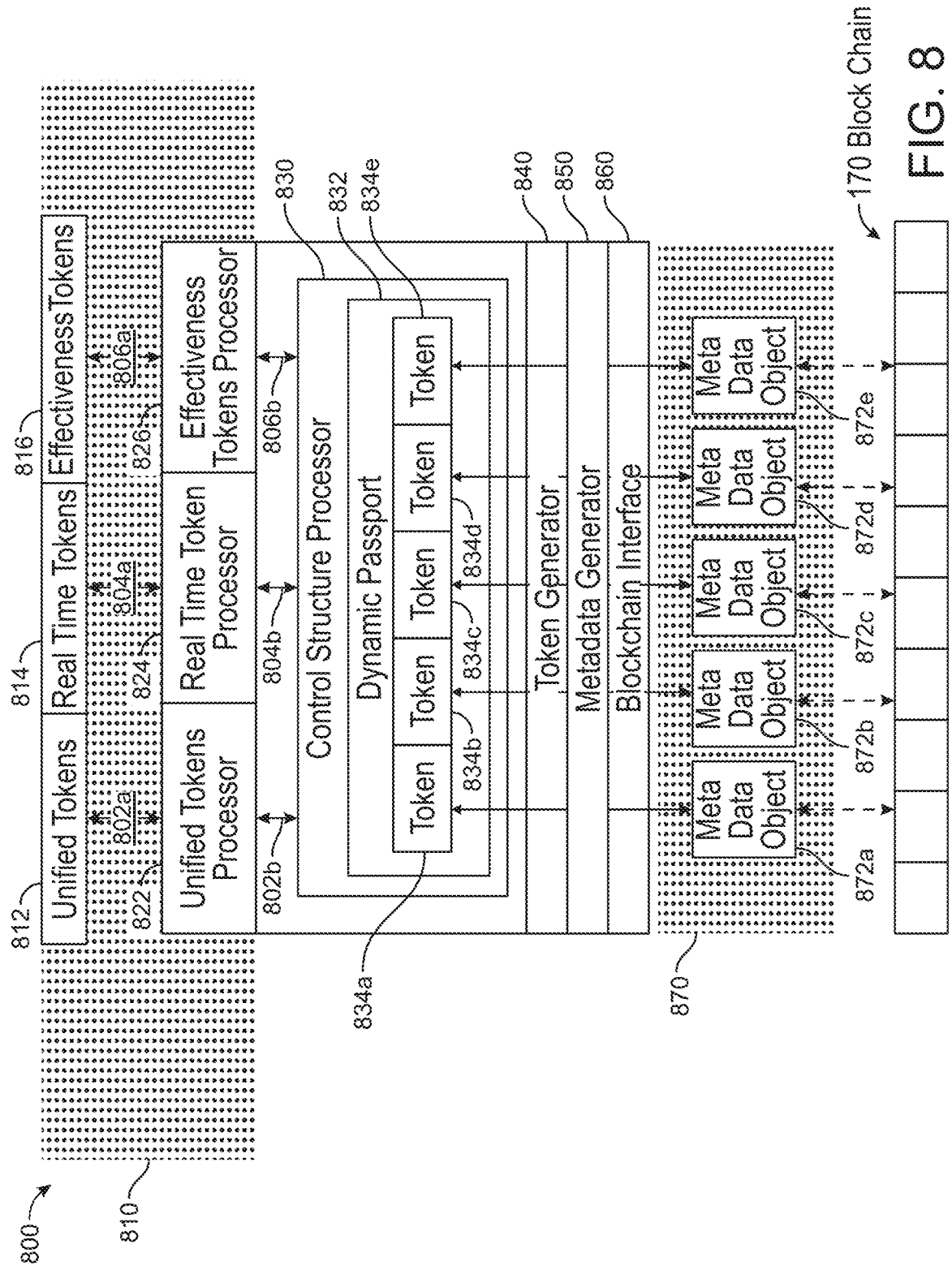
FIG. 8 depicts a block diagram of a more detailed architecture of certain systems or devices of FIG. 7, according to some arrangements.
Figure 9:
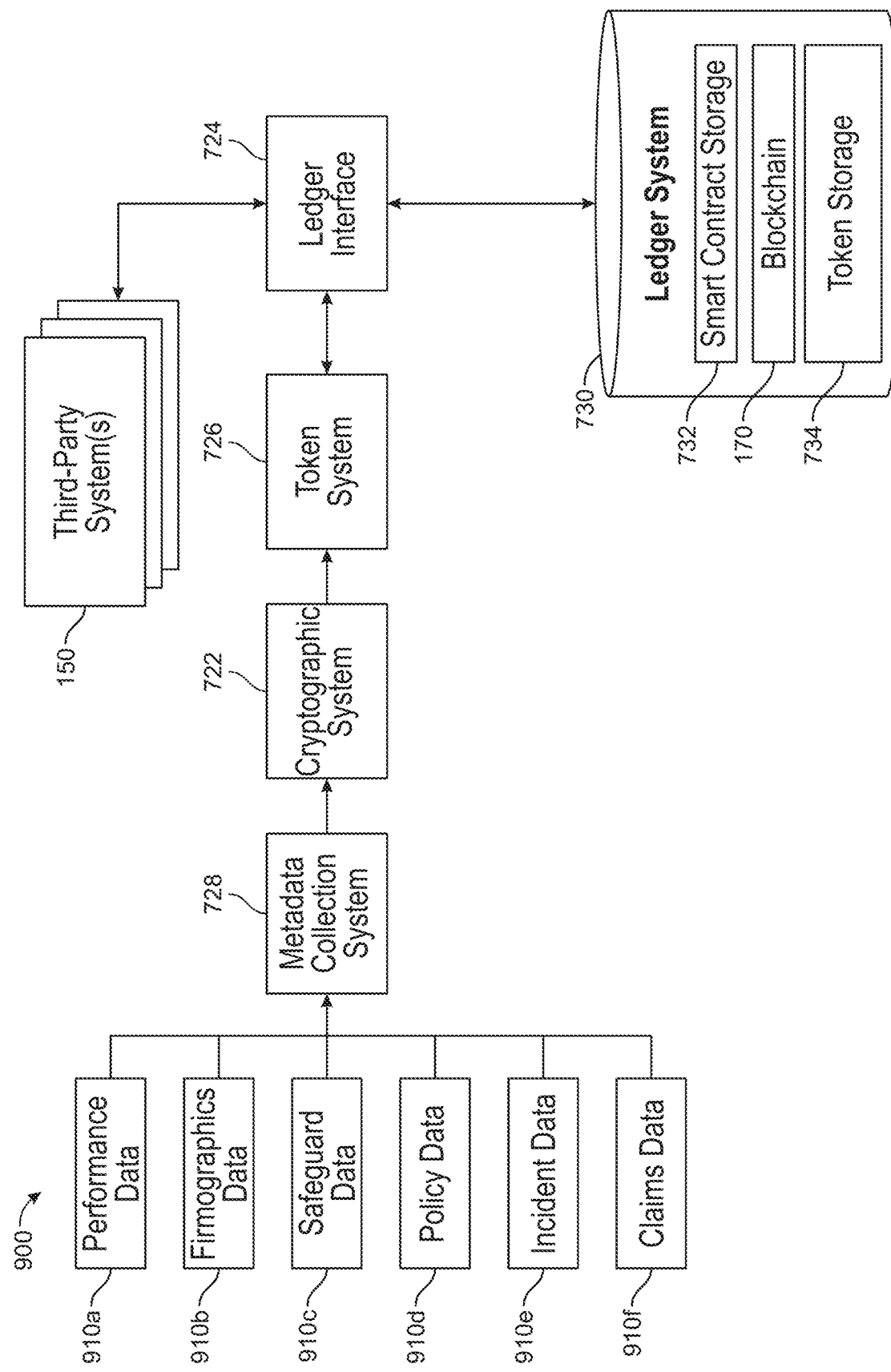
FIG. 9 depicts a block diagram of a more detailed architecture of certain systems or devices of FIG. 7, according to some arrangements.

Referring now to FIG. 8, a block diagram of an architecture of certain systems or devices of FIG. 7 is shown, according to some arrangements. The implementation shown in FIG. 8 can include a token interface 810 including unified tokens 812, real-time tokens 814, and effectiveness tokens 816. The implementation shown in FIG. 8 can also include a smart contract control structure 820 including a unified token processor 822, a real-time token processor 824, and an effectiveness token processor 826. Further, the smart contract control structure 820 can include a control structure processor 830, a token generator 840, a metadata generator 850, and a blockchain interface 860. In some arrangements, the control structure processor 830 can include a dynamic passport 832, and dynamic passport 832 can include tokens 834*a*-834*e* (collectively, 834). Each of the tokens 834 can be linked to a metadata interface 870 including one or more metadata objects 872*a*-872*e* (collectively, metadata objects 872). In some arrangements, the implementation shown in FIG. 8 can include blockchain 170.

In some arrangements, FIG. 8 depicts an example smart contract control structure 820. In some examples, the unified token processor 822, real-time token processor 824, and effectiveness token processor 826 can detect a presence of a token (fungible, non-fungible, partially-fungible, etc.), and can transmit the token to a compatibility processor (e.g., 822, 824, 826) compatible with that particular token. The detection can be responsive to an action by the token interface 810 to transmit the tokens to the smart contract control structure 820. In some examples, the token interface 810 can include a communication channel between one or more of the smart contract control structure 810 and one or more of the unified tokens 812, real-time tokens 814, and effectiveness tokens 816. The token interface 810 can include an application programming interface compatible with the smart contract control structure 820 to detect various cyber resilience tokens. At least the token interface 810 or the smart contract control structure 820 can execute one or more instructions to determine whether one or more of the tokens are compatible with the smart contract control structure 820.

In some arrangements, the unified token processor 822 can perform detection of unified tokens 812 via a link 802*a* or other communication channel (e.g., via a network such as network 120). The detection can be responsive to receiving a unified token from token system 102, user computing systems 110, or third-party systems 150, over link 802*a*. The unified token processor 822 can be configured to be compatible with a unified token 812, or can be generated to be compatible with a particular unified token 812. For example, the unified token processor 822 can be integrated with or store a hash based on a unified token 812 and a hash processor operable to generate a hash based on any unified token 812. The unified token processor 822 can generate a hash in response to detecting the presence of the unified token 812, and can determine whether the unified token 812 is compatible with the smart contract control structure 820 by comparing the generated hash with the stored hash. The unified token processor 822 can include logic to detect a unified token 812 passed to it, by, for example, a JSON object or a header argument. Additionally, the unified token processor 822 can provide the detected unified token to the control structure processor 830 via link 802*b*.

In some arrangements, the real-time token processor 824 can perform detection of real-time tokens 814 via link 804*a*. The detection can be responsive to receiving a real-time token 814 from token system 726, user computing systems 110, or third-party systems 150, over link 804*a*. For example, the real-time token processor 824 can be integrated with or store a hash based on a real-time token 814 and a hash processor operable to generate a hash based on any real-time token 814. The real-time token processor 824 can generate a hash in response to detecting the presence of the real-time token 814, and can determine whether the real-time token 814 is compatible with the smart contract control structure 820 by comparing the generated hash with the stored hash. The real-time token processor 824 can include logic to detect a real-time token 814 passed to it, by, for example, a JSON object or a header argument. Additionally, real-time token processor 824 can provide the detected real-time token 814 to the control structure processor 830 via link 804*a*.

In some arrangements, the effectiveness token processor 826 can perform detection of effectiveness tokens 816 via link 806*a*. The detection can be responsive to receiving an effectiveness token 816 from token system 726, user computing systems 110, or third-party systems 150, over link 806*a*. For example, the effectiveness token processor 826 can be integrated with or store a hash based on an effectiveness token 816 and a hash processor operable to generate a hash based on any effectiveness token 816. The effectiveness token processor 826 can generate a hash in response to detecting the presence of the effectiveness token 816, and can determine whether the effectiveness token 816 is compatible with the smart contract control structure 820 by comparing the generated hash with the stored hash. The effectiveness token processor 826 can include logic to detect an effectiveness token 816 passed to it, by, for example, a JSON object or a header argument. Additionally, the effectiveness token processor 826 can provide the detected effectiveness token 816 to the control structure processor 830 via link 806*b*.

In some arrangements, the smart contract control structure 820 can include a control structure processor 830 configured to generate and/or store tokens 834. The tokens 834 can include one or more unified tokens 812, real-time tokens 814, and effectiveness tokens 816. That is, responsive to receiving one or more of the unified tokens 812, real-time tokens 814, and effectiveness tokens 816 from the unified token processor 822, real-time token processor 824, and/or effectiveness token processor 826, the control structure processor 830 can receive the tokens 834 via links 802*b*, 804*b*, and/or 806*b*. In some implementations, the control structure processor 830 can generate a container metadata object, such as a wrapper, where a control structure (e.g., a smart contract) is wrapped or otherwise linked to dynamic passport 832, which can further include links to metadata (e.g., stored data, fields, etc.) of tokens 834. For example, the dynamic passport 832 can be encapsulated in a container with a control structure and can generated by metadata generator 850 as part of the metadata interface 870. The container linking dynamic passport 832 and the control structure can provide access to the tokenized cyber information based on the control structure.

In some arrangements, the control structure processor 830 can generate a dynamic passport 832 including a token with a link to (e.g., encapsulated in) a container. The link can be established via a digital signature or cryptographic hash that securely associates the dynamic passport 832 with corresponding metadata. The dynamic passport 832 can be provided to a metadata interface 870 such that a blockchain (e.g., blockchain 170) can verify and store the metadata securely on the chain. Additionally, the control structure processor 830 can encapsulate the dynamic passport 832 and tokens 834 within the smart contract control structure 820 to provide the container. For example, encapsulating can include encrypting the data and setting permissions for data access. That is, the encapsulation can restrict outputs of the container metadata object and the metadata objects 872. For example, when the dynamic passport 832 and tokens 834 are encapsulated, the control structure processor 830 may output when conditions or permissions are verified. In another example, when the dynamic passport 832 and tokens 834 are encapsulated in a container, the control structure processor 830 may output when a valid decryption key is presented. For example, the control structure processor 830 can authorize transactions after verifying that compliance and regulatory requirements are met based on data of the tokens 834.

In some arrangements, the control structure processor 830 can be configured to perform segmentation or allocation of tokens 834 of the dynamic passport 832 based on parameters by accessing the metadata of a token and container and evaluating compliance with cyber resilience standards. Accordingly, the control structure processor 830 can automatically pool (or tranche) asset tokens (associated with underlying assets) based on parameters. For example, the parameters can be programmed into smart contracts of the control structure processor 830. For example, the dynamic passport 832 can include one or more segmented allocations of the tokens 834 (e.g., with token 834*a* and 834*b* segmented into an allocation and tokens 834*c*-834*e* segmented into another allocation). While not shown in FIG. 8, a segmented allocation smart contract control structure can be within the smart contract control structure 820 and be operated by the control structure processor 830. In some examples, this integration facilitates automated re-segmentation based on real-time data analysis. In another example, this integration facilitates compliance checks and performance tracking without external system intervention.

In some arrangements, each of the tokens 834 can include metadata objects 872. For example, links 809 can connect each token 834 to a respective metadata object 872. In some examples, the metadata interface 870 can be utilized to connect each token 834 to its metadata object 872. For example, the token 834*a* can be connected to the metadata object 872*a* via the link 809*a*, the token 834*b* can be connected to the metadata object 872*b* via the link 809*b*, and so on.

In some examples, the metadata interface 870 can include a communication channel between one or more of the tokens in the smart contract control structure 820 and metadata objects of blockchain 170. That is, metadata objects 872 can be accessed and verified through blockchain transactions to verify integrity and authenticity. Furthermore, blockchain 170 can store links to the metadata objects 872 or store the metadata objects 872 in blocks of the blockchain 170. For examples, the blockchain 170 can store the metadata objects 872 in blocks to verify that participants have consistent and unalterable access to the cyber resilience information stored in the tokens 834 of the dynamic passport 832.

In some arrangements, the token interface 810 can include an application programming interface compatible with the smart contract control structure 820 to detect various cyber resilience tokens. In some examples, at least the token interface 810 or the smart contract control structure 820 can execute one or more instructions to determine whether one or more of the tokens (e.g., tokens 834 or corresponding unified tokens 812, real-time tokens 814, and/or effectiveness tokens 816) are compatible with the smart contract control structure 820.

In some arrangements, the token generator 840 (e.g., token system 726) can generate one or more tokens (e.g., fungible, semi-fungible, or non-fungible tokens, collectively referred to herein as "controllable electronic records") in accordance with a token obtained at one or more of the unified token processor 822, real-time token processor 824, and/or effectiveness token processor 826. For example, the token generator 840 can generate tokens based on a number of new metadata objects indicated by an obtained token, and linked with respective smart contract control structures. For example, the token generator 840 can generate a cyber resilience identity (e.g., dynamic passport 832) with links to one or more tokens each linked with a particular smart contract control structure 820 with which the respective token is compatible. The token generator 840 can thus generate a corresponding number of keys that can control restrictions on output by the particular metadata object linked with the particular smart contract control structure compatible with the particular token. The token generator 840 can modify and delete tokens (e.g., tokens 834) linked with cyber resilience identity (e.g., dynamic passport 832), to update control of a partial distribution or exchange of metadata object control.

In some arrangements, the metadata generator 850 can generate one or more metadata objects (e.g., metadata objects 872) in accordance with a token obtained at one or more of the unified token processor 822, real-time token processor 824, and/or effectiveness token processor 826 (e.g., at a compatibility processor). That is, the metadata object can include metadata of cyber resilience data. For example, metadata generator 850 can generate multiple tokens based on a number of new metadata objects linked with respective smart contract control structures and encapsulated in a container with a cyber resilience identity (e.g., passport). For example, the metadata generator 850 can generate one or more metadata objects 872 each linked to respective tokens 834 and further linked, via the tokens 834, to the dynamic passport 832 with a particular smart contract control structure 820 by which the metadata object co is controlled. In some examples, the metadata generator 850 can modify and delete metadata objects linked with tokens or smart contract control structures to update control of a partial transfer of metadata object control. Further, the metadata generator 850 can modify and/or update tokens and/or associated information of existing tokens (e.g., tokens 834) corresponding to a cyber resilience identity (e.g., passport 832).

In some arrangements, the blockchain interface 860 can include an API compatible with the blockchain 170 via metadata generator 850. The blockchain interface 860 can selectively add, modify, and delete blocks from the blockchain 170. The blockchain interface 860 can add, modify, and delete blocks in accordance with restrictions or interfaces of the blockchain 170, and can add, modify, and delete blocks independently of the restrictions or interfaces of the blockchain 170 at any portion or index of the blockchain 170.

Figure 10A:
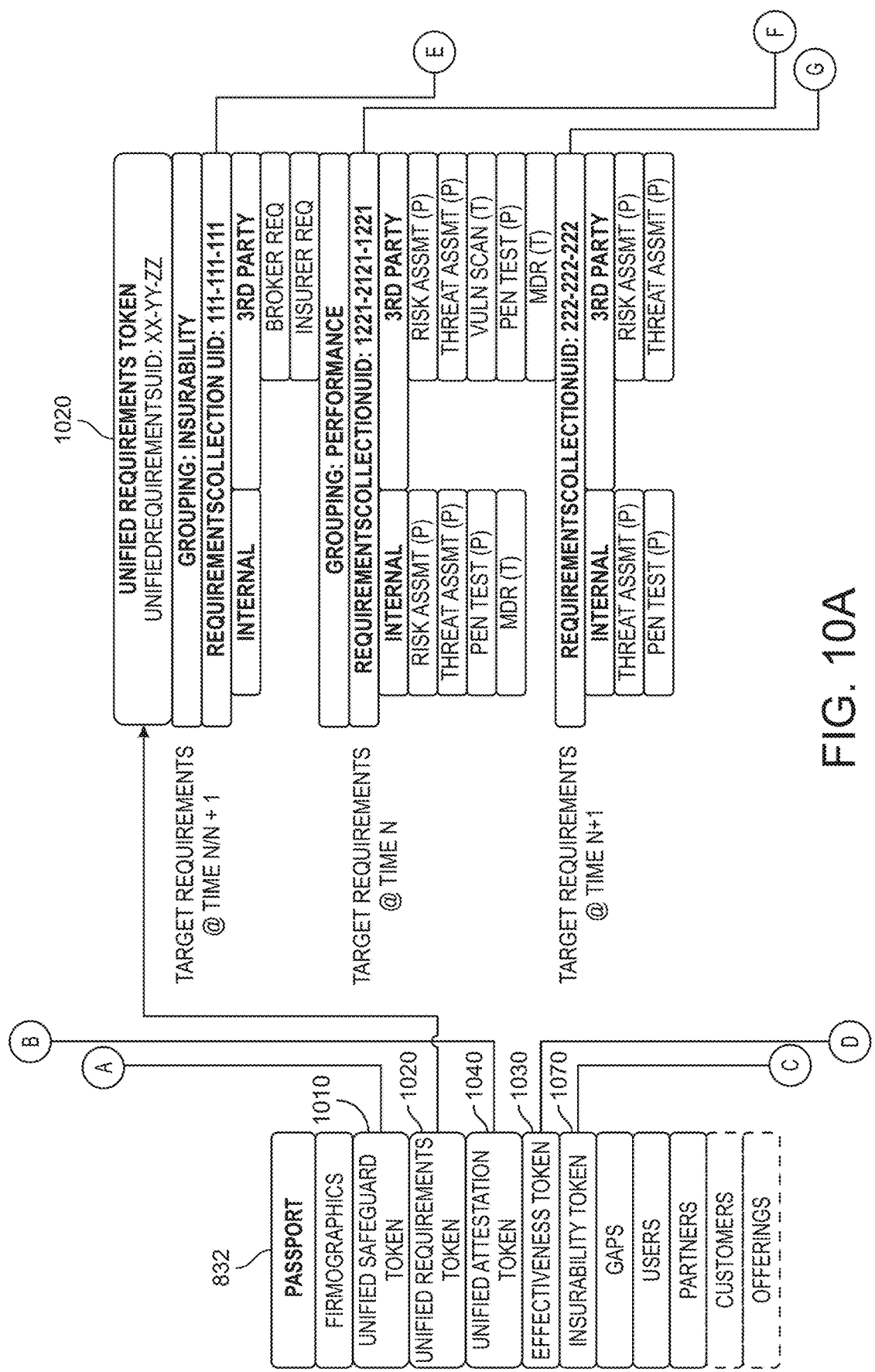
FIGS. 10A-10I depict an architecture for tokenized cyber resilience data, according to some arrangements.

Referring generally to FIGS. 10A-10I, an architecture for tokenized cyber resilience data is shown, according to some arrangements. Referring now to FIG. 10A, the dynamic passport 832 can include various cyber resilience data, such as firmographics data, unified safeguards token 1010, unified requirements token 1020, unified attestation token 1040, effectiveness token 1030, insurability token 1070a, gap information, users, partners, customers, offerings, and so on. In some examples, the unified safeguards token 1010 can receive data/be linked with other systems or data via point A, the unified attestation token 1040 can receive data/be linked with other systems or data via point B, the effectiveness token can receive data/be linked with other systems or data via point C, and the insurability token 1070a can receive data/be linked with other systems or data via point D, as further described herein. In some arrangements, entities can interact with and/or access the dynamic passport 832 and/or linked tokens (e.g., unified safeguards token 1010, unified requirements token 1020) based on various rules (e.g., access controls with various access parameters).

In some arrangements, FIG. 10 illustrates tokenized cyber security data over various times (e.g., time N/N+1, time N, time N+1, etc.). In some arrangements, unified tokens (e.g., unified safeguards token 1010, unified requirements token 1020, unified attestation token 1040, etc.) can store metadata of cyber resilience data over a time period. For example, the unified requirements token 1020 can be generated by the token system 726 and can include a unified requirements UID and an insurability grouping with grouped cyber resilience data. In another example, the unified requirements token 1020 can include a first requirements collection UID corresponding to requirements (e.g., cyber resilience standards for a policy) at a first time (e.g., time N/N+1), which can be linked with other systems/and or data via point E, as further described herein. In another example, the unified requirements token 1020 can include a second requirements collection UID corresponding to requirements at a second time (e.g., time N+1), which can be linked with other systems/and or data via point F, as further described herein. Still yet, in another example, the unified requirements token 1020 can include a third requirements collection UID corresponding to requirements at a third time (e.g., time N), which can be linked with other systems/and or data via point G, as further described herein. For example, the first, second, and third UID can correspond to various internal and/or third-party cyber resilience requirements at different times, such as risk assessment data, threat assessment data, other testing data, MDR data, pen test data, vulnerability scan data, broker requirements, insurer requirements, and so on.

Figure 10B:
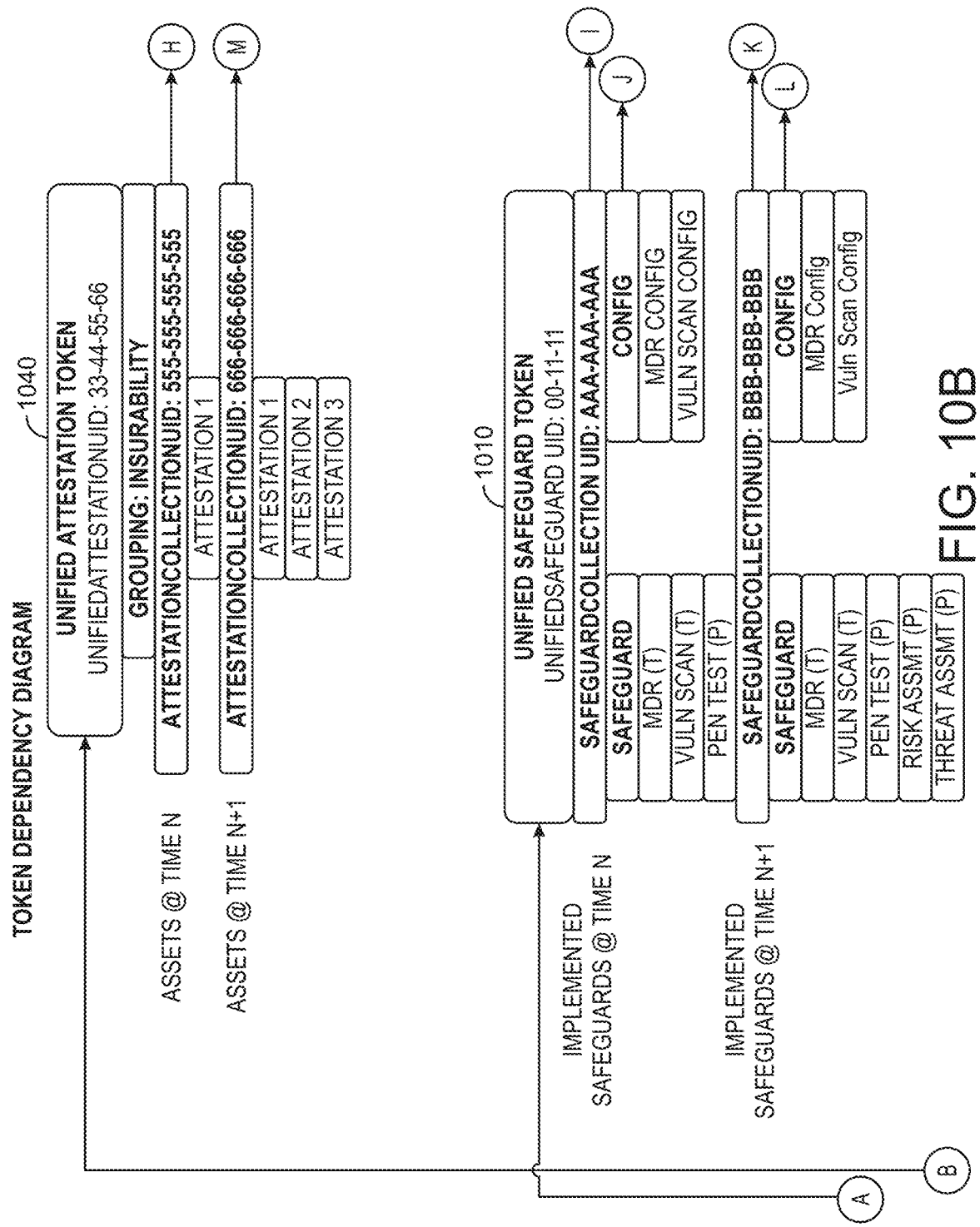

Referring now to FIG. 10B, the unified attestation token 1040 can be linked to the dynamic passport 832 via point A. As described regarding the unified requirements token 1020, the unified attestation token 1040 can include groupings and/or data corresponding to attestations at various times. For example, the unified attestation token 1040 can be generated by the token system 102 and can include an insurability grouping with a first attestation collection UID corresponding with assets (e.g., attestation 1) at a first time (e.g., time N), and the first attestation collection UID can be linked with other systems/data via point H. Further, the unified attestation token 1040 can include a second attestation collection UID corresponding with assets (e.g., attestation 1, attestation 2, attestation 3, etc.) at a second time (e.g., time N+1), and the second attestation collection UID can be linked with other systems/data via point M. In some arrangements, the unified safeguard token 1010 can be linked to the dynamic passport 832 via point B. For example, as described above, the unified safeguard token 1010 can include groupings and/or data corresponding to safeguards at various times. For example, the unified safeguard token 1010 can include a first safeguard collection UID corresponding with safeguards (e.g., MDR, vulnerability scans, penetration test rules, etc.) at a first time (e.g., time N), and the first safeguard collection UID can be linked with other systems/data via point I. The unified safeguard token 1010 can further include a first configuration, which can be linked to other data/systems via point J and include data corresponding to cyber resilience systems and/or protection techniques implemented in an organization's cyber resilience architecture (e.g., MDR configurations, vulnerability scan configurations, etc.). Further, the unified safeguard token 1010 can include a second safeguard collection UID corresponding with safeguards implemented at a second time (e.g., time N+1), and the second attestation collection UID can be linked with other systems/data via point K. The unified safeguard token 1010 can further include a second configuration, which can be linked to other data/systems via point L.

Figure 10C:
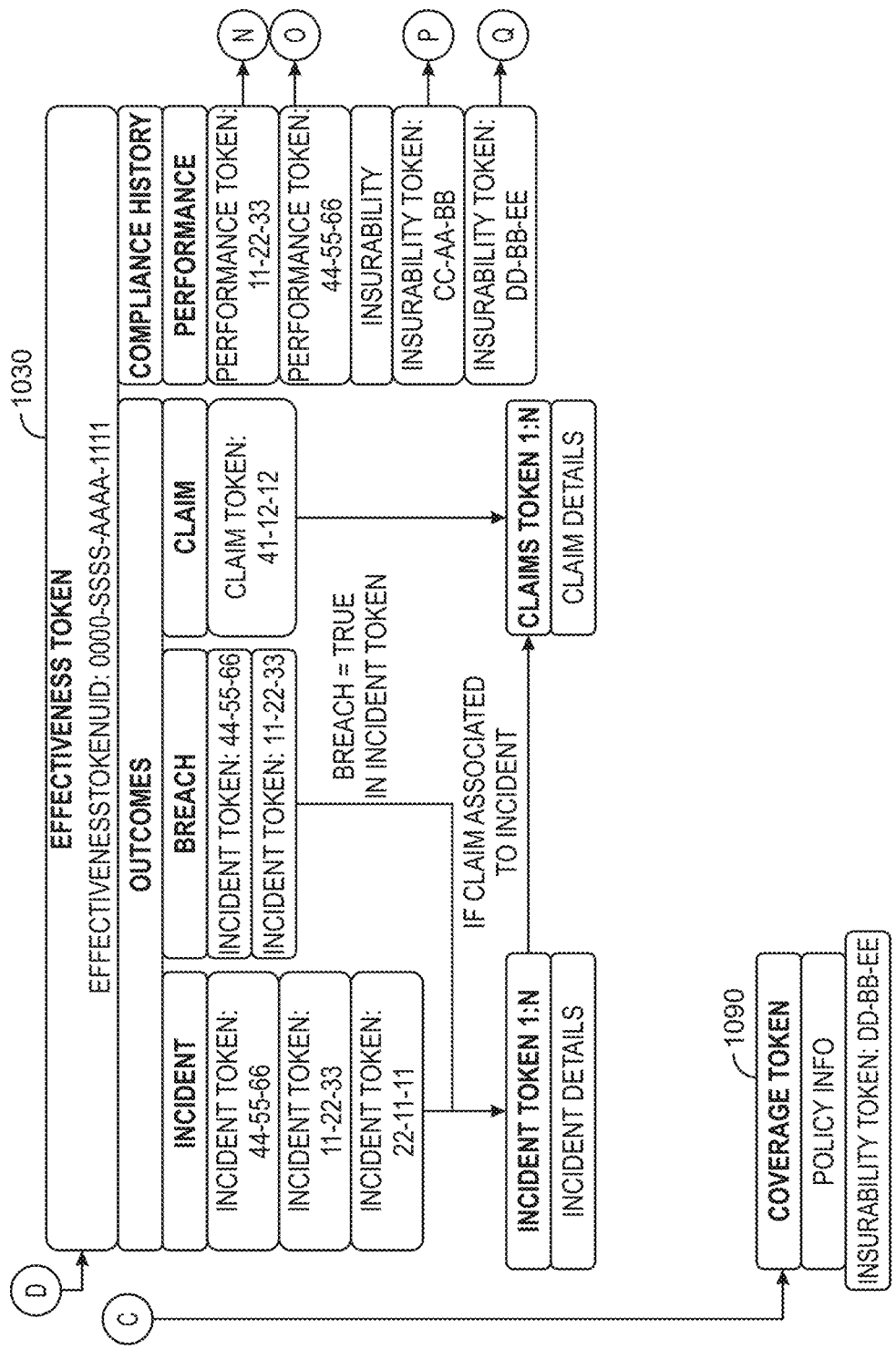

Referring now to FIG. 10C, a coverage token 1090 can be linked to the dynamic passport 832 via point C. In some examples, the coverage token 1090 can be generated by the token system 726 can include cyber protection information such as policy information (e.g., policy number, type, etc.) and various tokens including insurability information (e.g., an insurability token). In some arrangements, the effectiveness token 1030 can be linked to the dynamic passport 832 via point D. The effectiveness token 1030 can include various data corresponding to cyber resilience outcomes, such as incident data (e.g., via incident tokens 1 through N), corresponding breach data (e.g., via incident tokens 1 through N), and corresponding claims data or data (e.g., via claims tokens 1 through N associated with incident tokens 1 through N). In some arrangements, the effectiveness token 1030 can include various data corresponding to cyber resilience compliance history, such as performance data. For example, the performance data can include multiple performance tokens including respective timestamps or identifiers corresponding to cyber resilience performance of an entity during one or more incidents/breaches or claims associated with incident tokens and/or claims tokens, and the performance tokens (e.g., performance tokens 1080a-1080b) can be linked to other data/systems via point N and point O. In some arrangements, the effectiveness token 1030 can include insurability data, such as one more insurability tokens (e.g., received via coverage token 1090). In some examples, the insurability tokens (e.g., insurability tokens 1070a-1070b) can be linked to other data/systems via point P and point Q.

Figure 10D:
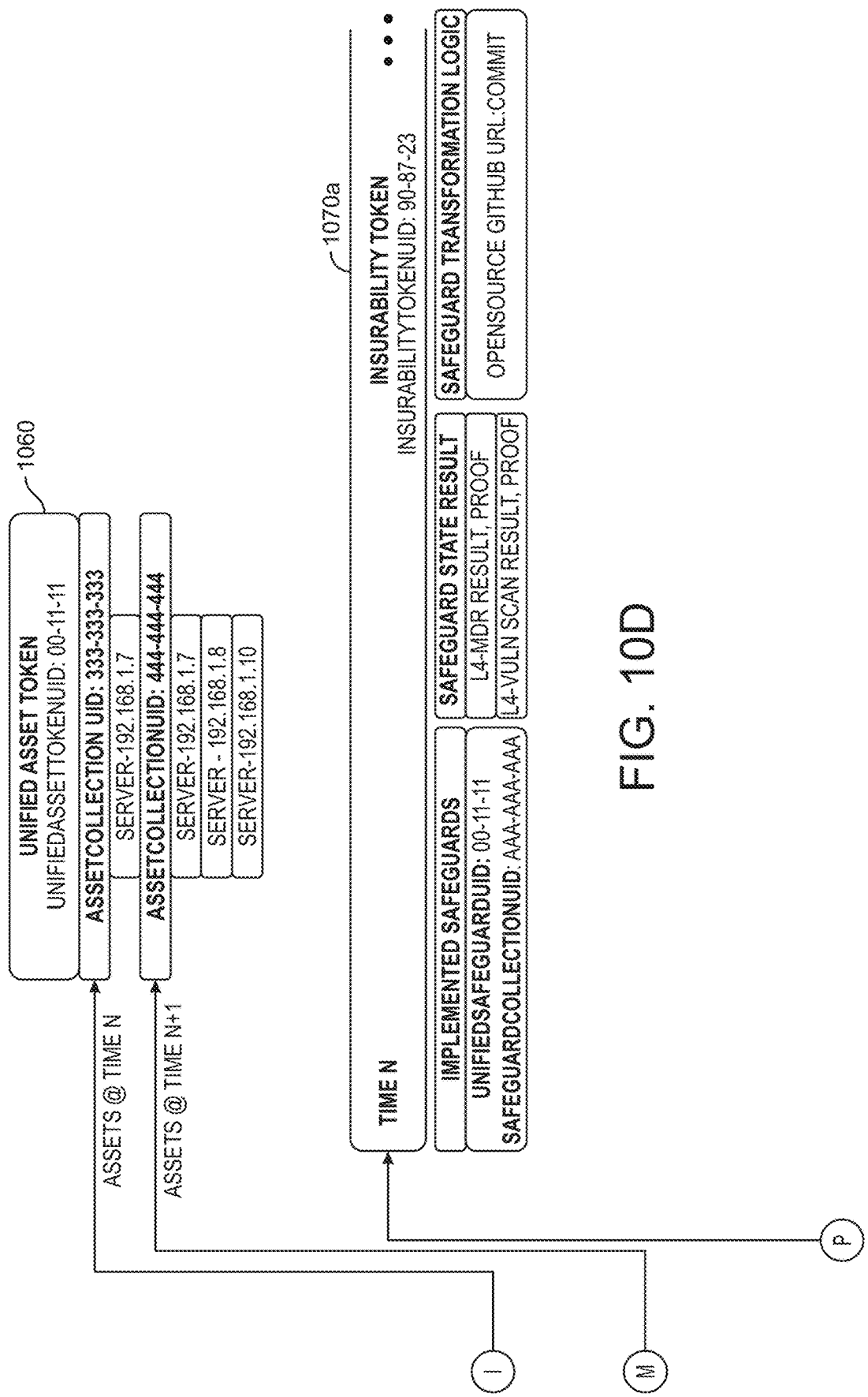
Figure 10E:
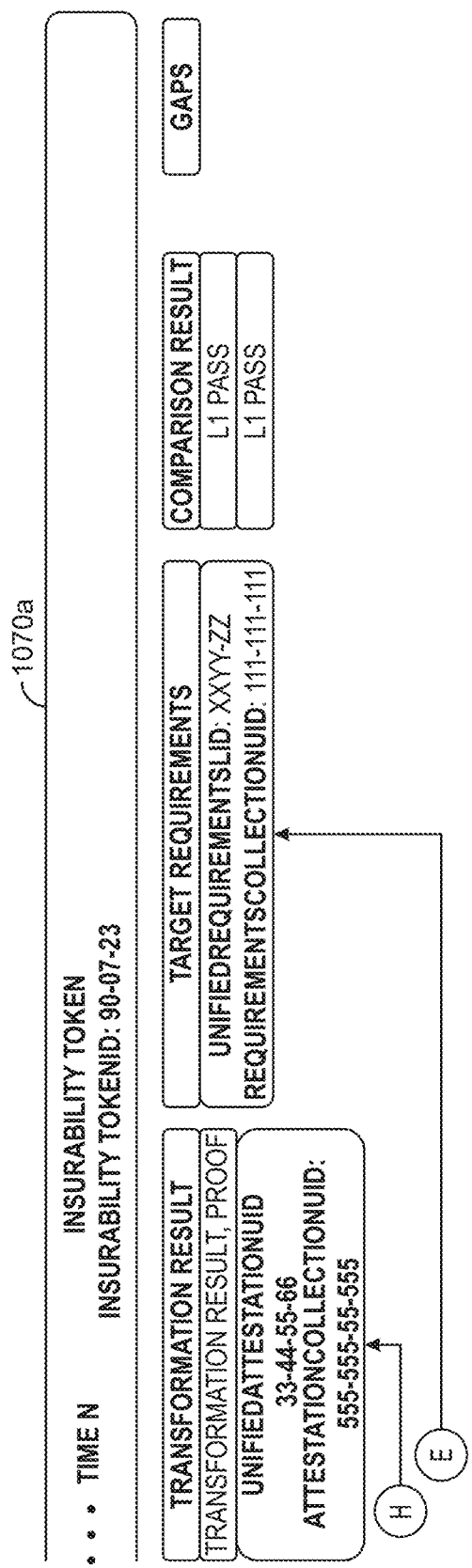

Referring now to FIG. 10D, the dynamic passport 832 can be linked to the unified asset token 1060 via point I and/or via point M. For example, the unified asset token 1060 can be generated by the token system 726 and can include a first grouping of assets (e.g., server identifier 1) at a first time (e.g., time N) and a second grouping of assets (e.g., server identifier 1, server identifier 2, server identifier 3, etc.) at a second time (e.g., time N+1). In some arrangements, the insurability token 1070a can be linked to the dynamic passport 832 via point P with the effectiveness token 1030. For example, the insurability token 1070a can include insurability data at a first time (e.g., time N), such as implemented safeguards and associated identifiers, safeguard state results (e.g., L4-MDR result and proofs, L4-vulnerability scan results and proofs), and/or safeguard transformation logic (e.g., accessible via a URL or other link). Referring now to FIG. 10E, the insurability token 1070a can further include a transformation result and/or proof, which can be linked via UIDs to point H with the unified attestation token 1040. The insurability token 1070a can further include target requirements, which can be linked via UIDs or other identifiers with the unified requirements token 1020. The insurability token 1070a can further include comparison results (e.g. L1) pass, gap data (e.g., data of missing and/or inadequate cyber protections), and more.

Figure 10F:
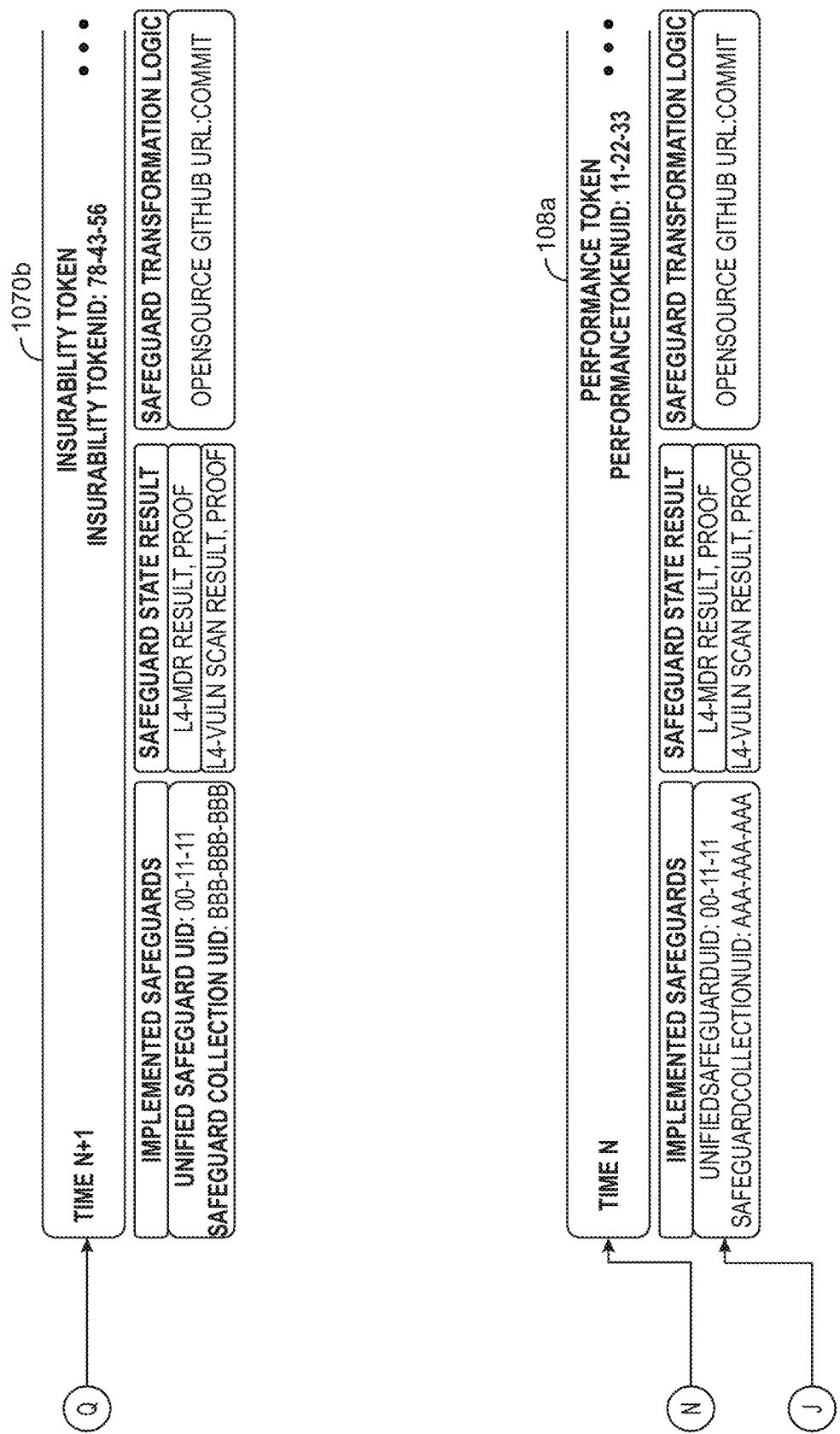

Referring now to FIG. 10F, the dynamic passport 832 can be linked to the insurability token 1070b via point Q. As shown in FIG. 10F, the insurability token 1070b can be generated by the token system 726 and can include insurability data at a second time (e.g., time N+1), such as implemented safeguards and associated identifiers, safeguard state results, and/or safeguard transformation logic. For example, the insurability token 1070b can include encrypted data of implemented safeguards, such as firewall configurations or endpoint protection settings, verified against cyber resilience requirements. The encrypted data can be encapsulated within a control structure configured to restrict updates or access based on cryptographic proofs, allowing only authorized entities (e.g., those with permitted access based on RBACs) to modify, create, view, and/or retrieve the data in accordance with access controls defined for the dynamic passport 1232. In some arrangements, the dynamic passport 832 can be linked to the performance token 1080a via point N with the effectiveness token 1030. In some examples, the performance token 1080a can include performance data of an entity at a first time (e.g., time N), including implemented safeguards, results, transformation logic, and so on. In some arrangements, the implemented safeguards can be linked, via point J, with a configuration of the unified safeguard token 1010.

Figure 10G:
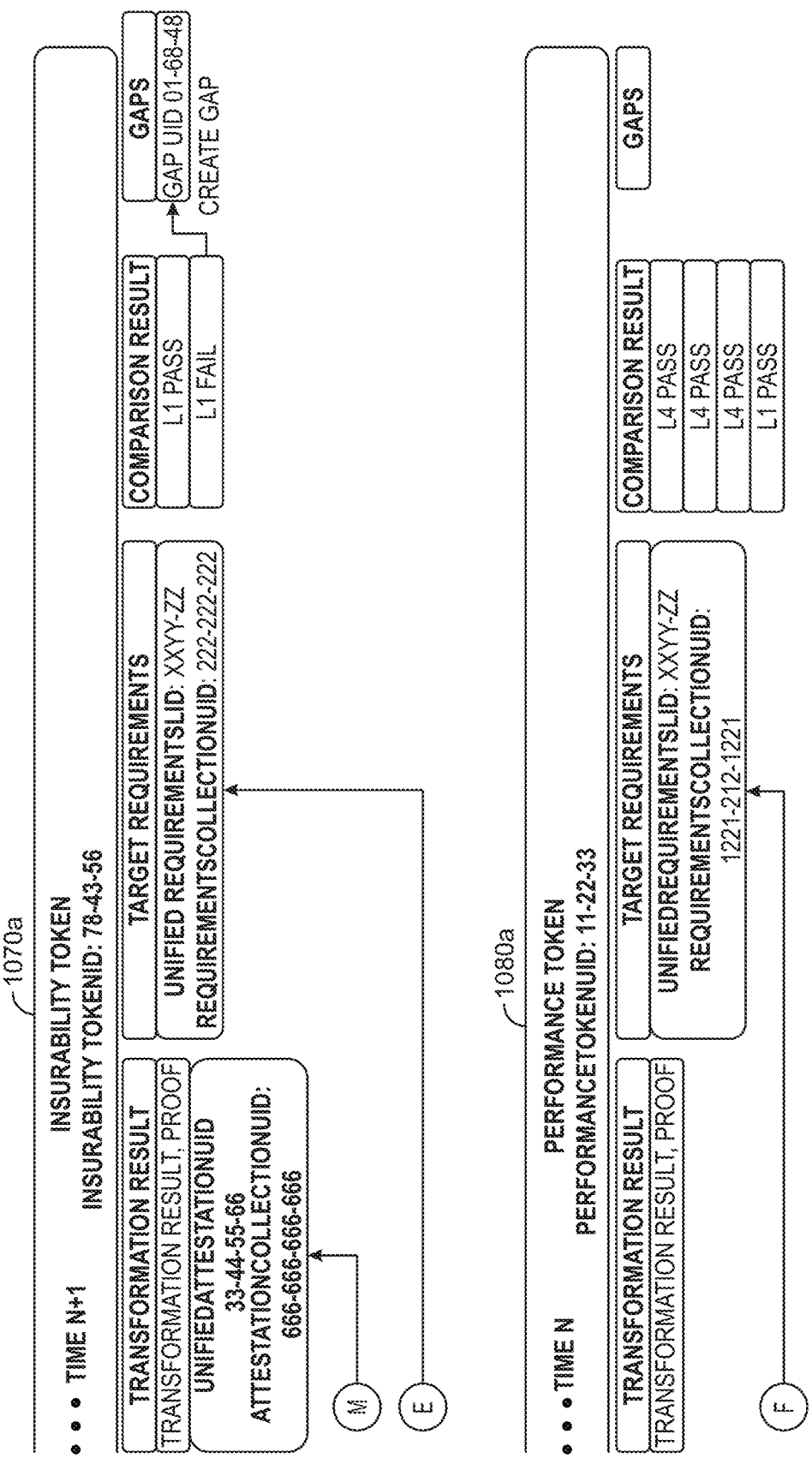

Referring now to FIG. 10G, the insurability token 1070b can further include a transformation result and/or proof, which can be linked via UIDs to point M with the unified attestation token 1040. In some arrangements, the insurability token 1070b can be generated by the token system 726 and can further include target requirements, which can be linked via UIDs or other identifiers with the unified requirements token 1020 via point E. Further, the insurability token 1070a can further include comparison results (e.g. L1 pass/fail), gap data (e.g., gap UIDs), and so on. In some arrangements, the performance token 1080a can further include transformation results and/or proofs, comparison results (e.g., L4 pass/fail), and gaps. Further, the insurability token 1070b (or another token) may store cryptographic proofs of provenance corresponding with and entity and/or associated cyber resilience data. In some examples, the performance token 1080a can include target requirements and associated IDs, accessible via point F, from the unified requirements token 1020.

Figure 10H:
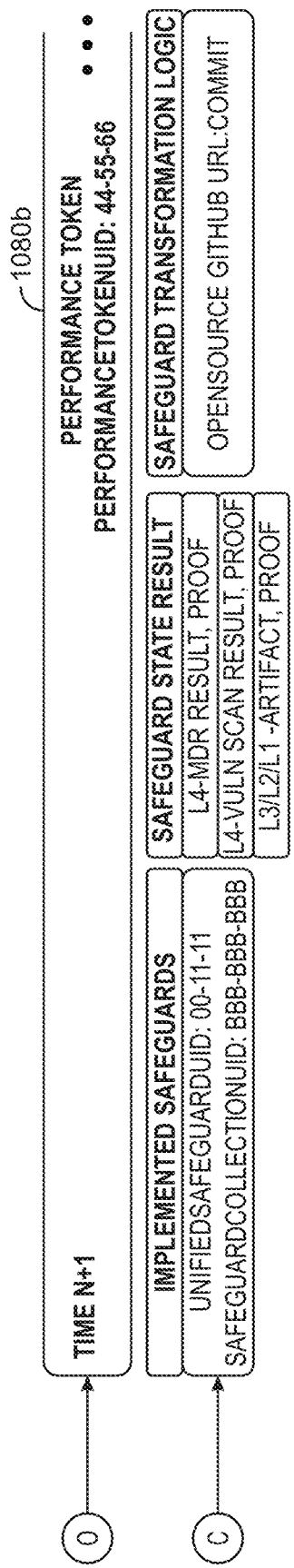
Figure 10I:
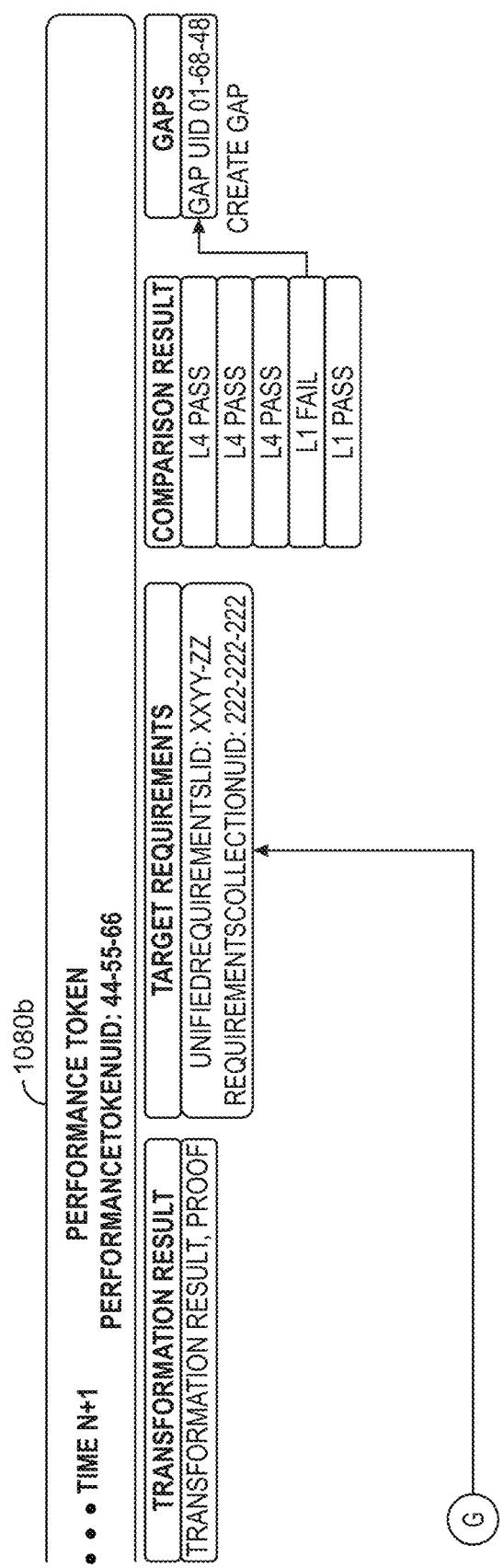

Referring now to FIG. 10H, the dynamic passport 832 can be linked to the performance token 1080b via point O with the effectiveness token 1030. In some examples, the performance token 1080b can be generated by the token system 726 and can include performance data of an entity at a second time (e.g., time N+1), including implemented safeguards, results, transformation logic, and so on. For example, the performance token 2080a and the performance token 2080b may include performance data sets encapsulated within a control structure corresponding to the dynamic passport 832, and access to data of the performance tokens 1080a-1080b can be granted based on a specific access data structure compatible with a control structure (e.g., allowing authorized entities to retrieve and/or update metadata of the performance token 1080b based on access controls, restricting access and/or updates to the performance data based on access controls, etc.). In some arrangements, the implemented safeguards can be linked, via point L, with a configuration of the unified safeguard token 1010. Referring now to FIG. 10I, the performance token 1080b can further include transformation results and/or proofs, comparison results, and gaps. The performance token 1080b can also include target requirements and identifiers received via point G with the unified requirements token 1020.

End Point Integration and Mapping

Figure 11:
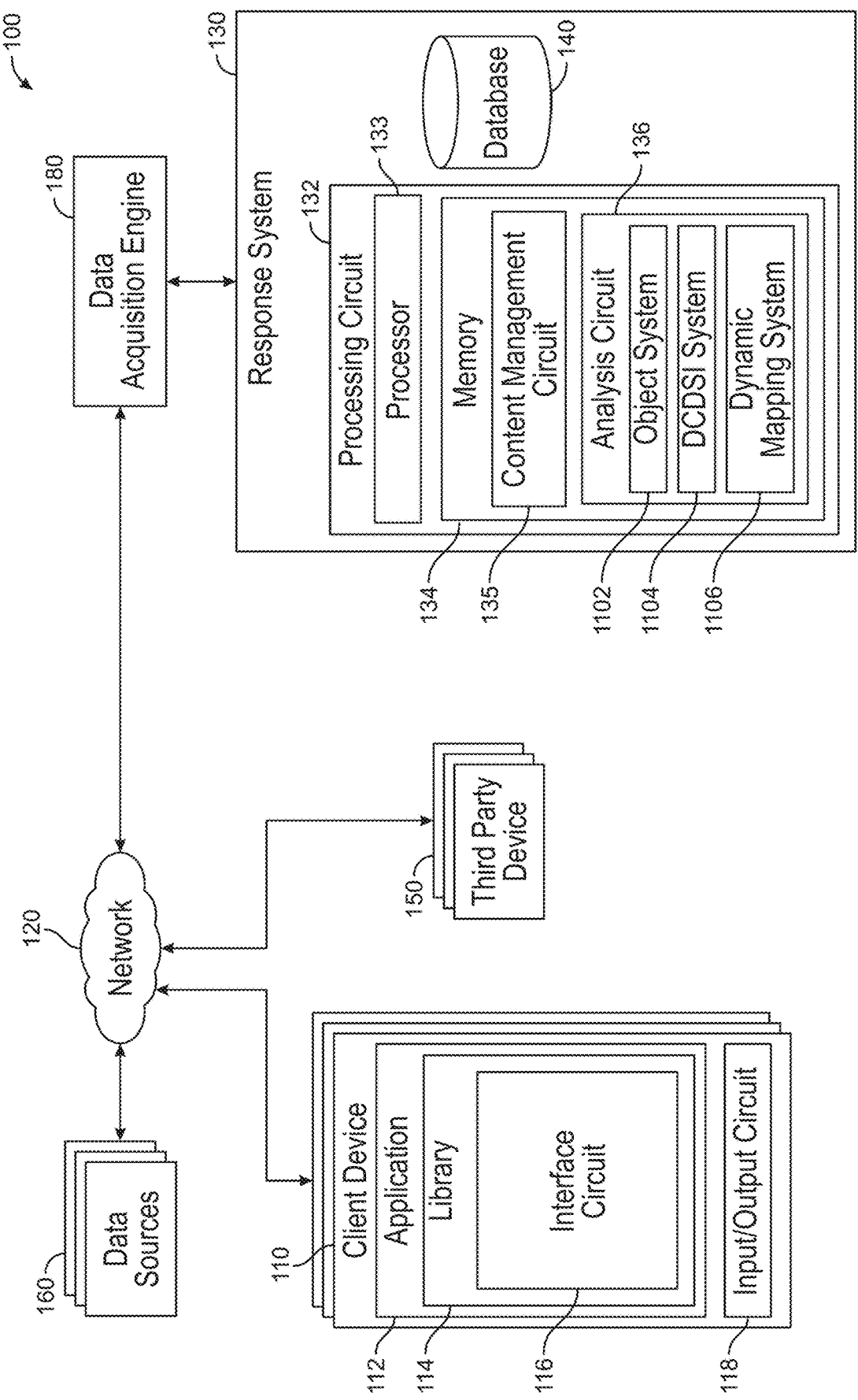
FIG. 11 a block diagram of an implementation of a system for endpoint integration and mapping, according to some arrangements.

Referring to FIG. 11, a block diagram of an implementation of a system for endpoint integration and mapping is shown, according to some arrangements. The implementation shown in FIG. 11 includes a client device 110 (also referred to herein as user computing system(s) 110), response system 130, third-party device 150 (also referred to herein as third party system (s (150), data sources 160, and data acquisition engine 180. The various components of FIG. 11 can be interconnected through a network 120 that supports secure communications profiles (e.g., TLS, SSL, HTTPS, etc.). In some arrangements, the elements shown in FIG. 11 can incorporate similar features and functionality as described regarding the elements shown on FIG. 1 and/or FIG. 7. For example, the response system 130, as shown in FIG. 11, incorporates similar functionality as described regarding the response system 130 of FIG. 1A, and the database 140, may incorporate the same or similar functionality as described regarding the database 140 of FIG. 1A, and so on. Specifically, like callout references of FIG. 1A are now further described, however the features and functionalities of components like the response system 130 in FIG. 11 still correspond to those referred to with the same callout reference in FIG. 1A. For example, response system 130 described in FIG. 11 can include additional functionality and features related to endpoint integration and mapping (also referred to herein as "linking").

In some arrangements, the client device 110 can include an application 112 and an input/output circuit 118. The application 112 can include a library 114, and the library 114 can include an interface circuit 116. In some arrangements, the response system 130 can include a processing circuit 132 and a database 140. The processing circuit 132 can include a processor 133 and memory 134. The memory 134 can further include a content management circuit 135 and an analysis circuit 136. In some arrangements, the analysis circuit 136 can include an object system 1102, a DCDSI system 1104, and dynamic mapping system 1106, as further described herein.

Each system or device of FIG. 11 may include one or more processors, memories, network interfaces (sometimes referred to herein as a "network circuit") and user interfaces. The memory (e.g., memory 134) may store programming logic (e.g., content management circuit 135) that, when executed by the processor, controls the operation of the corresponding computing system or device. The memory may also store data in databases. For example, memory may store programming logic that when executed by a processor within a processing circuit, causes a database to update parameters or store a system or event log. The network interfaces may allow the computing systems and devices to communicate wirelessly or otherwise. The various components of devices in system 100 may be implemented via hardware (e.g., circuitry), software (e.g., executable code), or any combination thereof. Devices, systems, and components in FIG. 11 can be added, deleted, integrated, separated, and/or rearranged in various embodiments of the disclosure.

Generally, the user computing system(s) 110, response system 130, third-party device(s) 150, analysis circuit 136, object system 1102, DCDSI system 1104, and/or dynamic mapping system 1106 can include one or more logic devices, which can be one or more computing devices equipped with one or more processing circuits that run instructions stored in a memory device to perform various operations. The processing circuit can be made up of various components such as a microprocessor, an ASIC, or an FPGA, and the memory device can be any type of storage or transmission device capable of providing program instructions. The instructions may include code from various programming languages commonly used in the industry, such as high-level programming languages, web development languages, and systems programming languages. The user computing system(s) 110, response system 130, and other various components of FIG. 11 may also include one or more databases for storing data that receive and provide data to other systems and devices on the network 120.

In some arrangements, one or more elements of FIG. 11 can be communicably coupled (connected) to a distributed ledger (e.g., blockchain 170 of FIG. 1B) or other authoritative data source to provide data integrity and security. For example, as described above regarding FIG. 1A, the database 140 can be a private ledger and data source 160 can be a public ledger, and data transactions (e.g., updates to proof/posture state data, cybersecurity parameters, entity data, etc.) recorded on the database 140 can be validated against entries recorded on the data source 160 to verify that updates to entries are accurately reflected and can be audited against an immutable record. In some arrangements, the application 112 can be configured to integrate with technology and databases (e.g., database 140, response system 130, etc.) to access information used synchronizing or protecting data. The user can access the application 112 through a variety of devices, including client device 110. In some arrangements, the response system 130 is operably connected to data acquisition engine 180 and includes analysis circuit 136 for endpoint integration and mapping.

In some arrangements, third-party devices 150 can include one or more endpoints. For example, third-party devices 150 can include vendor endpoints, insurer systems, cloud service providers, threat intelligence platforms, or other external systems. Third-party devices 150 can include various application programming interfaces (APIs) and can integrate with response system 130 to exchange data and improve the security posture of an organization. For example, third-party devices 150 can communicate with the analysis circuit 136 of the response system 130 using a data communication link (e.g., network 120) maintaining the confidentiality and integrity of data transmitted between third-party devices 150 and response system 130. Further, the third party devices 150 can provide a response to an endpoint call addressed to one or more of the third party devices 150 (e.g., a call performed by analysis circuit 136, etc.). In some examples, the data received from third-party devices 150 can be processed by the response system 130 and/or analysis circuit 136 to assess and address potential cybersecurity threats.

In some arrangements, third-party devices 150 can include data sources that provide cybersecurity-related information to response system 130. For example, third-party devices 150 could include cloud-based security services, threat intelligence platforms, or other external systems that monitor and report on cybersecurity incidents. The data provided by third-party devices 150 can be integrated into response system 130 via dynamic mapping system 1106, which can map the received data to relevant cybersecurity parameters within the infrastructure of the organization. Additionally, third-party devices 150 can operate in conjunction with DCDSI system 1104 to perform automated cybersecurity tasks. For example, third-party devices 150 can response to DCDSI calls and execute various tasks (e.g., detecting threats, initiating a security audit, updating access controls, executing remediation protocols, etc.). DCDSI system 1104 can facilitate interaction between third-party devices 150 and the internal systems of the organization by transmitting the appropriate data and commands (e.g., to integrate endpoint data and/or access information with the internal cybersecurity framework of the organization.

In some arrangements, the response system 130 can execute various processes and/or functions for endpoint mapping and integrations. In some arrangements, the response system 130 can include one or more processing circuits 132, including processor(s) (e.g., processor 133) and memory (e.g., memory 134). The memory 134 may have instructions stored thereon that, when executed by processor(s), cause the one or more processing circuits 132 to perform the various operations described herein. The operations described herein may be implemented using software, hardware, or a combination thereof. The processor(s) 133 may include a microprocessor, ASIC, FPGA, etc., or combinations thereof. In many implementations, the processor(s) 133 may be a multi-core processor or an array of processors. Memory 134 may include, but is not limited to, electronic, optical, magnetic, or any other storage devices capable of providing processor(s) with program instructions. The instructions may include code from any suitable computer programming language.

In some arrangements, the response system 130 can include various systems and/or subsystems for endpoint mapping and integration, including analysis circuit 136. In some arrangements, the analysis circuit 136 can identify one or more decentralized compute and data store interface (DCDSI) endpoints and corresponding access information. That is, identifying can include the analysis circuit 136 determining, locating, or categorizing decentralized interfaces across various platforms, such as APIs, blockchain nodes, cloud services, or other external systems that interact with cyber resilience data (e.g., insurer data, customer data, etc.).For example, the analysis circuit 136 can identify APIs provided by external services to be integrated into an organization's cybersecurity infrastructure. Additionally, the analysis circuit 136 can extract access credentials and endpoint addresses from a third-party security service's documentation.

In some arrangements, the analysis circuit 136 can generate an object package corresponding to the one or more DCDSI endpoints. That is, generating can include the analysis circuit 136 forming, initializing, calling, or otherwise creating a data structure that includes operations and information to interact with various types of decentralized compute and data store interface (DCDSI) endpoints. For example, in generating the object data package, the analysis circuit 136 can further initiate the object package based on an identifier corresponding to at least one DCDSI endpoint type (e.g., based on an insurer type). Additionally, the analysis circuit 136 can initiate an object package configured for a cloud storage API endpoint, structuring methods of the object package according to the endpoint. In another example, the analysis circuit 136 can initiate an object package for a blockchain endpoint that follows the protocols and data formats of the blockchain network. In some arrangements, the object package is structured according to the at least one DCDSI endpoint type (e.g., vendor API endpoint, insurance API endpoint, cybersecurity tool endpoint, blockchain endpoint, cloud storage endpoint, or any other endpoint category). That is, the object package can include data formatting rules and access protocols customized to a category (e.g., user, insurer, administrator, third-party service, or any system) corresponding to the identified DCDSI endpoint (e.g., a template/workflow based on an endpoint type).

In some arrangements, in generating the object data package, the analysis circuit 136 can further map, in the object package, the access information to an access scheme corresponding to one or more formatted requests to access the one or more DCDSI endpoints. That is, mapping can include the analysis 136 linking, providing, and/or associating access parameters and credentials with the corresponding data structure to facilitate communication with the identified DCDSI endpoints. For example, the analysis circuit 136 can map API request parameters (e.g., query strings, authentication keys, endpoint addresses, request methods, or any request parameter) and authentication tokens (e.g., OAuth tokens, API keys, session tokens, or any security credential) to a predefined access scheme for a cloud storage endpoint. In another example, the analysis circuit 136 can configure the object package to include headers and payload structures for a blockchain API call. In some arrangements, the one or more formatted requests correspond with requesting protection data. Additionally, the formatted requests can include API calls to retrieve security policies, access logs, or threat intelligence from a decentralized data store.

Generally, a DCDSI endpoint can refer to any interface that allows decentralized computation or data storage across various categories. That is, the DCDSI endpoint can be a vendor API endpoint (or access point), insurance API endpoint (or access point), a cybersecurity tool interface, a blockchain node, a cloud service API, a distributed database, a peer-to-peer network interface, an edge computing node, a remote procedure call endpoint, or any distributed computing interface or third-party endpoint interface. For example, a first DCDSI endpoint can be a vendor API endpoint. In another example, a second DCDSI endpoint can be an insurer API endpoint.

In some arrangements, an object package can refer to a structured data payload configured to facilitate communication with an endpoint based on its category (or type, protocol, function). That is, the object package can be a configuration file, an API request template, a serialized data object, a command set, an executable script, or any structured data format dynamic to the endpoint type. For example, a first object package can be a JSON configuration file for insurance API integration. In another example, a second object package can be a serialized command object for blockchain transaction execution. In some implementations, a header of an object package can be a metadata segment that contains information about the package contents. For example, a header can be an API version identifier, a content-type specifier, a security token, a timestamp, or any metadata field. Additionally, a payload structure of an object package can be the data to be processed by the endpoint. For example, a payload structure can be a JSON object, an XML document, a binary data stream, a command list, or any structured data format.

In some arrangements, an access scheme can refer to a predefined method for gaining access to an endpoint based on its category. That is, the access scheme can be an authentication protocol, a permission set, a session management routine, an API call sequence, a data retrieval strategy, or any access control method specific to the endpoint type. For example, a first access scheme can be OAuth-based token authentication for a cybersecurity tool. In another example, a second access scheme can be an API key verification process for an insurance API.

In some arrangements, a formatted request can refer to a structured query or command sent to an endpoint based on its category. That is, the formatted request can be an HTTP GET request, a SQL query, a blockchain transaction, a remote procedure call, a file upload command, or any data retrieval or submission command suited to the endpoint type. For example, a first formatted request can be an HTTP POST request with JSON payload for an insurance API. In another example, a second formatted request can be a blockchain transaction submission.

In some arrangements, the analysis circuit 136 can further perform a DCDSI endpoint request. In some arrangements, the analysis circuit 136 can further perform a DCDSI endpoint request. That is, performing the DCDSI endpoint request can include accessing various decentralized interfaces, such as APIs, smart contracts, or blockchain nodes, to retrieve or verify data. For example, to perform the DCDSI endpoint request, the analysis circuit 136 can initiate an API call to a third-party service to retrieve encrypted data logs or verify the integrity of transaction records. Additionally, in performing the DCDSI endpoint request, the response system 130 can access other decentralized endpoints, including cloud-based services or distributed ledgers, to process or store cybersecurity-related data In some arrangements, the analysis circuit 136 can initiate an API call to a third party API (e.g., insurer API) to retrieve encrypted data logs. In another example, the analysis circuit 136 can perform a request to a blockchain-based service to verify the integrity of transaction records.

In some arrangements, in performing the DCDSI endpoint call, the analysis circuit 136 can invoke the object package to execute the DCDSI endpoint request using at least one formatted request of the one or more formatted requests. That is, invoking the object package can include calling methods within the object package that interact with decentralized endpoints, such as APIs, blockchain services, or cloud-based systems, to initiate data retrieval or processing operations. For example, to invoke the object package, the analysis circuit 136 can call a method within the object package that executes a formatted API request to retrieve cybersecurity metrics (e.g., threat intelligence data, incident response metrics, compliance status reports, quote data, product offerings) from a decentralized compute service. Additionally, when the analysis circuit 136 invokes the object package, the object package can execute methods linked to other decentralized interfaces, such as smart contracts or distributed storage systems, to perform or manage cybersecurity-related tasks.

In some arrangements, in performing the DCDSI endpoint call, the analysis circuit 136 can receive output data including a response to the DCDSI endpoint request by a DCDSI system. That is, the output data can include a response to the endpoint call with various cyber resilience data, such as encrypted data sets, transaction verification results, security compliance report, quotes, product offerings, and more. For example, the output data can include an API response returned by the DCDSI endpoint in response to an API call made to a DCDSI endpoint address of the DCDSI endpoint. Additionally, the output data may include a formatted response to an API call (e.g., formatted cybersecurity metrics, threat intelligence data, incident response metrics, compliance status reports, quote data, and/or product offerings from a decentralized compute service. Additionally, when the analysis circuit 136 invokes the object package, the system can execute methods linked to other decentralized interfaces, such as smart contracts or distributed storage systems, to perform or manage cybersecurity-related tasks.

In some arrangements, the analysis circuit 136 can update a distributed ledger, token, or data source based on the output data. That is, updating can include the analysis circuit 136 recording or modifying entries in a distributed system, such as a blockchain ledger, token-based system, or local data storage, based on data received from the DCDSI endpoint. For example, the analysis circuit 136 can store the retrieved compliance data or audit logs in a blockchain ledger (e.g., blockchain 170), and/or using various cyber resilience tokens (e.g., as described regarding FIGS. 7-10). Additionally, the analysis circuit 136 can synchronize the updated data with local storage systems or replicate the data across decentralized networks such that output data can be accessed by various cybersecurity resources.

In some arrangements, the analysis circuit 136 can include various systems and/or subsystems for endpoint mapping and integration, including object system 1102, DCDSI system 1104, and dynamic mapping system 1106. In some arrangements, the DCDSI system 1104 can identify one or more decentralized compute and data store interface (DCDSI) endpoints and corresponding access information. DCDSI endpoints can be decentralized interfaces for computing and data storage, such as APIs, smart contracts, and other decentralized systems that interact with various services and platforms. For example, the DCDSI system 1104 can identify APIs, smart contract interfaces, decentralized storage gateways, or blockchain nodes associated with cloud storage services to be integrated into the organization's cybersecurity framework. In another example, the DCDSI system 1104 can extract endpoint data such as URLs, authentication credentials, and parameters from technical documentation of a third-party service (e.g., OpenAPI specification from third-party systems 150). That is, the DCDSI system 1104 can extract the endpoint data by analyzing and/or parsing the documentation, extracting relevant metadata, and/or generating configuration templates. Further, the DCDSI system 1104 can analyze logs from previous endpoint communications and responses to identify recurring access patterns and optimize future endpoint integrations. For example, the DCDSI system 1104 can analyze response times and error rates to adjust retry logic and timeout settings. In another example, the DCDSI system 1104 can identify frequently accessed endpoints and prioritize their integration within the cybersecurity framework.

In some arrangements, the object system 1102 can generate an object package corresponding to the one or more DCDSI endpoints. That is, generating the object package can include obtaining, creating, or providing an data structure. For example, the object system 1102 can generate an object package based on an endpoint type and modify the object template based on a workflow corresponding to the endpoint type. For example, the object package can be a software construct in object-oriented programming (OOP) containing methods configured for API calls, data exchange, and response handling specific to each DCDSI endpoint. In another example, the object package can be a dynamic and/or modular data structure configured to interface with various endpoint protocols, facilitate integration, data transformation, and execution of automated workflows and other actions across decentralized platforms.

In some arrangements, in generating the object package, the object system 1102 can further initiate the object package based on an identifier corresponding to at least one DCDSI endpoint type. That is, the object package can be configured based on an endpoint identifier or category (e.g., insurer, vendor, provider, etc.). For example, the object system 1102 can initiate an object package configured for an insurer API endpoint, structuring the object package according to the API's protocol requirements. In another example, the object system 1102 can initiate an object package for an insurer or vendor endpoint, including data structures and communication protocols for the blockchain network.

In some arrangements, the object package is structured according to the at least one DCDSI endpoint type. That is, a DCDSI endpoint type can include a range of categories, including but not limited to cloud service APIs, blockchain interfaces, insurance data providers, customers/users, cybersecurity tools, decentralized storage systems, financial transaction networks, IoT device gateways, machine learning model endpoints, remote sensing systems, edge computing nodes, healthcare data exchanges, digital identity verification services, content delivery networks (CDNs), smart contract platforms, federated learning systems, supply chain tracking interfaces, digital payment processors, environmental monitoring sensors, and/or telecommunication network interfaces. For example, the object system 1102 can incorporate data formatting rules and authentication mechanisms within the object package to match the endpoint type.

In some arrangements, in generating the object package, the dynamic mapping system 1106 can further map the access information to an access scheme corresponding to one or more formatted requests to access the one or more DCDSI endpoints. That is, mapping can include the dynamic mapping system 1106 associating, providing, or otherwise linking various cyber resilience data and/or systems. For example, the dynamic mapping system 1106 can configure the object package to include predefined API request formats, authentication tokens, and headers customized to the DCDSI endpoint. In another example, the dynamic mapping system 1106 can align the access scheme with security protocols of the endpoint.

In some arrangements, the one or more formatted requests correspond with requesting protection data. For example, the formatted requests can include API calls to retrieve compliance reports, incident logs, threat intelligence feeds, vulnerability assessments, security policy updates, access control lists, encryption keys, audit trails, system configuration files, real-time monitoring data, user activity logs, breach notifications, risk assessment scores, intrusion detection alerts, malware signatures, software patch statuses, regulatory compliance certificates, penetration testing results, encryption certificates, network traffic analyses, forensic investigation reports, data classification labels, endpoint protection statuses, phishing detection metrics, security training records, firewall configurations, tokenized credentials, multi-factor authentication logs, as well as quotes, pricing information, product data, service level agreements (SLAs), inventory status, purchase orders, contract terms, customer support tickets, billing records, and/or other cybersecurity-related data or business data from a decentralized compute service.

In some arrangements, the DCDSI system 1104 can further perform a DCDSI endpoint request. For example, the DCDSI system 1104 can execute an API call to a vendor to obtain cyber resilience information responsive to the executed call. That is, the DCDSI system 1104 can perform a call or otherwise transmit a request to an endpoint to receive cyber resilience information. In another example, the DCDSI system 1104 can initiate a request to an insurer to access cyber insurance information. In some arrangements, in performing the DCDSI endpoint call, the object system 1102 can invoke the object package to execute the DCDSI endpoint request using at least one formatted request of the one or more formatted requests. For example, the object system 1102 can trigger a formatted API call to access encrypted cybersecurity data stored on a remote server.

In some arrangements, in performing the DCDSI endpoint call, the DCDSI system 1104 can receive output data including a response to the DCDSI endpoint request by a DCDSI system. That is, receiving can include the DCDSI system 1104 retrieving various cyber resilience data via a network. For example, the DCDSI system can access threat analysis reports, compliance metrics, vulnerability scans, incident response summaries, audit logs, encryption status updates, security policy adherence checks, access control validations, breach investigation reports, real-time monitoring alerts, user activity analytics, risk assessment results, intrusion detection logs, malware detection signatures, software patch compliance reports, regulatory compliance validations, penetration testing outcomes, encryption certificate verifications, network traffic summaries, forensic analysis findings, data classification compliance, endpoint protection statuses, phishing attempt detections, security training completion records, firewall rule evaluations, token authentication logs, multi-factor authentication activity reports, as well as retrieved quotes, pricing models, product specifications, service level agreement (SLA) compliance data, inventory updates, purchase order statuses, contract fulfillment metrics, customer support resolutions, billing summaries, and/or other security-related or business data returned by the DCDSI endpoint.

In some arrangements, the dynamic mapping system 1106 can update a distributed ledger or data source based on the output data. For example, the dynamic mapping system 1106 can record the received data on blockchain 170 or in an internal database. That is, updating can include the analysis circuit 136 recording or modifying entries in a distributed system, such as a blockchain ledger, token-based system, or local data storage, based on data received from the DCDSI endpoint. For example, the analysis circuit 136 can store the retrieved cyber resilience data a blockchain ledger (e.g., blockchain 170), and/or using various cyber resilience tokens (e.g., as described regarding FIGS. 7-10).

Figure 12:
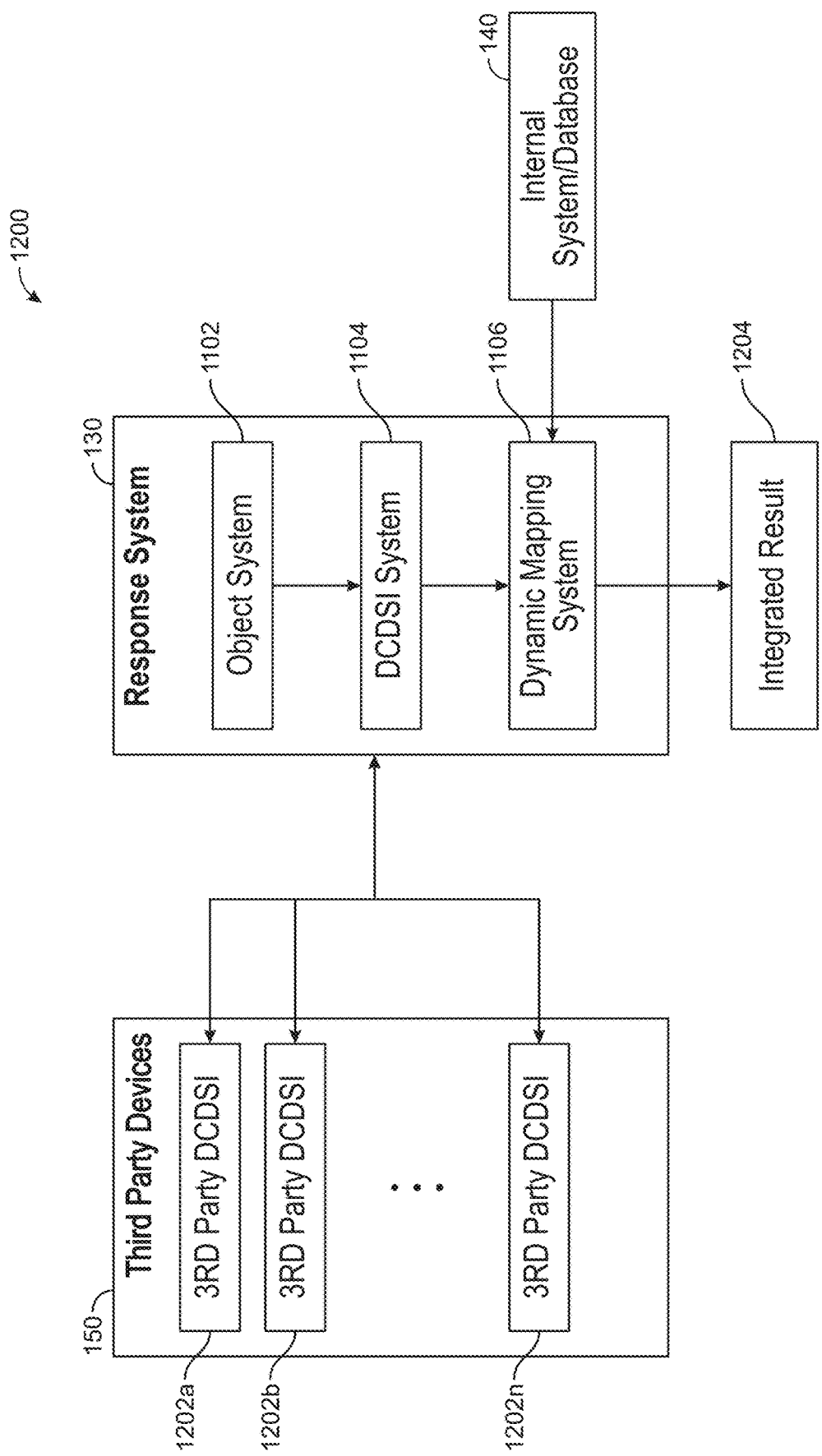
FIG. 12 depicts a block diagram of a more detailed architecture of certain systems or devices of FIG. 11, according to some arrangements.

Referring now to FIG. 12, a block diagram of a more detailed architecture of certain systems or devices of FIG. 11 is shown, according to some arrangements. The implementation shown in FIG. 12 can include response system 130, database 140, and third party systems 150. In some examples, the response system 130 can include the object system 1102, DCDSI system 1104, and dynamic mapping system 1106. The third party systems 50 can include one or more endpoints 1202a-1202n (e.g., third party DCDSIs). The implementation shown on FIG. 12 can also include an integrated result 1204. In some examples, the various components of FIG. 12 can communicate and/or be linked via a network (e.g., as described regarding FIGS. 1 and 7).

In some arrangements, the response system 130 can integrate and map endpoint data for interfacing with the endpoints 1202a-1202n. For example, the DCDSI system 1104 can identify and catalog the endpoints 1202a-1202n and corresponding access information by analyzing the data provided by third party systems 150, data sources 160, etc. In some arrangements, the object system 1102 can create an object package corresponding to each identified endpoint 1202a-1202n, structuring the package based on the endpoint type (e.g., the endpoint 1202a corresponding to at least one of third party systems 150 including an insurer type, etc.). That is, the object package can include methods and/or data structures configured for interacting with the endpoint, such as predefined API request formats or templates, authentication tokens, and communication protocols corresponding to the endpoint. For example, the object package for an API endpoint can include JSON formatting rules, a package for a blockchain endpoint can incorporate data serialization methods and consensus verification steps, an object package for an vendor can include methods for purchasing a cyber resilience plan, and so on.

The dynamic mapping system 1106 can map the access information to an access scheme that aligns with the standards or other parameters corresponding to the endpoint. For example, mapping can include formatting various requests to determine that formatted requests are correctly configured for accessing the endpoint's data (e.g., cybersecurity protection data). That is, mapping can include linking or otherwise associated data and/or systems (e.g., matching the endpoint's security protocols with the organization's internal security policies to create an integration aligning with external and internal standards). Additionally, the dynamic mapping system 1106 can adapt the access scheme dynamically and adjust to changes in the endpoint's requirements or the organization's security posture.

Still referring to FIG. 12, in some arrangements, in performing an endpoint request, the DCDSI system 1104 can invoke the object package generated by the object system 1102 to execute the request. That is, the DCDSI system 1104 can implement, execute, or otherwise trigger an API call using a formatted request that complies with the endpoint's protocol for retrieving data and/or performing a call. Further, the DCDSI system 1104 can receive a response to the request from the endpoint as output data, which can be processed by the dynamic mapping system 1106 to generate the integrated result 1204. For example, the output data can be received as unstructured data and further transformed by the dynamic mapping system 1106 to correspond to formatting and/or other predefined requirements. That is, the integrated result 1204 can include a consolidated and/or processed outcome of the endpoint interactions (e.g., formatted response). In some examples, the dynamic mapping system 1106 can store the integrated resulted in a database or data store (e.g., database 140), or further transmit the integrated result 1204 to other systems within an organization's cybersecurity framework. In some examples, the dynamic mapping system 1106 can also update a distributed ledger, such as blockchain 170, or other internal data sources based on the output data such that the organization's cybersecurity posture is accurately reflected and/or stored in relevant systems and records. For example, after retrieving compliance data from an external API, the dynamic mapping system 1106 can record the results on a blockchain or internal system.

Figure 13:
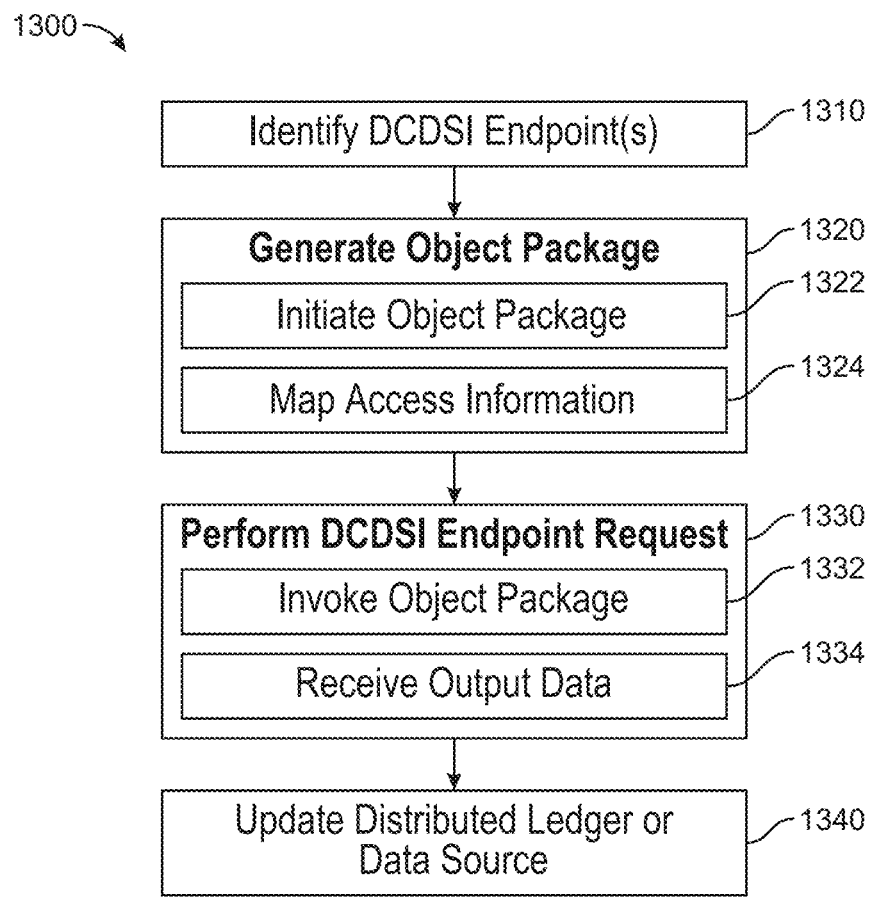
FIG. 13 depicts a flowchart for a method of endpoint integration and mapping, according to some arrangements.

Referring now to FIG. 13, a flowchart for a method 1300 of modeling cyber resilience data using cyber resilience identities and associated metadata is shown, according to some arrangements. One or more of the components described with respect to FIG. 1 or FIG. 11 can be used to perform the steps of method 1300. For example, the response system 130 of FIG. 1 or the analysis circuit 136 of FIG. 11 can perform one or more of the steps of the method 2600. Additional, fewer, or different operations can be performed depending on the particular arrangement. In some embodiments, some, or all operations of method 1300 can be performed by one or more processors executing on one or more computing devices, systems, or servers. In some embodiments, each operation can be re-ordered, added, removed, or repeated.

In a broad overview of method 1300, at block 1310, the one or more processing circuits (e.g., analysis circuit 136 of FIG. 11) can identify DCDSI endpoint(s). At block 1320, the one or more processing circuits can generate an object package. At block 1322, the one or more processing circuits can initiate the object package. At block 1324, the one or more processing circuits can map access information. At block 1330, the one or more processing circuits can perform a DCDSI endpoint request. At block 1332, the one or more processing circuits can invoke an object package. At block 1334, the one or more processing circuits can receive output data. At block 1340, the one or more processing circuits can update a distributed ledger or data source.

In some arrangements, at block 1310, the one or more processing circuits (e.g., analysis circuit 136 of FIG. 11) can identify DCDSI endpoint(s). In some arrangements, at block 1310, the one or more processing circuits can identify one or more decentralized compute and data store interface (DCDSI) endpoints and corresponding access information. For example, the analysis circuit 136 can access various data sources 160 to extract information about the DCDSI endpoints. This access information can include elements such as endpoint addresses, authentication credentials (e.g., API keys, OAuth tokens, cryptographic keys), request parameters (e.g., query parameters, HTTP headers), and response formats (e.g., JSON, XML). For example, an endpoint address can refer to locations (e.g., URLs or IP addresses) used to access decentralized services. Further, request parameters can include instructions for interacting with the endpoints (e.g., query parameters, HTTP headers). In another example, response formats can include the structure or type of data returned by the endpoints (e.g., JSON, XML). The analysis circuit 136 can also retrieve metadata associated with these endpoints, including data transfer protocols (e.g., REST) and security requirements (e.g., encryption standards, authentication methods).

Additionally, the analysis circuit 136 can analyze historical data to identify patterns in how endpoints have been accessed in the past, which can provide information to inform the integration of new or additional endpoints. For example, the analysis circuit 136 can prioritize frequently accessed endpoints or adjust the access information based on past connection issues. The processing circuits may also apply predictive models to anticipate access parameters for new or updated DCDSI endpoints by referencing similar, previously integrated endpoints. In another example, the analysis circuit 136 can dynamically update a catalog of endpoints as new DCDSI endpoints are added or existing ones are modified. Moreover, the identified DCDSI endpoints can include a range of decentralized interfaces, such as APIs for cloud services, blockchain nodes, and smart contracts. For example, the analysis circuit 136 can identify an API endpoint linked to a cloud-based data storage service, a smart contract for processing insurance claims, or a blockchain node for verifying cybersecurity incident logs.

In some arrangements, at block 1320, the one or more processing circuits can generate an object package. For example, the object package can be a structured data object configured to facilitate communication with one or more DCDSI endpoints. The object package can include methods and data structures specifically configured for interacting with decentralized interfaces, such as APIs, blockchain nodes, or smart contracts. The object package can be generated based on the identified DCDSI endpoints and corresponding access information, encapsulating the data for making endpoint requests, such as the endpoint's address, authentication credentials (e.g., API keys, OAuth tokens), and predefined request formats. For example, the object package may include a set of methods for executing various endpoint calls, such as HTTP requests, and/or additional methods for managing session tokens, handling encryption and decryption of data, and parsing responses returned by the endpoint. Additionally, the object package can be adapted to or customized based on different types of endpoints (e.g., an insurer endpoint can correspond to a predefined object package with predefined methods or functions for interacting with insurers, a vendor endpoint can correspond to an object including methods for interacting with vendors, etc.). For example, if the DCDSI endpoint is an API, the object package may include methods for constructing API calls (e.g., GET, POST) and handling standard response formats like JSON or XML. If the endpoint is a blockchain node, the package can include methods for interacting with smart contracts, validating transaction signatures, or retrieving data stored on the blockchain.

In some arrangements, in generating an object package at block 1320, the one or more processing circuits can initiate the object package at block 1322. In some arrangements, at block 1322, the one or more processing circuits can initiate the object package based on an identifier corresponding to at least one DCDSI endpoint type. For example, the analysis circuit 136 can use the Object-Oriented Programming (OOP) concept of reflection to dynamically identify and instantiate the appropriate class corresponding to the endpoint type. Reflection can allow the analysis circuit 136 to examine metadata about the endpoint at runtime, determining the methods, attributes, and interfaces to include in the object package. For example, if the DCDSI endpoint corresponds to a third party insurer, the analysis circuit 136 can initiate an object package configured to handle insurance workflows, such as processing claims or retrieving policy data. The analysis circuit 136 can select the appropriate class definitions using reflection, ensuring that the object package includes the logic and data structures for these operations. In another example, for a customer management endpoint, the one or more processing circuits can initiate an object package that includes methods for accessing and updating customer records. The analysis circuit 136 can dynamically load the correct classes and/or interfaces configured to interact with the endpoint based on the endpoint type. In some arrangements, the object package is structured according to the at least one DCDSI type. For example, the one or more processing circuits can organize the object package to include data serialization formats, communication protocols, and security mechanisms that align with the endpoint type, facilitating the object package's use for endpoint calls.

In some arrangements, in generating an object package at block 1320, the one or more processing circuits can map access information at block 1324. In some arrangements, at block 1324, the one or more processing circuits can map access information to an access scheme corresponding to one or more formatted requests to access the one or more DCDSI endpoints. For example, the analysis circuit 136 can structure access information, such as API keys, authentication tokens, endpoint URLs, and request parameters, into a format aligned with the access scheme for the endpoints. That is, as access scheme can include various information for accessing an API endpoint and/or provide a format configured to be accepted by the API endpoint. For example, the analysis circuit 136 can actively map data used for an endpoint call to predefined fields within the access scheme, aligning each formatted request with the endpoint's protocol and security requirements such that the endpoint provides a valid response or output responsive to an endpoint request conforming to the access scheme. The access scheme can include an endpoint address, structure and/or formatting requirements corresponding to an endpoint, and so on. For example, the analysis circuit 136 can incorporate OAuth tokens and endpoint-specific parameters when configuring API calls to cloud services, structuring the requests to comply with the security policies of third-party systems 150. Additionally, if the DCDSI endpoints include blockchain nodes, the analysis circuit 136 can map access information to include cryptographic signatures and/or consensus parameters for interacting with the blockchain. In some arrangements, the one or more formatted requests correspond with requesting protection data. For example, the analysis circuit 136 can format API calls to retrieve cybersecurity-related data, such as threat intelligence reports, incident logs, or compliance checklists, structuring these requests to match the endpoint's specifications and support secure data retrieval.

In some arrangements, at block 1330, the one or more processing circuits can perform a DCDSI endpoint request. For example, the analysis circuit 136 can execute an API call to a cloud service provider to retrieve real-time cybersecurity threat intelligence. The API call can include formatted requests, such as GET or POST requests, structured with the authentication tokens and query parameters specific to the cloud service endpoint. In another example, the analysis circuit 136 can initiate a request to a blockchain node, where the request involves submitting a transaction to verify the integrity of recent cybersecurity-related events. Initiating can include invoking smart contracts on the blockchain that manage the validation of incident reports or the authentication of security audits. Additionally, the analysis circuit 136 can perform a DCDSI endpoint request to a third-party security service, such as a Managed Security Service Provider (MSSP), to gather data on detected vulnerabilities or security patches. In performing the DCDSI endpoint request, the analysis circuit 136 can adapt the request formats (e.g., endpoint calls) to meet the requirements of each endpoint such that the requests are properly authenticated and routed through secure channels. For instance, when interacting with a decentralized storage network, the analysis circuit 136 can include commands to retrieve encrypted cybersecurity data, such as encrypted log files or configuration backups, from distributed nodes or tokens, and then process the responses to decrypt and analyze the retrieved data.

In some arrangements, in performing a DCDSI endpoint call at block 1330, the one or more processing circuits can invoke an object package at block 1332. In some arrangements, at block 1332, the one or more processing circuits can use the object package to execute or perform the DCDSI endpoint request using at least one formatted request of the one or more formatted requests. For example, the analysis circuit 136 can invoke the object package by activating methods within the package that correspond to the type of endpoint being accessed. Invoking can include calling or executing a method configured to communicate with a cloud-based API, where the formatted request includes the headers, authentication tokens, and query parameters tailored to the endpoint's protocol. In another example, the analysis circuit 136 can invoke the object package for a blockchain-based DCDSI endpoint, where the request can include executing a smart contract function to verify the status of a cyber resilience token. The object package can be structured to dynamically adjust its methods based on the endpoint type such that the analysis circuit 136 can handle various types of DCDSI endpoints without rewriting core request logic. Additionally, the object package can include routines to manage potential issues during the endpoint interaction, such as timeouts or invalid responses, and can trigger alternative methods or retries to complete the DCDSI endpoint request.

In some arrangements, in performing a DCDSI endpoint call at block 1330, the one or more processing circuits can receive output data at block 1334. In some arrangements, at block 1334, the one or more processing circuits can receive output data, specifically as a response to the DCDSI endpoint request by a DCDSI system. For example, the analysis circuit 136 can receive output data from an API endpoint in direct response to the request, such as a set of compliance metrics or security incident reports. The output data can be in a structured format, such as JSON or XML, which allows the analysis circuit 136 to parse and process the information for further use. In another example, the output data received from a blockchain-based DCDSI system can include transaction records or verification results related to cyber resilience tokens corresponding to the initiated request. The analysis circuit 136 can process this data to update internal records or to trigger additional actions based on the results (e.g., response) received from the endpoint.

In some arrangements, at block 1340, the one or more processing circuits can update a distributed ledger or data source based on the output data. For example, the dynamic mapping system 1106 can record the received output data in a blockchain ledger (e.g., blockchain 170), facilitating secure, immutable, and verifiable data storage. In another example, the one or more processing circuits can update an internal data source, such as database 140, by appending the output data to existing records. In some examples, updating can include mapping the output data to fields within the database, such as cybersecurity metrics, incident logs, or compliance reports such that that the information is categorized appropriately for future use. Additionally, the one or more processing circuits can create associations between the newly recorded output data and pre-existing records, facilitating data analysis and access to related information.

In some arrangements, the one or more processing circuits can further determine entity data of an entity based on at least one token stored on the distributed ledger or data source. For example, the analysis circuit 136 can access the distributed ledger (e.g., blockchain 170) to retrieve a token associated with the entity, such as a unique identifier or an encrypted data block. The analysis circuit 136 can decode or decrypt the token to extract the entity data, which may include data like entity credentials, cybersecurity posture, or other relevant data for the endpoint request. In some arrangements, performing the DCDSI endpoint request further includes providing the entity data and the access information as input to the object package. For example, the object system 1102 can integrate the retrieved entity data with the access information, structuring them within the object package for precise communication with the DCDSI endpoint. The object system 1102 can prepare the object package to include entity-specific parameters, such as authentication credentials or request parameters associated with the entity, aligning the DCDSI endpoint request with the entity's requirements.

In some arrangements, the access information comprises a taxonomy including at least one endpoint address and one or more (i) authentication credentials, (ii) request parameters, or (iii) response formats corresponding to the one or more DCDSI endpoints. That is, the taxonomy can include a structure or classification system that organizes and categorizes elements required for interacting with decentralized services, such as endpoint addresses, based on various parameters (e.g., authentication credentials, communication parameters, etc.). For example, the analysis circuit 136 can implement the taxonomy to identify and organize relevant data to facilitate communication with DCDSI endpoints. Additionally, the taxonomy can include categories for security protocols, data formats, or other classifications relevant to the interaction with the endpoints.

In some arrangements, performing the DCDSI endpoint request further includes providing, by the one or more processing circuits, the one or more (i) authentication credentials, (ii) request parameters, or (iii) response formats as the input to the object package based on the taxonomy. That is, providing can include organizing various inputs according to a received taxonomy (e.g., based on an API specification, for example) such that endpoint calls or requests can be received and/or processed by an identified endpoint. For example, the analysis circuit 136 can extract and arrange the necessary credentials and parameters from the taxonomy to facilitate the request. In some arrangements, performing the DCDSI endpoint request further includes invoking, by the one or more processing circuits, the object package to perform the DCDSI endpoint request to the endpoint address. That is, invoking can involve instantiating an object and/or executing methods included within or corresponding to the object such that the object causes the request to be transmitted to the appropriate endpoint and further processed for providing a response. For example, the analysis circuit 136 can execute a method within the object package corresponding to an API "GET" function of an endpoint to transmit a request according to the endpoint standards or other endpoint data included in the taxonomy.

In some arrangements, in accessing the token, the one or more processing circuits can further establish a data communication link with the ledger. For example, the analysis circuit 136 can initiate a secure connection with a blockchain network or a database that serves as the ledger, utilizing encrypted communication protocols to protect the integrity of the transmitted data. In some arrangements, the ledger includes a blockchain network or database. For example, the blockchain 170 can store tokens associated with various entities, where each token can represent unique identifiers, security credentials, or other encrypted information relevant to the entity. In some arrangements, the one or more processing circuits can transmit, via the data communication link, a query to the blockchain network or database to identify the token, and the query can include an identifier or address corresponding with the entity. For example, the analysis circuit 136 can formulate and transmit a query that specifies the entity's unique identifier or blockchain address, directing the query to the appropriate node within the blockchain network. In some arrangements, the one or more processing circuits can retrieve, via the data communication link, the token from the blockchain network or database using the identifier or address. For example, upon receiving a response from the blockchain network, the analysis circuit 136 can extract the token data, which may include encrypted information specific to the entity. In some arrangements, the one or more processing circuits can verify the authenticity of the token. For example, the analysis circuit 136 can apply cryptographic techniques to validate the token's digital signature or check its provenance against a stored ledger of trusted entities. The verification process helps to confirm that the token has not been tampered with and is legitimate. In some arrangements, the one or more processing circuits can extract the entity data from the token. For example, the analysis circuit 136 can decrypt the token to reveal the underlying entity data, such as access credentials, compliance history, or other relevant information for the DCDSI endpoint request.

In some arrangements, in identifying the one or more DCDSI endpoints and the access information, the one or more processing circuits can extract, using a machine learning model, the access information from at least one document or content corresponding with the one or more endpoints. For example, the analysis circuit 136 can employ various machine learning models, such as natural language processing (NLP) models, supervised learning models, or deep learning neural networks, to analyze and extract relevant endpoint data from diverse sources. These sources can include unstructured data from API documentation, technical manuals, configuration files, and/or log files from previous interactions with the endpoints. The models can be trained and implemented to identify access information, such as endpoint URLs, authentication credentials, API keys, request parameters, and response formats. For instance, an NLP model might process API documentation to recognize and extract structured access data, while a deep learning model could analyze historical data to detect patterns and predict optimal configurations for new endpoints. Additionally, a supervised learning model can be used to continuously improve the accuracy of access information extraction by learning from labeled data sets and refining its predictions over time, and the analysis circuit 136 can then map the extracted information to the appropriate DCDSI endpoints.

In some arrangements, the one or more processing circuits can detect an update to the one or more DCDSI endpoints based on monitoring the at least one document or content using the machine learning model. For example, the analysis circuit 136 can utilize a combination of machine learning models, such as recurrent neural networks (RNNs) for time-series analysis, and anomaly detection algorithms to monitor API documentation, configuration files, or change logs for any alterations or updates to the endpoints. These models can identify changes in endpoint URLs, new authentication protocols, updated request parameters, or modifications in response formats. In some embodiments, the one or more processing circuits can modify the access information based on the detected update. For example, upon detecting an update, the analysis circuit 136 can automatically adjust the relevant access data, such as updating the endpoint URL, revising authentication credentials, or altering the structure of API requests to match the new specifications. In some arrangements, the one or more processing circuits can map the modified access information to the access scheme corresponding to the one or more formatted requests. For example, the dynamic mapping system 1106 can reconfigure the object package to incorporate the modified access information such that future DCDSI endpoint requests are aligned with the updated endpoint requirements. For example, mapping can include updating the formatted request templates, adjusting security protocols, and verifying that the modified access scheme maintains compatibility with the endpoint's new configuration.

In some arrangements, in generating the object package, the one or more processing circuits can receive an object data structure including operations for communicating with and exchanging data with the one or more DCDSI endpoints based on the type. For example, the analysis circuit 136 can apply object-oriented programming (OOP) principles, such as reflection, to dynamically generate an object data structure tailored to the type of DCDSI endpoint. The object data structure can include predefined methods for API calls, data exchange protocols, and error handling routines that align with the endpoint's requirements. By utilizing reflection, the analysis circuit 136 can identify and incorporate the appropriate classes, methods, and properties for interacting with different types of endpoints, allowing the object package to adjust its behavior based on the DCDSI endpoint (e.g., cloud-based APIs, blockchain nodes, smart contracts). In some arrangements, in generating the object package, the one or more processing circuits can modify a state of the object data structure to cause the object data structure to perform the DCDSI endpoint request based on the access information. For example, the analysis circuit 136 can manage the state of the object data structure by tracking the current status of the DCDSI endpoint request, such as whether the request has been initiated, is in progress, or has been completed. The state can include data fields that store the endpoint's current parameters, authentication status, or any intermediate data used for the request. By actively modifying the state, the analysis circuit 136 can trigger actions within the object data structure, such as sending an API request, adjusting request parameters based on real-time data, or handling a response from the endpoint.

In some arrangements, in updating the distributed ledger or data source, the one or more processing circuits can map the output data to an output information scheme corresponding to one or more outputs from accessing the one or more DCDSI endpoints. For example, the analysis circuit 136 can map the output data to an output information scheme that organizes and categorizes the data based on predefined formats, making the data compatible with the structure of the distributed ledger or internal data source. In some examples, mapping can include translating raw data into structured formats, such as converting JSON responses from an API into a tabular format suitable for blockchain storage or database entries. The integrated result 1204 can be generated as part of a mapping process, consolidating and aligning the data with the output information scheme to provide a record of the interactions with the DCDSI endpoints. Additionally, the analysis circuit 136 can manage various types of output data, such as transaction records, audit logs, compliance reports, or other cybersecurity-related information, and map these outputs to the appropriate sections of the ledger or data source, facilitating efficient data retrieval and analysis in future operations.

In some arrangements, the one or more DCDSI endpoints include one or more application programming interfaces (APIs). For example, the DCDSI endpoints can encompass APIs that interact with various third-party services, such as cloud storage providers, financial transaction systems, or cybersecurity monitoring tools. These APIs can serve as interfaces for retrieving data, executing transactions, or interacting with decentralized compute and data storage systems. In some arrangements, the access scheme includes one or more rules. For example, the access scheme can include a set of predefined conditions or parameters, such as authentication requirements, access permissions, or data format specifications, that govern how the DCDSI endpoints are accessed. In some arrangements, the one or more processing circuits can validate the access information against at least one of the one or more rules to determine compatibility with the access scheme either (i) before performance of a data retrieval corresponding to the DCDSI endpoint request or (ii) after performance of the data retrieval. For example, before executing the DCDSI endpoint request, the analysis circuit 136 can compare the provided access credentials and parameters with the access rules to verify that the request complies with the endpoint's security and access protocols. For example, validating can include checking for valid API keys, ensuring that the request is properly formatted, and verifying that the user has the permissions to access the requested data. In another example, after performing the data retrieval, the analysis circuit 136 can validate the retrieved data against post-retrieval rules, such as verifying that the data meets integrity checks and confirming that the data format aligns with the expected schema.

Configuration of Exemplary Embodiments

While this specification contains many specific implementation details and/or arrangement details, these should not be construed as limitations on the scope of any implementations or of what may be claimed, but rather as descriptions of features specific to particular implementations and/ or arrangements of the systems and methods described herein. Certain features that are described in this specification in the context of separate implementations and/or arrangements can also be implemented and/or arranged in combination in a single implementation and/or arrangement. Conversely, various features that are described in the context of a single implementation and/or arrangement can also be implemented and arranged in multiple implementations and/or arrangements separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Additionally, features described with respect to particular headings may be utilized with respect to and/or in combination with illustrative arrangement described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations and/or arrangements described above should not be understood as requiring such separation in all implementations and/or arrangements, and it should be understood that the described program components and systems can generally be integrated together in a single software product or packaged into multiple software products.

Having now described some illustrative implementations, implementations, illustrative arrangements, and arrangements it is apparent that the foregoing is illustrative and not limiting, having been presented by way of example. In particular, although many of the examples presented herein involve specific combinations of method acts or system elements, those acts, and those elements may be combined in other ways to accomplish the same objectives. Acts, elements and features discussed only in connection with one implementation and/or arrangement are not intended to be excluded from a similar role in other implementations or arrangements.

The phraseology and terminology used herein is for the purpose of description and should not be regarded as limiting. The use of "including" "including" "having" "containing" "involving" "characterized by" "characterized in that" and variations thereof herein, is meant to encompass the items listed thereafter, equivalents thereof, and additional items, as well as alternate implementations and/or arrangements consisting of the items listed thereafter exclusively. In one arrangement, the systems and methods described herein consist of one, each combination of more than one, or all of the described elements, acts, or components.

Any references to implementations, arrangements, or elements or acts of the systems and methods herein referred to in the singular may also embrace implementations and/or arrangements including a plurality of these elements, and any references in plural to any implementation, arrangement, or element or act herein may also embrace implementations and/or arrangements including only a single element. References in the singular or plural form are not intended to limit the presently disclosed systems or methods, their components, acts, or elements to single or plural configurations. References to any act or element being based on any information, act or element may include implementations and/or arrangements where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

Any arrangement disclosed herein may be combined with any other arrangement, and references to "an arrangement," "some arrangements," "an alternate arrangement," "various arrangements," "one arrangement" or the like are not necessarily mutually exclusive and are intended to indicate that a particular feature, structure, or characteristic described in connection with the arrangement may be included in at least one arrangement. Such terms as used herein are not necessarily all referring to the same arrangement. Any arrangement may be combined with any other arrangement, inclusively or exclusively, in any manner consistent with the aspects and arrangements disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to controlling the display of content of information resources, the systems and methods described herein can include applied to other environments. The foregoing implementations and/or arrangements are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method, comprising:
   identifying, by one or more processing circuits, one or more decentralized compute and data store interface (DCDSI) endpoints and corresponding access information;
   generating, by the one or more processing circuits, an object package corresponding to the one or more DCDSI endpoints, wherein generating comprises:

initiating the object package based on an identifier corresponding to at least one DCDSI endpoint type, wherein the object package is structured according to the at least one DCDSI endpoint type; and mapping, in the object package, the corresponding access information to an access scheme corresponding to one or more formatted requests to access the one or more DCDSI endpoints, wherein the one or more formatted requests correspond with requesting protection data comprising cyber resilience data of an entity or third-party, wherein the cyber resilience data corresponds to at least one of a cybersecurity metric, incident data, compliance information, or operational data of the entity or third-party;

performing, by the one or more processing circuits, a DCDSI endpoint request by:
  invoking the object package to execute the DCDSI endpoint request using at least one formatted request of the one or more formatted requests; and
  receiving output data comprising a response to the DCDSI endpoint request by a DCDSI system, wherein the output data comprises at least a portion of the cyber resilience data; and updating, by the one or more processing circuits, a distributed ledger or data source based on the output data.

2. The method of claim 1, further comprising:
determining, by the one or more processing circuits, entity data of the entity based on at least one token stored on the distributed ledger or the data source; and
wherein performing the DCDSI endpoint request further comprises providing the entity data and the corresponding access information as input to the object package.

3. The method of claim 2, wherein the corresponding access information comprises a taxonomy comprising at least one endpoint address and one or more (i) authentication credentials, (ii) request parameters, or (iii) response formats corresponding to the one or more DCDSI endpoints, and wherein performing the DCDSI endpoint request further comprises:
  providing, by the one or more processing circuits, the one or more (i) authentication credentials, (ii) request parameters, or (iii) response formats as the input to the object package based on the taxonomy; and
  invoking, by the one or more processing circuits, the object package to perform the DCDSI endpoint request to the at least one endpoint address.

4. The method of claim 2, wherein accessing the at least one token further comprises:
  establishing, by the one or more processing circuits, a data communication link with the distributed ledger, wherein the distributed ledger comprises a blockchain network or database;
  transmitting, by the one or more processing circuits and via the data communication link, a query to the blockchain network or database to identify the at least one token, wherein the query comprises an entity identifier or entity address corresponding with the entity;
  retrieving, by the one or more processing circuits and via the data communication link, the at least one token from the blockchain network or database using the entity identifier or entity address;
  verifying, by the one or more processing circuits, an authenticity of the at least one token; and
  extracting, by the one or more processing circuits, the entity data from the at least one token.

5. The method of claim 1, wherein identifying the one or more DCDSI endpoints and the corresponding access information further comprises:
  extracting, by the one or more processing circuits using a machine learning model, the corresponding access information from at least one document or content corresponding with the one or more DCDSI endpoints.

6. The method of claim 5, further comprising:
detecting, by the one or more processing circuits, an update to the one or more DCDSI endpoints based on monitoring the at least one document or content using the machine learning model;
modifying, by the one or more processing circuits, the corresponding access information based on the detected update; and
mapping, by the one or more processing circuits, the modified access information to the access scheme corresponding to the one or more formatted requests.

7. The method of claim 1, wherein generating the object package further comprises:
receiving, by the one or more processing circuits, an object data structure comprising operations for communicating with and exchanging data with the one or more DCDSI endpoints based on the at least one DCDSI endpoint type; and
modifying, by the one or more processing circuits, a state of the object data structure to cause the object data structure to perform the DCDSI endpoint request based on the corresponding access information.

8. The method of claim 1, wherein updating the distributed ledger or data source further comprises:
mapping, by the one or more processing circuits, the output data to an output information scheme corresponding to one or more outputs from accessing the one or more DCDSI endpoints.

9. The method of claim 1, wherein the one or more DCDSI endpoints comprise one or more application programming interfaces (APIs), wherein the access scheme comprises one or more rules, and further comprising:
validating, by the one or more processing circuits, the corresponding access information against at least one of the one or more rules to determine compatibility with the access scheme either (i) before performance of a data retrieval corresponding to the DCDSI endpoint request or (ii) after performance of the data retrieval.

10. A system, comprising:
one or more processing circuits configured to:
  identify one or more decentralized compute and data store interface (DCDSI) endpoints and corresponding access information;
  generate an object package corresponding to the one or more DCDSI endpoints, the one or more processing circuits further configured to:
    initiate the object package based on an identifier corresponding to at least one DCDSI endpoint type, wherein the object package is structured according to the at least one DCDSI endpoint type; and
    map, in the object package, the corresponding access information to an access scheme corresponding to one or more formatted requests to access the one or more DCDSI endpoints, wherein the one or more formatted requests correspond with requesting protection data comprising cyber resilience data of an entity or third-party, wherein the cyber resilience data corresponds to at least one of a cybersecurity metric, incident data, compliance information, or operational data of the entity or third-party;

perform a DCDSI endpoint request, the one or more processing circuits further configured to:
  invoke the object package to execute the DCDSI endpoint request using at least one formatted request of the one or more formatted requests; and
  receive output data comprising a response to the DCDSI endpoint request by a DCDSI system, wherein the output data comprises at least a portion of the cyber resilience data; and
update a distributed ledger or data source based on the output data.

11. The system of claim 10, the one or more processing circuits further configured to:
  determine entity data of the entity based on at least one token stored on the distributed ledger or data source; and
  in performing the DCDSI endpoint request, provide the entity data and the corresponding access information as input to the object package.

12. The system of claim 11, wherein the corresponding access information comprises a taxonomy comprising at least one endpoint address and one or more (i) authentication credentials, (ii) request parameters, or (iii) response formats corresponding to the one or more DCDSI endpoints, and wherein the one or more processing circuits are further configured to, in performing the DCDSI endpoint request:
  provide the one or more (i) authentication credentials, (ii) request parameters, or (iii) response formats as the input to the object package based on the taxonomy; and
  invoke the object package to perform the DCDSI endpoint request to the at least one endpoint address.

13. The system of claim 12, the one or more processing circuits further configured to, in accessing the at least one token:
  establish a data communication link with the distributed ledger, wherein the distributed ledger comprises a blockchain network or database;
  transmit, via the data communication link, a query to the blockchain network or database to identify the at least one token, wherein the query comprises an entity identifier or entity address corresponding with the entity;
  retrieve, via the data communication link, the at least one token from the blockchain network or database using the entity identifier or entity address;
  verify an authenticity of the at least one token; and
  extract the entity data from the at least one token.

14. The system of claim 10, the one or more processing circuits further configured to, in identifying the one or more DCDSI endpoints and the corresponding access information:
  extract, using a machine learning model, the corresponding access information from at least one document or content corresponding with the one or more DCDSI endpoints.

15. The system of claim 14, the one or more processing circuits further configured to:
  detect an update to the one or more DCDSI endpoints based on monitoring the at least one document or content using the machine learning model;
  modify the corresponding access information based on the detected update; and
  map the modified access information to the access scheme corresponding to the one or more formatted requests.

16. The system of claim 10, the one or more processing circuits further configured to, in generating the object package:
  receive an object data structure comprising operations for communicating with and exchanging data with the one or more DCDSI endpoints based on the at least one DCDSI endpoint type; and
  modify a state of the object data structure to cause the object data structure to perform the DCDSI endpoint request based on the corresponding access information.

17. The system of claim 10, the one or more processing circuits further configured to, in updating the distributed ledger or data source:
  map the output data to an output information scheme corresponding to one or more outputs from accessing the one or more DCDSI endpoints.

18. The system of claim 10, wherein the one or more DCDSI endpoints comprise one or more application programming interfaces (APIs), wherein the access scheme comprises one or more rules, and wherein the one or more processing circuits are further configured to:
  validate the corresponding access information against at least one of the one or more rules to determine compatibility with the access scheme either (i) before performance of a data retrieval corresponding to the DCDSI endpoint request or (ii) after performance of the data retrieval.

19. One or more non-transitory computer-readable media (CRM) having instructions stored thereon that, when executed by one or more processing circuits, cause the one or more processing circuits to:
  identify one or more decentralized compute and data store interface (DCDSI) endpoints and corresponding access information;
  generate an object package corresponding to the one or more DCDSI endpoints, the instructions further causing the one or more processing circuits to:
    initiate the object package based on an identifier corresponding to at least one DCDSI endpoint type, wherein the object package is structured according to the at least one DCDSI endpoint type; and
    map, in the object package, the corresponding access information to an access scheme corresponding to one or more formatted requests to access the one or more DCDSI endpoints, wherein the one or more formatted requests correspond with requesting protection data comprising cyber resilience data of an entity or third-party, wherein the cyber resilience data corresponds to at least one of a cybersecurity metric, incident data, compliance information, or operational data of the entity or third-party;
  perform a DCDSI endpoint request, the instructions further causing the one or more processing circuits to:
    invoke the object package to execute the DCDSI endpoint request using at least one formatted request of the one or more formatted requests; and
    receive output data comprising a response to the DCDSI endpoint request by a DCDSI system, wherein the output data comprises at least a portion of the cyber resilience data; and
  update a distributed ledger or data source based on the output data.

20. The one or more non-transitory CRM of claim 19, further causing the one or more processing circuits to:
  determine entity data of the entity based on at least one token stored on the distributed ledger or data source; and in performing the DCDSI endpoint request, provide the entity data and the corresponding access information as input to the object package.

\* \* \* \* \*